(12) United States Patent
Strobl

(10) Patent No.: US 6,356,700 B1
(45) Date of Patent: Mar. 12, 2002

(54) EFFICIENT LIGHT ENGINE SYSTEMS, COMPONENTS AND METHODS OF MANUFACTURE

(76) Inventor: Karlheinz Strobl, 236 Windward Ct. N., Port Jefferson, NY (US) 11777

(*) Notice: Subject to any disclaimer, the term of this patent is extended or adjusted under 35 U.S.C. 154(b) by 0 days.

(21) Appl. No.: 09/328,256

(22) Filed: Jun. 8, 1999

Related U.S. Application Data

(60) Provisional application No. 60/088,426, filed on Jun. 8, 1998, and provisional application No. 60/104,388, filed on Oct. 15, 1998.

(51) Int. Cl.$^7$ .............................................. G02B 6/00
(52) U.S. Cl. .................... 385/147; 385/901; 385/31; 362/297; 362/298; 362/302; 362/346; 359/859
(58) Field of Search .................. 362/297, 298, 300, 302, 346; 385/901, 31, 147; 359/859

(56) References Cited

U.S. PATENT DOCUMENTS

| | | | |
|---|---|---|---|
| 3,681,164 A | 8/1972 | Bazinet, Jr. et al. | 156/294 |
| 4,106,078 A | 8/1978 | Inoue | 362/32 |
| 4,460,939 A | 7/1984 | Murakami et al. | 362/31 |
| 4,913,529 A | 4/1990 | Goldenberg et al. | 350/337 |
| 4,945,455 A | 7/1990 | Akizuki | 362/61 |
| 4,969,730 A | 11/1990 | van den Brandt | 353/31 |
| 4,983,014 A | 1/1991 | Nattermann | 350/96.24 |
| 5,022,750 A | 6/1991 | Flasck | 353/31 |
| 5,031,078 A | 7/1991 | Bornhorst | 362/32 |
| 5,098,184 A | 3/1992 | van den Brandt et al. | 353/38 |
| 5,143,435 A | 9/1992 | Kikuchi | 362/32 |
| 5,159,485 A | 10/1992 | Nelson | 359/641 |
| 5,233,385 A | 8/1993 | Sampsell | 355/35 |
| 5,414,600 A | 5/1995 | Strobl et al. | 362/32 |
| 5,442,414 A | 8/1995 | Janssen et al. | 353/98 |
| 5,446,639 A | 8/1995 | Hamanaka et al. | 362/350 |
| 5,448,314 A | 9/1995 | Heimbuch et al. | 348/743 |
| 5,467,146 A | 11/1995 | Huang et al. | 348/743 |
| 5,484,318 A | 1/1996 | Mayert et al. | 446/75 |
| 5,491,620 A | 2/1996 | Winston et al. | 362/346 |
| 5,491,765 A | 2/1996 | Matsumoto | 385/33 |
| 5,509,095 A | 4/1996 | Baker et al. | 385/31 |
| 5,528,318 A | 6/1996 | Janssen | 348/756 |
| 5,532,763 A | 7/1996 | Janssen et al. | 348/744 |
| 5,574,328 A | 11/1996 | Okuchi | 313/114 |
| 5,592,188 A | 1/1997 | Doherty et al. | 345/84 |
| 5,606,637 A | 2/1997 | Dolby | 385/115 |
| 5,619,194 A | 4/1997 | Belfer | 340/907 |
| 5,625,738 A | 4/1997 | Magarill | 359/224 |
| 5,634,704 A | 6/1997 | Shikama et al. | 353/31 |
| 5,642,456 A | 6/1997 | Baker et al. | 385/140 |
| 5,707,131 A | 1/1998 | Li | 362/32 |
| 5,737,472 A | 4/1998 | Bernasson et al. | 385/123 |
| 5,769,844 A | 6/1998 | Ghaffari | 606/16 |
| 5,790,723 A | 8/1998 | Riser et al. | 385/31 |
| 5,803,575 A | 9/1998 | Ansems et al. | 362/32 |
| 5,842,767 A | 12/1998 | Rizkin et al. | 362/32 |

FOREIGN PATENT DOCUMENTS

| | | |
|---|---|---|
| DE | 2630730 | 1/1977 |
| DE | 3247500 | 11/1984 |
| FR | 1383413 | 2/1964 |
| FR | 2441860 | 11/1978 |
| GB | 1556046 | 11/1979 |

*Primary Examiner*—Darren Schuberg
*Assistant Examiner*—Leo Boutsikaris
(74) *Attorney, Agent, or Firm*—Perkins, Smiith & Cohen, LLP; Jerry Cohen; Jacob N. Erlich

(57) ABSTRACT

An étendue efficient angle conversion system that operates in a quasi-imaging mode. This system is capable of generating angular and spatial axial asymmetric output beams and is also capable of incorporating therein optional color reformatting capabilities. With the aid of anamorphic beam transformers such asymmetric beams can further be reformatted to spatially and angularly match particular illumination needs of a target. This system can further be applied to the design of fiber optic illumination systems and projection display systems and can further be combined with delivery efficiency maximization concepts. In addition, delivery efficiency improvements of light engines can be obtained with the use of optimized lamp, reflector, integrators, anamorphic beam transformers, coupling optics, etc.

25 Claims, 20 Drawing Sheets cos($\theta_h$)- parallel to lamp axis 1.2X 1-dimensional tapered integrator $\cos(\theta_h)$ - parallel to lamp axis

EFFICIENT LIGHT ENGINE SYSTEMS, COMPONENTS AND METHODS OF MANUFACTURE

CROSS REFERENCE TO RELATED APPLICATIONS

This application claims priority of U.S. Provisional Applications Serial No. 60/088,426 filed Jun. 8, 1998 entitled EFFICIENT LIGHT ENGINE SYSTEMS AND METHODS FOR THEIR CONSTRUCTION and Ser. No. 60/104,388 filed Oct. 15, 1998 entitled GAS LAMP OPTIMIZATION FOR IMAGING TYPE COLLECTION AND CONCENTRATION SYSTEMS, both by the present inventor.

BACKGROUND OF THE INVENTION

This invention relates generally to highly efficient, radiant power transferring, light engines and, in particular, to projection display systems, fiber-optic illumination systems, and to the design optimization of related components.

Many applications of light, or more broadly, coherent and incoherent electromagnetic energy, require a physical separation between the locations of light generation and the locations of its use, i.e. target locations. Together all light usage locations of interest form a target T. In the same manner, all energy emission locations of interest form a source S. Such electromagnetic energy radiating sources can be operated continuously or pulsed, can be incoherent, coherent or partially coherent and/or a combination thereof. They can be energized by AC or DC currents, by microwave heating, by electromagnetic radiation means using energy in similar and/or different wavelength regions, by chemical means, and by many other sources of energy. Depending on the distributions of the respective location of interest they can be characterized either as surface, volume, as surface and volume type source S and target T.

A given target T usually has some associated formatting requirements on the light beam used to illuminate it. Further, the spectral, spatial and angular emission energy density function of a source S, is in general different from the spectral, spatial and angular light acceptance function of a given target T. Therefore, for best energy coupling between a given source S and a given target T, the associated target illumination beam has typically to be reformatted to increase the delivery efficiency of collectable light that is also usable by the target. Examples of common formatting requirements for a target illumination beam are restrictions for DE its cross sectional shape and size near the respective collection aperture, its spatial intensity distribution, its minimum and maximum intensity level, its maximum incident angle dependent on a preferred azimuth direction, its local energy propagation direction, its spectral energy content and spectral intensity distribution, etc. Further, in many types of illumination systems, selected internal optical components choices (for example, a Color Wheel (CW), a Light Valve (LV), a Light Guide (LG), a Polarization Conversion System (PCS), a color cube combiner (CQC), an Anamorphic Beam Converter (ABC), etc.) and/or component layout constraint (input and output coupling of a LV, maximum height of a component, etc) effect the maximum light delivery efficiency. These design constraint and/or throughput limiting components can effectively also be interpreted as effective or intermediate targets T'.

Only those light rays that fulfill the formatting requirements of a given target T are useful for the illumination of the target T. The rest of the light rays, incident either on the target T itself or its neighborhood, are typically wasted. Often these non-usable rays have to be stopped with masks and or spectral filters from reaching the target T or its surrounding space to prevent them from interfering with a particular target illumination application: for example, by causing an undesired overheating of the target object itself or reducing the image contrast in a projection display system. Often also selected color bands and/or polarization directions have to be attenuated to create a particular color balanced system with a chosen white point and color gamut and/or a well defined polarization state.

Thus, it is in general preferred that light (i.e., for the purpose of this invention, electromagnetic radiation of any wavelength) is captured from a source S and delivered to a target T be reformatted in such a manner that as much as possible of the light delivered to a given target is also useable by the target T.

A Light Engine (LE) is an apparatus that accomplishes the above described electromagnetic radiation power transfer and beam-formatting task. It is typically made up of multiple optical components that together have at least two or three major tasks. The first task is to collect light from a source S. The second task is to deliver some of the collected light to the target T. The third, and often optional, task is to reformat the light beam to enhance the usable content of the light delivered to the target T.

To facilitate an understanding of this invention, three subclasses of LE's are defined: a Minimal Light Engine (MLE), a Light Guide Light Engine (LGLE) and an Anamorphic Beam Transformer Light Engine (ABTLE). A MLE is a special LE (or a portion of a more complex LE) that collects light emitted from the emission surface $ES_s$ or emission volume $EV_S$ of a source S and concentrates it inside a volume $EV_S'$. This volume $EV_S'$ can be interpreted as the emission volume of a secondary source S', also called emission source S', that illuminates either a target T directly or the collection aperture CA of a beam reformatting and/or remote transmission system of a related LE. A LGLE is another special LE where a MLE couples energy into at least one LG (for example for beam reformatting and/or remote energy transmission purposes) and where the input port of the respective LG collects light from the emission volume $EV_S'$ of the respective MLE. The respective illumination target T is the exit port of the respective LG optionally combined with constraint for the spatial and/or angular extend of the exiting beam. An ABTLE is similar to a LGLE and uses at least one ABT for beam reformatting purposes. If the LG is also an ABT then a LE can be both a LGLE and an ABTLE.

The optical parameters called étendue E, étendue efficiency EE, throughput efficiency TE and delivery efficiency DE are important in better understanding this invention and are defined and discussed below. The étendue E is a measure of both the spatial and angular confinement of a light beam. The throughput TE and étendue efficiency EE are related parameters and measure in different ways how efficiently a given optical system reformats a given input beam compared to an ideal performing optical system. The delivery efficiency DE parameter measures both the fulfillment of the target formatting requirements and the throughput efficiency of a LE for a given target T, i.e. measured the amount of both collectable and usable light by a given target T.

This invention relates to both high efficient MLE, LGLE and ABTLE and where the respective input and output ports of the respective LG's and/or ABT's are preferably customized to the respective MLE and Target T to optimize the delivery efficiency of a given and constrained LE design.

The below referenced invention discloses embodiments that are satisfactory for the purposes for which they were intended and are in their entireties hereby expressly incorporated by reference into the present application for purposes including, but not limited to, indicating the background of this invention and illustrating the state of the prior art.

U.S. Pat. No. 5,491,765 to Matsumoto (1996) describes a typical LGLE design where a parabolic, sealed short arc reflector lamp, in combination with a focusing lens, is used to deliver collected energy to the entrance surface of a round fiber optic LG. Another related common, on-axis, prior art LGLE design uses an ellipsoidal mirror as Collection and Concentration System (CCS) of a lamp with a separate envelope. Both design families are of a non-imaging type and therefore result typically a low étendue efficiency EE. Thus, they achieve a high delivery efficiency DE only for large diameter fiber bundles having an input area $A_L^{in} >> A_S$ with $A_S$ being the respective effective cross sectional area of the emission region of the source S.

U.S. Pat. No. 4,460,939 to Marakami et. all (1984) shows a LGLE which has a double concave reflector system as MLE and a sheet LG, thus creating spatial high output intensity uniformity, high delivery efficiency, but also low étendue efficiency since the collection étendue of the LG is much larger than that of the emission source. U.S. Pat. No. 5,574,328 to Okuchi (1996) discusses a MLE which has a double concave reflector forming a CCS with the source axis of a gas discharge arc lamp aligned co-linear with the optical axis of the CCS. The orientation of the light source and the astigmatic secondary focus in two orthogonal planes creates again a non-imaging type CCS system and thus reduces the étendue efficiency of that MLE. U.S. Pat. No. 5,491,620 to Winston et. all (1994) has a double concave reflector system as CCS for the MLE and a LG collecting the re-concentrated light. Since the maximum collection angle of most light guides is much below 90 deg, such a system has a low delivery efficiency for targets with a maximum acceptance angle of <<90 deg. U.S. Pat. No. 5,842,767 to Rizkin et all (1998) shows an on-axis elliptical reflector with a hollow conical reflector as area and angle converter and an auxiliary retro-reflector. While this system is adequate for achieving higher coupling efficiency into larger diameter LG's it is still of an non-imaging type and therefore does not maximize the étendue efficiency and the delivery efficiency for étendue limited targets.

Recent off-axis U.S. Pat. No. 5,414,600 to Strobl (the present inventor) et. al. (1995) and on-axis U.S. Pat. No. 5,509,095 to Baker et. al. (1996) are representative examples of prior art, quasi-imaging, peak intensity maximizing, fiber optic LGLE's. They are typically used to illuminate very small diameter, round, single optical fibers or fiber bundles in conjunction with a short arc DC-type source. The off-axis LGLE can achieve higher delivery efficiency DE only for multi port outputs leading to complex beam combining optical systems and the on-axis LGLE has significant collection efficiency limitations for most practical higher NA LG.

The design and manufacturing limitations of the above mentioned basic types of prior art LGLE designs result often in lower delivery efficiencies and/or higher total system costs than are desirable under certain circumstances. This is particularly true for the cases, where the maximum acceptance (also called collection) étendue $E_T^{max}$ of a given or intermediate target T or T' is of a similar magnitude than the characteristic emission étendue $E_S$ of the source S. Thus in order to fulfill the illumination demand of a given target, the lower delivery efficiencies of prior art LE's typically require the usage of special sources that have a much lower emission étendue $E_S << E_T^{max}$, i.e. that have very small and very high intensity emission regions. Typically, DC or AC short plasma arc technology is being used to manufacture such high brightness and point-like emission sources. These short arc lamps are typically less efficient in their electrical to optical energy conversion than same type longer arc sources so that often higher wattage lamps have to be used to obtain a given target illumination level. Often the total systems cost is increased due to the additional requirements for an associated, higher wattage power supply and/or increased cooling and space requirements. In addition, the lifetime of such high brightness, point-like arc sources typically decreases with the increase of the lamp wattage for constant arc gaps and/or the shortening of the arc gap for constant electrical power level, thus resulting in higher overall system maintenance expenses.

Prior art Projection Light Engines (PLE's), which are designed to illuminate a projection screen by illuminating first a LV, are even more complex and optically demanding than the above-discussed prior art LGLE's. The selection of particular optical key components for a PLE often introduces additional design constraints. Typically, the LV is either directly or indirectly the most étendue limiting optical element of the respective PLE design. Due to the more limited optimization choices of the prior art PLE designs, an optical PLE designer has to balance screen uniformity, color gamut and white point with system brightness and mechanical packing constraints to achieve the best overall compromise. These design compromises lower the throughput-efficiency TE, étendue efficiency EE and/or delivery efficiency DE of a respective constrained PLE design.

U.S. Pat. No. 5,592,188 to Doherty (1997) describes a typical PLE for a single digital micro mirror device (DMD) type reflective LV. The respective MLE discussed in this patent is very similar to the one discussed in U.S. Pat. No. 5,491,765. However, instead of illuminating a LG, this system focuses the collected source energy onto a color wheel, which creates a time sequenced color beam. The color wheel is another key optical component that introduces additional constraints on the PLE design and is one of its major throughput efficiency limiter.

U.S. Pat. No. 5,442,414 to Janssen and Shimizu (1995) describes the use of an asymmetric mask that clips an illuminating beam in a special asymmetric manner so that the divergence angles $\theta_{LV}(\Psi)$ of the illumination beam have a predetermined function with respect to an azimuth angle $\Psi$, that is measured against an optical preference axis of a DMD type LV. U.S. Pat. No. 5,098,184 to van den Brandt and Timmers (1992) describe lens array designs for the spatial beam intensity homogenization in a PLE that illuminates a liquid crystal type LV. These two improvements somewhat increase the delivery efficiency DE of the respective PLE by improving the formatting of the illumination beam to better match the formatting requirements of the LV with the inclusions of additional optical components. However, they achieve lower than possible delivery efficiency for étendue limited designs due to the lower étendue of efficiency of prior art PLE designs.

In order to increase the light output of a PLE for a given LV, several variations of the color wheel based, single LV, PLE design have been implemented. The goals of these designs is to reduce the high throughput losses (>70%) associated with the color wheel. For example, U.S. Pat. No. 5,528,318 to Janssen (1996) describes a single LV, PLE where the color wheel is replaced with a special scanning prism. By combining this scanning prism technology, with, when necessary, polarization conversion technology, in principle all the light emitted by a source S can be used to illuminate a single LV for the generation of color images. However, these beam reformatting enhancement technologies typically increase by a factor of 3–6 (6–12 for polarization dependent LV's with PCS) the étendue of the LV's illumination beam. This reduces the effective illumination area of the LV by a factor of 3–6 (or 6–12) which in general reduces coupling efficiency. Therefore, the scanning prism method in combination with the limits of prior art PLE design methods is currently beneficial only for larger area LV's. The larger the area of the LV's, i.e. the larger its maximum collection étendue, the less they depend on the étendue efficiency EE of a PLE to achieve a given projection screen brightness. However, larger LV's also costs typically more to manufacture and require larger sized optics to steer the light beams, thus limiting thus far the advantages of these inventions.

Another method commonly used to increase the output of color PLE is to use multiple LV's simultaneously. A color splitting system typically separates the output of the respective MLE into different color beams that are then transmitted, homogenized, aperatured and imaged onto the respective LV's. The output of these LV's is then spatially superimposed and projected onto a distant projection screen to form a color image of the LV's. Typically three LV's (see U.S. Pat. No. 5,098,184) are used, one for each color band. PLE's that use multiple LV's achieve in general greater light output for a given source S but also require typically larger and heavier PLE. Despite the increase in throughput efficiency TE these PLE typically are designed to be somewhat étendue limited and therefore have a lower delivery efficiency than possible with this invention. Other types of prior art PLE combine the output of multiple MLE's into one integrator rod to achieve higher total system output, but not without a decrease in overall delivery efficiency.

The primary usage's of LG's in prior art, PLE's is that of a Symmetric Beam Transformer (SBT), i.e. a system that has an axis symmetric beam reformatting behavior or that of a remote energy delivery system connecting a respective MLE to a projection system. For example, single channel LG's made from straight, cladded or un-cladded (polished) rectangular rods or hollow reflective tubes are often used for beam intensity homogenization and to create a well defined emission aperture. Fiber bundles are sometimes used as LG for remote energy delivery.

U.S. Pat. No. 5,159,485 to Nelson (1992) describe a PLE that has incorporates an ABTLE. However, this design uses a lens based MLE resulting in a low delivery efficiency and the ABT has a low étendue efficiency.

Likewise, material processing applications of light typically require a minimum intensity and greater than minimum energy levels of illumination light in a specific wavelength interval to accomplish a desired light facilitated material process in a satisfactory processing time interval. Low power material processing examples of volume absorption systems are light curing of epoxy, soldering with light, marking with light, local chemical reaction control with light, photo dynamic therapy of tumors, etc. The efficiency of a given LE is often a major factor in deciding if only a laser or also a LG coupled, incoherent source can be used to accomplish the desired function in a cost effective manner. Further, the beam reformatting and delivery efficiency limits of the LE often determines the size of the target area/volume that can satisfactorily be exposed with light. Given the inherent étendue inefficiencies or design restrictions discussed above and below for the prior art LGLE's, the cost of such a system may be much higher than the market can bear thus limiting the market penetration of such technologies.

Some material processing functions like Photo Dynamic Therapy (PDT) for light facilitated treatment of biological tumors or Photo Dynamic Diagnostic (PDD) methods can often use only a relatively narrow spectral energy band of a broad band source. If only the usable spectrum is delivered to the respective target location (for example, tissue to be illuminated), much of the generated optical source energy is typically wasted. In order to improve the delivery efficiency DE of useful light, fluorescence conversion methods are often being investigated. A dye laser is a typical example of an energy (fluorescence) shifting device that transforms a shorter wavelength pump wavelength into a longer frequency lasing (fluorescing) wavelength. However, it is often desirable to find a lower cost alternative to this solution. If a suitable fluorescent material is illuminated by light delivered from a first LE, the converted light escapes the fluorescing medium in all directions. The fluorescing volume $FV_S$ of the illuminated fluorescing material forms effectively a secondary source S' whose output needs to be collected and delivered to a target surface/volume T where it can be utilized. Again, prior art LE's are not optimized to efficiently collect and deliver such spectrally shifted secondary sources. This reduces the practical usefulness of fluorescence conversion of incoherent light sources for many applications.

It is therefore an object of this invention to provide a method for designing delivery efficient LE's for a broad range of étendue limited targets T.

It is another object of this invention to provide a method for designing étendue efficient and/or throughput efficient MLE's.

It is still another object of this invention to provide a method for manufacturing color reformatting MLE's.

It is a further object of this invention to provide a method for designing delivery efficient LGLE's and ABTLE.

It is still another object of this invention to provide manufacturing methods for building matched LG's and ABT's with special input and output preparations and/or auxiliary optics to improve the throughput efficiency and/or delivery efficiency of a LE.

It is still a further object of this invention to provide improved cost/performance ratio of LE's for given primary and/or intermediate target demands.

It is still a further object of this invention to provide improved PLE's and new types of projection display systems.

It is still another object of this invention to provide a more flexible designs for automotive head light styling and remote industrial illumination systems.

It is still a further object of this invention to provide efficient fluorescence converting LE's and lamps.

It is another object of this invention to provide efficient methods for color reformatting a light beam.

It as an still another object of this invention to provide LE's that can be efficiently used in light facilitated material processing applications.

It is still a further object of this invention to change the manufacturing of related component to improve their usability for manufacturing high efficiency LE's.

It is still another object of this invention to provide methods for reducing the size of related components while maximizing the delivery efficiency of a related LE It is still a further object of this invention to provide a method for estimating the maximum achievable collection efficiency for a given source.

It is further object of this invention to provide a method for determining a minimal étendue surface of a concentrating light beam.

SUMMARY OF THE INVENTION

The delivery efficiency of a LE for a given, spatial extended emission source S and a given, remote illumination target T with respective spatial and angular dependent emission functions is improved by providing means for more étendue efficiently matching the optical properties of the source to the needs of the target and by providing optional means for spatial, angular and spectral beam reformatting.

Prior art LE's are built with either non-imaging, high collection efficiency type, or imaging, but low collection efficiency type MLE's. The present invention encompasses the design, manufacturing and use of imaging and more collection efficient type MLE'S for building more efficient LE's for étendue limited target illumination. These preferred MLE's achieve a much more étendue efficient $4\pi$-steradian ->$\approx\pi/2$ solid angle conversion and allow generating a more usable exit beam for a wide range of target illumination applications. Further, prior art beam reformatting of the output of a MLE is accomplished with Symmetric Beam Transformers (SBT's) or with low étendue efficient Anamorphic Beam Transformers (ABT's), i.e. optical coupling system which have a different magnification in two orthogonal image directions. This invention describes the design and use of étendue an efficient ABT to increase the delivery efficiency of LE's by reformatting the asymmetrical output beams of preferred types of MLE's in an étendue efficient and/or delivery efficient manner. Additionally, various applications of these basic building blocks are discussed for building LGLE, PLE, fluorescence conversion LE and other types of LE. Numerical methods for characterizing and optimizing the respective components are discussed as well.

The preferred MLE is comprised of a reflective CCS and a reflective Retro Reflection System (RRS) having at least one exit port. The RRS collects less than 50% of the light emitted by the source S and either focussed it back into the original emission region or focussed it to a region nearby that has a small offset distance related to the width of the emission region and/or its enclosing envelope. The RRS operates as an image inverting, substantially non-magnifying, imaging system. Thus the source S together with the RRS forms an effective retro reflection source that emits typically in less than $2\pi$-steradian and its respective emission region occupies either the same or about twice the volume of the source S. The respective CCS collects the light emitted by such a retro reflection source and concentrates into a secondary emission volume $EV_s'$, thus forming effectively an étendue efficiently magnified secondary source S' with a respective smaller emission solid angle.

The beam exiting such a preferred type of MLE through the respective exit port(s) of the RRS, has a similar and magnified spatial intensity characteristic (quasi-imaging) to the emission region of the respective source S, and typically has an axial asymmetrical, angular dependent energy density distribution. Both the angular and spatial characteristics of the source S and secondary source S' are substantially étendue efficiently related and the total output efficiency of the MLE is close to the total light emitted by the source S.

The RRS system also provides an option for étendue efficient color reformatting by allowing about 50% of the emitted energy to interact one more time with the emission region of the source S. This effectively doubles the optical path length for gas discharge sources. Such light-material interactions can produce direct or indirect wavelength (primarily fluorescence and heating) conversion effects for some types of lamps and thus generate a MLE exit beam that has a different spectral intensity distribution than the same source has alone. Also, since the source S is now blocking some of the light delivery, its cross sectional area perpendicular to the CCS system axis becomes now important. This leads to an opportunity for further component manufacturing changes, which, in combination with the MLE deliver even more usable light.

The minimal étendue of a beam, collected at its minimal étendue surface is typically much smaller compared to prior art systems which have a comparable collection and concentration ability. This typically leads to smaller beam waists near the respective focal point and thus to more effective energy coupling to étendue limited targets.

Since the emission source S' has typically angular and spatial axial asymmetric characteristics which are étendue efficiently related, the preferred étendue efficient anamorphic beam reformatting with an ABT results effectively in a larger input port collection aperture for a given output ports emission aperture of the respective ABT. This increased design freedom in turn allows optimizing the respective delivery efficiency by trading the extend of the collection aperture with the extend of the collection solid angle of the MLE, thus allowing to optimally match the given spectral dependent, spatial extend of the emission region and of its emission angular extend with the collection aperture (size and shape) and collection solid angle demands.

Additionally since many types of emission source have a larger spatial extend for broad band emissions, the imaging type preferred MLE in combination with the increased collection aperture of ABT's allows to typically collect a more broad band spectrum from a given source which, in combination with the RRS discussed above, further aids in the color reformatting of the source.

Asymmetrically tapered hollow or solid LG's are often used as low cost ABT system that increase the delivery efficiency over prior art. Also special, high efficiency type LG with different input and output cross sectional shapes can be used for efficient spatial beam reformatting. Optionally an ABT can be used to first quasi-symmetrisize an asymmetric input beam first before further reshaping its beam cross section to a more usable shape. Often such ABT can also provide simultaneously a spatial beam intensity homogenization, which helps in increasing the delivery efficiency for PLE type applications. The combination of auxiliary optic with the ABT can aid in the design and optimization of constrained LE design tasks.

Auxiliary retro-reflectors can be used to further increase the collection efficiency and to aid in the color reformatting. Ideally for a given target, the lamp used for such a MLE is different than that used for prior art LE due to the multiple interaction of the light with the emission region and/or due to the higher étendue efficiency of the MLE and matched ABT's. Special manufacturing features are discussed for allowing to maximize the delivery efficiency for size/height constraint CCS and RRS. Typically the respective MLE occupies a smaller volume than a prior art MLE producing the same output divergence and having the same height.

The combination of the MLE and the ABT allows the use of either more extended emission regions for given size targets or shrinkage of the system size. When such designs are optimized in this invention for Projection Light Engines (PLE) or fiber optic illumination systems this, brighter outputs and or lower cost system or system size for the same output level generally result.

DETAILED DESCRIPTION OF THE PREFERRED EMBODIMENTS

Figure 1:
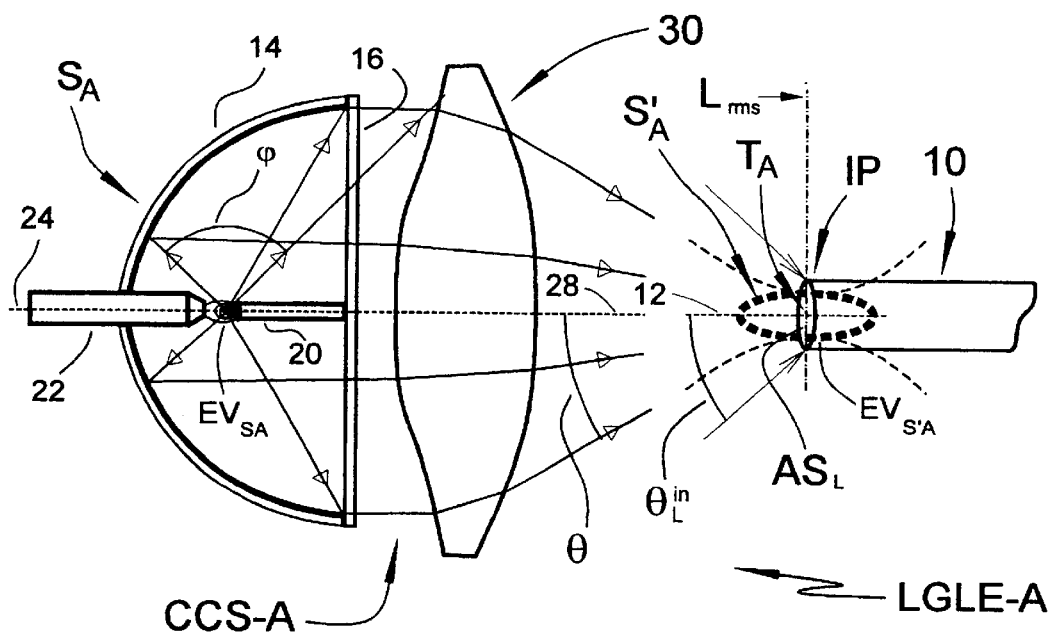
FIG. 1 schematically illustrates a prior art, LGLE-A.

In order to better understand the preferred embodiments and methods of this invention it is desirable to review examples of the prior art, as described with reference to FIGS. 1–5. Further, throughout the detailed descriptions substantially identical elements will be referred to by identical reference numerals for clarity.

Reference is now made to FIG. 1 of the drawings which shows an often-used, prior art, LGLE-A (see for example U.S. Pat. No. 5,491,765) illuminating in an axial symmetric manner the round collection aperture of the acceptance surface $AS_L$ of the input port IP of an axial symmetric, constant diameter LG 10 having an acceptance angle $\theta_L^{in}$ and an optical axis 12. For a constant cross sectional LG, the emission aperture of its output port is identical to the collection aperture of its input port so that the effective target $T_A$ for this particular type of LGLE is effectively the input port IP. Its maximum acceptance angle $\theta_L^{in}$ is defined as the maximum acceptable incident angle for the LG 10 above which the energy transmission losses becomes unacceptable.

Note that, although each LG's input port will typically be configured differently, each input port still has, for example, a respective effective entrance surface, entrance aperature (=outline of entrance surface) and acceptance angle. Therefore, where it is appropriate, and to simplify the comparing and contrasting of the prior art with the preferred embodiments of this invention, letter descriptions with optional subscripts and/or superscripts are used, instead of numerals, to describe significant functional parameters of the given systems. In addition, where applicable, similar reference numerals and literal's will be used to label similar components throughout the description. In addition, the use of a notation subscript '$_i$' associated therewith represents a plurality of similar items. Also all angles labeled 'θ' with their various sub- and superscripts, are considered to be respective maximum half cone angles that are defined at their respective far field position, unless noted otherwise. They can also have a dependency (typically not stated) of a respective azimuth angle Ψ, i.e. θ(Ψ). The sum of all angles θ of interest form a respective solid angle 'Ω' and an associated angular dependent beam shape that is defined as an appropriately chosen, constant energy density, contour line of the respective angular dependent energy emission or acceptance function.

Parameters like the étendue E, étendue efficiency EE, throughput efficiency TE and delivery efficiency DE, which are used throughout this invention to characterize LE's, are defined and discussed below after a more detailed review of the related prior art.

The source $S_A$ is shown in FIG. 1 as a sealed, composite reflector lamp (for example CERMAX™ type lamp) having a parabolic reflector 14, a transparent envelope-forming window 16 and an emission volume $EV_{SA}$. The sealed cavity formed by the reflector 14 and the window 16 is filled with a suitable energizable gas. Electrical DC current is fed to the cathode 20 and anode 22 (also referred to as electrodes 20 and 22) energizing the gas between the tips of the non-identical electrodes 20 and 22. The resulting electromagnetic radiation emitting emission volume $EV_{SA}$ has a spatial, angular and spectral dependent emission energy density function whose spatial dependent contour surfaces of equal emission intensity are typically shaped like an elongated teardrop, as indicated in FIG. 1. The maximum exit divergence angle is θ.

The emission maximum of the volume $EV_{SA}$ is located close to the tip of the cathode electrode 20. The emission volume $EV_{SA}$ typically has a quasi cylindrical symmetry axis which is also called source axis 24, that is formed by the electrode tips of the cathode 20 and anode 22. The angular dependence of the energy emitted from the volume $EV_{SA}$ is typically axial symmetric to the source axis 24. In a plane containing the electrodes 20 and 22, however, the radiation escaping from volume $EV_{SA}$ is partially blocked by the tips of the electrodes 20 and 22 resulting in the limited angular emission angle φ orthogonal to the source axis 24.

FIG. 1 is utilized to show the common implemented prior art design solution of an on-axis LGLE where the source axis 24 coincides with the optical symmetry axis, also called system axis 28 of a parabolic reflector 14, and where the emission volume $EV_{SA}$ is located near the focus of the parabolic reflector 14. The collected and reflected source energy thus exits the sealed lamp window 16 as a substantially parallel, slowly diverging energy beam which gets focused by a concentration system 30, for example a lens, into a secondary source $S'_A$ having the emission volume $EV_{S'A}$. Together, the parabolic reflector 14 and the concentration system 30 effectively form a collection and concentration system A (CCS-A) with a system axis 28 for energy emitted from the volume $EV_{SA}$ of the source $S_A$. This axial symmetric CCS-A concentrates with a maximum concentration angle θ the collected source energy into a substantially (spatial and angular) axial symmetric beam at the axial focus location $L_{rms}$ along the system axis 28 where the rms-diameter $D_{rms}$ (root mean square diameter) of the free traveling energy beam is at its minimum. This axial focus location $L_{rms}$ is also the center location of the emission volume $EV_{S'A}$ of the secondary source $S'_A$.

The combination of the CCA-A with the emission volume $EV_{S'A}$, the electrodes 20 and 22 and the envelope forming window 16 form the respective MLE-A, which, together with the LG 10 forms the respective LGLE-A. For best energy coupling into the LG 10 its input port IP is positioned inside the emission volume $EV_{S'A}$.

Figure 2:
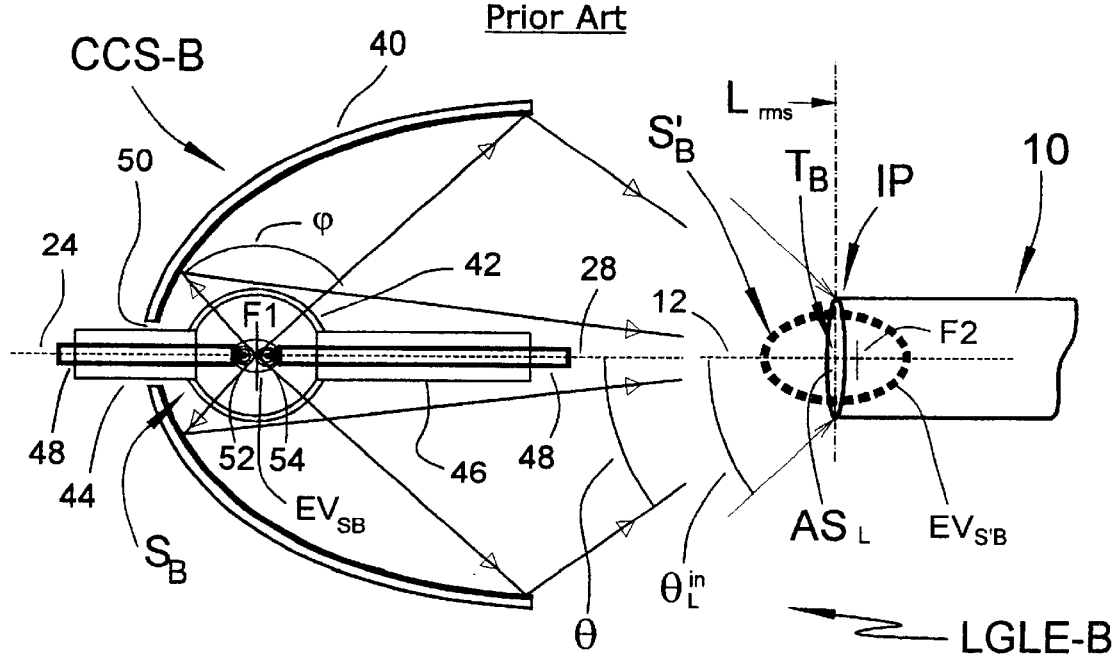
FIG. 2 schematically illustrates another prior art, LGLE-B.

FIG. 2 shows a different kind of a commonly used, prior art, LGLE-B illuminating the input or acceptance surface $AS_L$ of a constant cross section LG 10 having a symmetric angular dependent energy acceptance function. Again, its acceptance surface $AS_L$ is the effective target $T_B$ of the LE-B. The respective CCS-B is now made of an axial symmetric portion of an ellipsoidal shaped reflector 40 having an axis of rotation that is also the system axis 28 of the CCS-B. The source $S_B$ is shown here as an emission volume $EV_{SB}$ enclosed by a transparent single envelope lamp which has an inner envelope 42 through which the electromagnetic energy escapes and which encloses a suitable energizable gas. Some types of lamps are double envelope lamps that have a transparent outer and inner envelope through which the energy escapes. The respective reflector 40 can also optionally be enclosed with a safety window protecting against lamp explosion hazards thus forming effectively an outer envelope and a double envelope lamp.

A first lamppost 44 and a second lamppost 46 have a gas tight seal between two (symmetric AC-arc) electrodes 48 and the envelope 42 and facilitate the mechanical mounting of the source $S_B$ respective to the reflector 40. A hole 50 in the ellipsoidal reflector 40 allows proper positioning and mechanical securing of the source $S_B$ along the system axis 28. The source $S_B$ and the CCS-B form the MLE-B of the respective LGLE-B.

In contrast to the DC-type source $S_A$ shown in FIG. 1, the AC-type source $S_B$ in FIG. 2 has two electrodes 48 having substantially similar tip configurations that are energized by an alternating current. This effectively makes the tips of both electrodes a cathode tip about every other half current cycle. Thus, the emission volume $EV_{SB}$ of the resulting time averaged plasma source has two spatially separated emission maximas, one for each, partially overlapping, sub-volume 52 and 54. Each of these sub-volumes has an emission maximum close to a different electrode tip. The double peaked emission volume $EV_{SB}$ is obtained through the time averaged spatial superposition of both alternatively emitting sub-volumes 52 and 54.

Figure 3A:
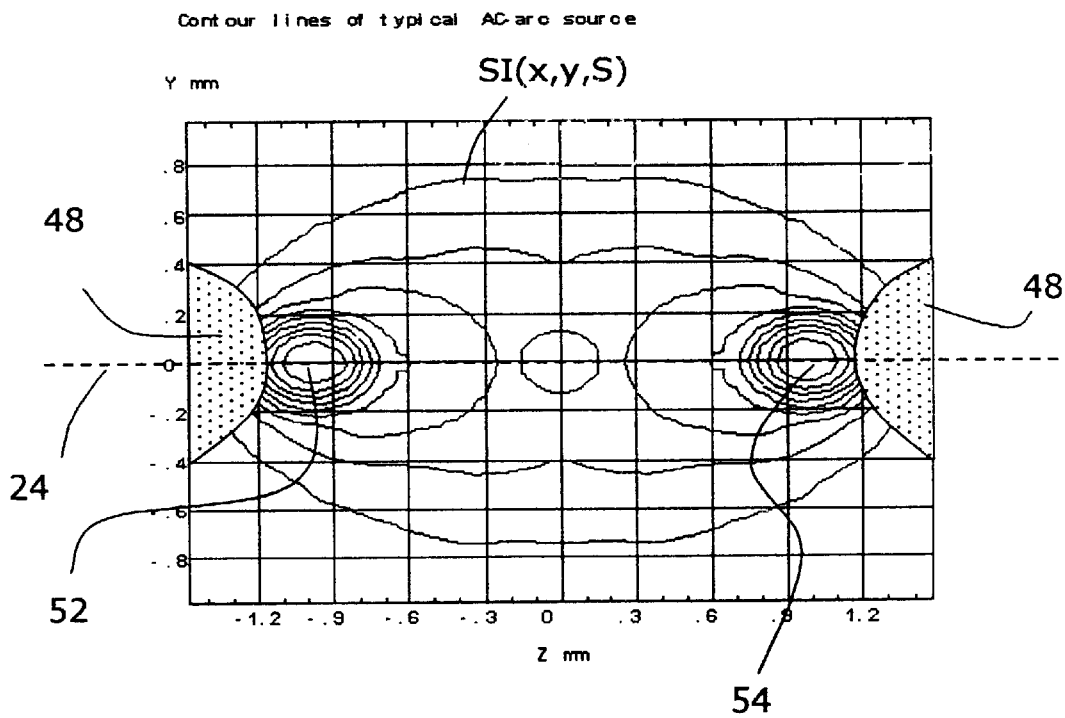
FIG. 3A graphically shows a peak normalized contour map of regions of equal intensity for a typical AC-arc source as shown in FIG. 2.

FIG. 3A graphically illustrates an example of spatial dependent energy emission intensity distribution SI(x,y;S) by showing the contour lines of equal emission intensity observable with a typical AC-arc source $S_B$, like that shown in FIG. 2, in a plane containing the source axis 24 and transecting the emission volume $EV_{SB}$. Also shown are the two superimposed tip images of the AC-arc electrodes 48 that block some of the light emission. Note that for many DC- or AC-type arc lamps the shape these contour lines depends strongly on the spectral bandwidth of the detection system. Often their shape also depends on the effective age and number of starting pulses of a given arc lamp and the spatial orientation of the lamp axis 24 with respect to a gravitational and/or electromagnetic force field. This often leads for MLE-A and MLE-B designs to spatial and/or angular lamp-age dependent color variations at the focus of the CCS output beam and therefore at the output of LG 10. In particular for metal halide type lamps such spatial dependent color variations are quite common.

Referring once again to FIG. 2, the radiation from the volumes $EV_{SB}$ is collected by the reflector 40 and concentrated into the emission volume $EV_{S'B}$ of the secondary source $S'_B$, thus illuminating the input port IP of the LG 10. The intensity distribution inside the volume $EV_{S'B}$, i.e. near the respective axial focus location $L_{rms}$ depends also on where the two sub-volumes 52 and 54 are located with respect to the first focal point F1 of the ellipsoidal reflector 40. Thus for a given elliptical reflector 40, LG 10 and source $S_B$, the axial position of the emission volume $EV_{SB}$ needs to be optimized to achieve maximum coupling into a given LG 10. This is true for both LGLE-A and LGLE-B type designs optimizations and independent on the type of the source choice.

Figure 3B:
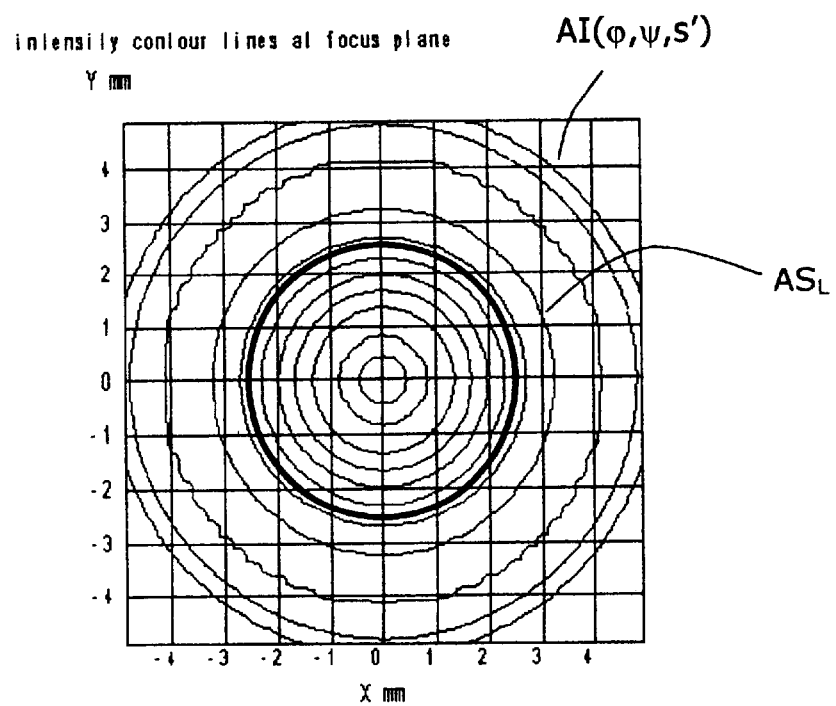
FIG. 3B graphically shows a peak normalized contour map at an axial location $L_{rms}$ for the prior art LGLE shown in FIG. 2.

FIG. 3B shows graphically the theoretical best performance of the prior art LGLE-B of FIG. 2 optimized for the below described system parameters and for coupling light into a round aperature or LG 10 having an diameter of 5 mm and a maximum acceptance angle $\theta_L^{in}$=30 deg. FIG. 3B shows contour lines of equal collection intensity of the angular dependent energy density function AT(φ, ψ; S') at a plane perpendicular to the system axis 28 located the axial energy focus location $L_{rms}$. For the parameters chosen, this is also the best location of the input port IP of the LG 10. The collection aperture CA(x,y;S') of the input port IP is shown in FIG. 3B as a thick circular line enclosing the area $AS_L$=19.6 mm².

The axial symmetric, AC-type, volume source $S_B$, that has been used to generate the data shown in FIG. 3B, has the same energy emission density function as the one used to generate the data for FIG. 3A. The same source has been used throughout this description to compare the étendue performance of different MLE's for the same source $S_B$. The spacing of the tips of the two electrodes 48 is assumed to be 2.35 mm and the separation between the emission maximas of the sub-volumes 52 and 54 is 2 mm. The envelope material is assumed to be quartz with a refractive index of n=1.46. The source envelope 42 is assumed to be spherically shaped with a 12.5 mm outer diameter and a 1 mm wall thickness. The lampposts 44 and 46 are assumed to have a cylindrical shape with a length of 30 mm and a diameter of 9 mm. The modeled ellipsoidal reflector 40 has a first (second) focal point F1 (F2) at a distance of 8.5 mm (100 mm) from the left vertex point of the reflector 40. The total reflector length is 50 mm. Both sub-volumes 52 and 54 are positioned symmetrically with respect to the first focal point F1 of the reflector 40. For the parameters given, an asymmetric positioning of the volume $EV_{SB}$ with respect to the focal point F1 does not increase the amount of light that can be collected into a 5 mm round aperature.

The resulting energy beam has a minimum beam rms-diameter $D_{rms} \approx 3.1$ mm at the axial energy focus location $L_{rms} \approx 95$ mm from the vertex of the reflector 40 and a divergence angle $\theta \approx 28$ deg which is within the numerical aperature $NA_L^{in} = \sin(\theta_L^{in}) = 0.5$ of the chosen LG 10. Since all angular exit energy density functions of the MLE's discussed in this description do not have well defined cutoff points, all respective divergence angles $\theta$ have been arbitrarily defined (using a ray-tracing system model) as the maximum respective divergence angle that encloses 99% of the energy.

Figure 4:
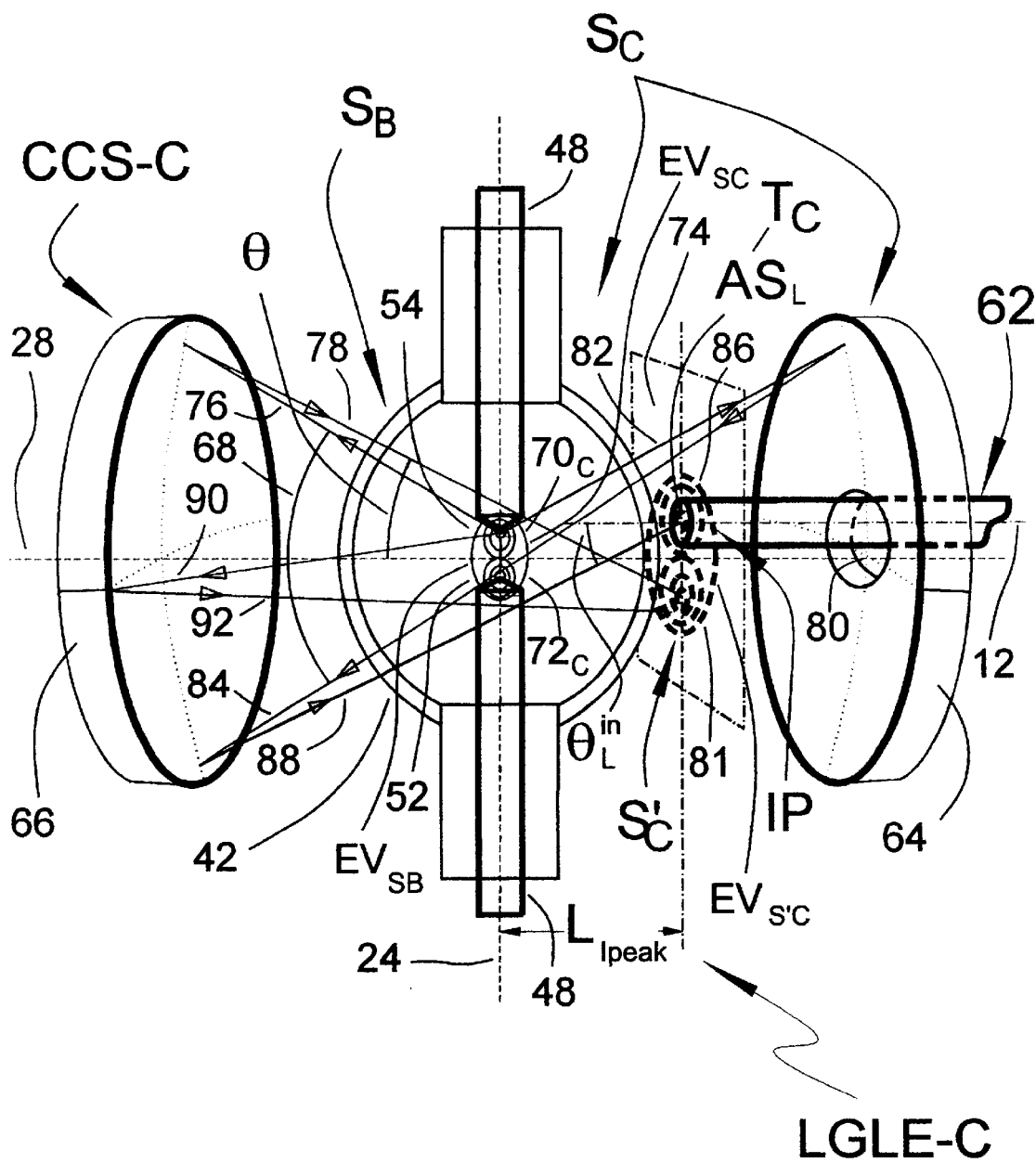
FIG. 4 graphically/pictorially illustrates a prior art LGLE-C where collected source light is focused through a source envelope onto a LG.

Note that both the respective CCS-A and CCS-B systems are non imaging type system which due the collinear arrangement of the two symmetry axis 28 and 24 produce a substantial axial symmetric beam independently of the spatial and angular emission characteristics of an axial symmetric source $S_A$ located near its respective focal point FIG. 4 shows another example of a prior art, LGLE-C illuminating the acceptance surface $AS_L$ (target $T_C$) of a small LG 62 with an AC-type reflector source $S_C$ which is comprised by the concave retro-reflector 64 and the AC-type source $S_B$. This design is discussed in U.S. Pat. No. 5,509,095.

In this prior art embodiment, a concave primary reflector 66 collects light escaping the reflector source $S_B$ within a solid angle 68. This angle is determined primarily by the location of the emission volume $EV_{SB}$ of the source $S_B$ with respect to the reflector 66, the extent of its reflective surface and the angular dependent emission energy density function of the source $S_B$. Light that escapes the emission volume $EV_{SB}$ in a direction opposite to the reflector 66 is collected by a retro-reflector 64. This reflector 64 produces effectively an inverted mirror image of the emission volume $EV_{SB}$ so that the vertically inverted image of the sub-volume 52 is superimposed onto the sub-volume 54, thus forming an effective sub-volume $70_C$ and vice versa forming an effective sub-volume $72_C$. The spatial superposition of both sub-volumes $70_C$ and $72_C$ forms the emission volume $EV_{SC}$ of the resulting reflector source $S_C$ comprised by the source $S_B$ and the reflector 64.

The energy collected by the reflector 66 is focused back through the envelope 42 into the emission volume $EV_{S'C}$ of the secondary source $S'_C$ which is located at a (quasi) image location $L_{Imax}$ near and to the right of the outer surface of the envelope 42, i.e. opposite to the reflector 66. The image inverting and image magnifying reflector 66 forms the CCS-C of the LGLE-C, thus generating a vertically inverted, magnified and somewhat distorted image of the emission volume $EV_{SC}$ i.e. the secondary emission volume $EV_{S'C}$. The location $L_{Imax}$ is typically defined as the axial coordinate of the image plane 74 which bisects the emission volume $EV_{S'C}$ and contains the intensity maximum of the concentration beam. This image plane 74 is a plane perpendicular to the system axis 28 of the CCS-C. A hole 80 in the reflector 64 allows the positioning of the acceptance surface $AS_L$ of the LG 62 near the maximum intensity location $L_{Imax}$ inside the emission volume $EV_{S'C}$.

Still referring to FIG. 4, ray 76 represents the most vertical emitted ray by the sub-volume 54 that reaches the usable mirror surface of reflector 66. Note that the vertical emission is partially blocked by the tips of the respective electrodes 48 leading typically to an axial asymmetric angular energy density function of the concentration beam. After reflection at the reflector 66, the ray 76 turns into reflected ray 78 which travels again through the envelope 42 and intersects the sub-volume 81 of the emission volume $EV_{S'C}$. Ray 82 represents the most vertical ray that reaches the usable mirror surface of reflector 64 starting from sub-volume 54. After reflecting at mirror 64, the reflected ray 84 is directed into the sub-volume 52. The resulting inversion of the vertical off-axis ray positions is due to the image inversion effect of the reflector 64 (orthogonal magnification of retro-reflector $M_o = -1$) which thus modifies the emission from the sub-volumes 52 and 54 to yield the sub-volumes $70_C$ and $72_C$ of the effective reflector source $S_C$. Continuing its path through the sub-volume 52, ray 84 reaches the primary reflector 66 which reflects the resulting ray 88 into the sub-volume 86 of the emission volume $EV_{S'C}$. In the same manner, a ray 90 is shown in FIG. 4 that intersects the primary reflector 66 at the most horizontal extension of its usable mirror surface. The resulting reflected ray 92 is transmitted back through envelope 42 to the sub-volume 81. Note that the rays 78 and 92 in general do not overlap at the image plane 74. This is a result of the optical distortions caused by the source envelope 42 to the secondary source image resulting therefore in some étendue loss.

In contrast to the non-imaging type LGLE-A and LGLE-B, shown in FIG. 1 and FIG. 2, the source axis 24 of the source $S_C$ and $S_B$ of the LGLE-C, shown in FIG. 4, is oriented orthogonal to the system axis 28 of the CCS-C. This allows the primary reflector 66 to act as a slightly magnifying, image inverting system resulting in the quasi-imaging, peak intensity maximizing, LGLE-C.

In the prior art design LGLE-C shown in FIG. 4, a ray emitted from the source $S_B$ is transmitted through the surface of the envelope 42 either three or five times (depending upon whether the ray encounters first the reflector 66 or the reflector 64) before reaching the image plane 74. Together, with the optical properties of the envelope 42 and additional Fresnel losses due to extra bulb transmissions, this results in a smearing out of the source image, i.e. emission volume $EV_{S'C}$, which thereby contributes to the limiting of the maximum achievable peak intensity $I_{max}$ and related energy collection ability of this MLE design. Further, the tips of the electrodes 48 block a portion of the light traveling multiple times through the envelope 42. As will be shown below, this reduces further the delivery efficiency DE and étendue efficiency EE of such a LGLE.

Figure 5:
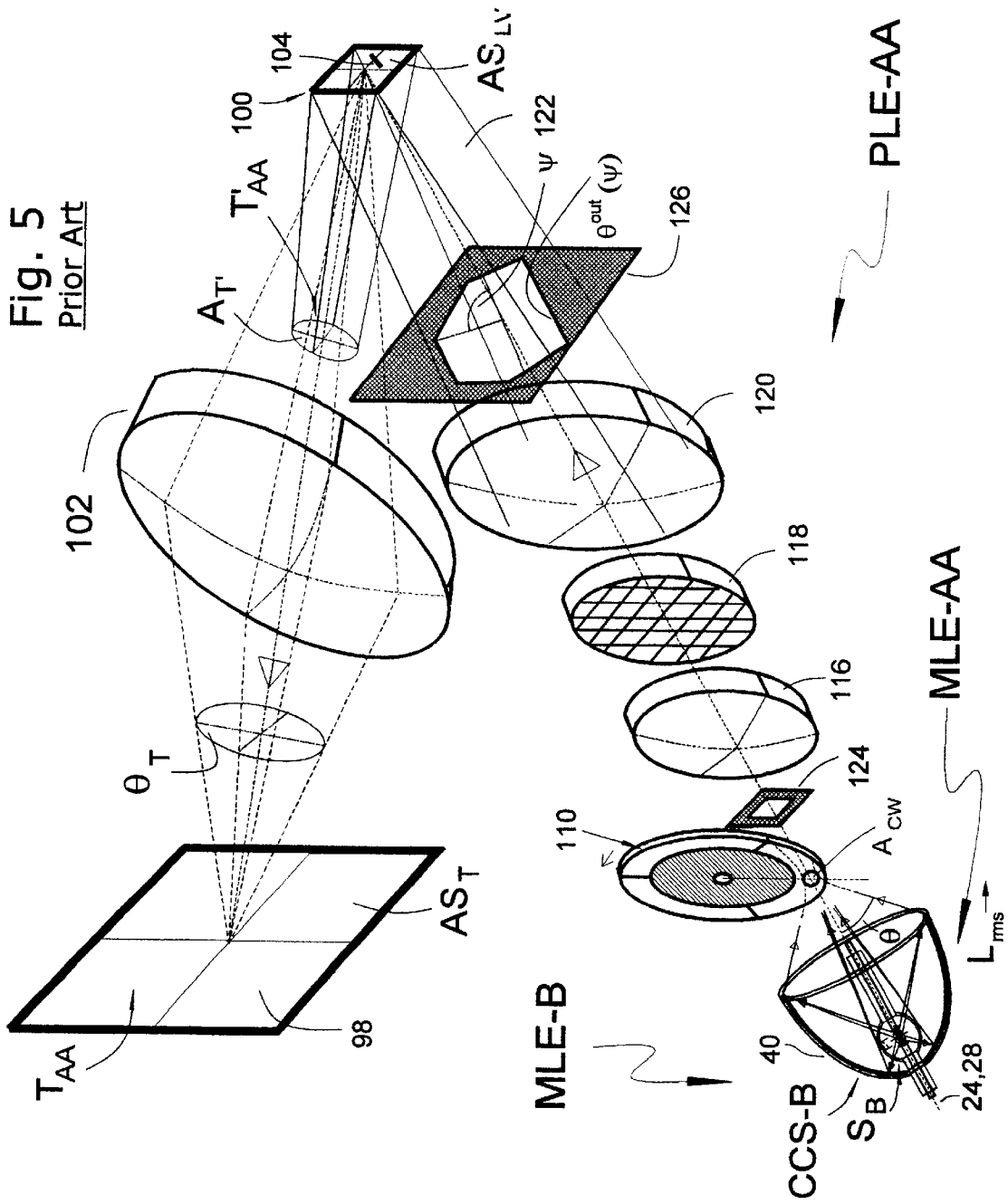
FIG. 5 pictorially shows a prior art PLE-AA.

FIG. 5 summarizes a typical, prior art, PLE-AA that illuminates a projection screen 98 as target $T_{AA}$. The single LV 100 (shown here as a reflective type LV) is a key optical element of this type of LE and needs to be illuminated very uniformly and with the right balance of red, green and blue color intensities. A projection lens 102 collects the output of the LV 100 and focuses a magnified LV intensity image onto the projection screen 98. The LV 100 is shown in FIG. 5 with an optional preference axis 104. For example, in the case of a DMD™ or TMA™ (manufactured by Texas Instruments or Daewoo Electronics, respectively) type LV 100, the axis 104 is the hinge or tilt axis direction of the individual mirror elements.

The MLE-AA shown in FIG. 5 illuminates a color wheel 110. To show that some of elements shown in FIG. 5 can be the same as those shown in FIG. 2, the same letter extension, i.e. '-B', is used (instead of '-AA') to label these elements. The circular area $A_{CW}$ represents the intersection of the beam exiting the CCS-B with the color wheel 110 that is located at approximately the respective axial energy focus distance $L_{rms}$. The symmetric or asymmetric color wheel 110 limits in a time dependent periodic manner the spectral energy that can be transmitted to the intermediate target area $A_T'$ and is also used to spectrally reformat the beam 122 so that in combination with the chosen operation mode of the LV 100 a chosen white point and color gamut can be achieved at the projection screen 98.

The transmitted beam portion is being collected by a collection lens 116 and transmitted to an optional integrating system 118 which serves primarily as beam homogenizer and optional beam cross sectional shape converter (for example an étendue inefficient ABT for round into rectangular beam shape converter). Often either a lens or phase array pair or a solid or hollow rectangular, non-tapered, rigid light guide is used as beam intensity integrator. Typically such integrating symmetric beam transforming light guides have a cross sectional shape that is substantially similar (except for a linear scaling factor and a fixed over fill distance) to that of the LV 100.

A coupling lens system 120 (SBT) concentrates the thus resulting illumination beam 122 onto the imaginary intermediate target $T_{AA}$ that has a minimum beam cross sectional area $A_T$. The target location of the intermediate target $T_{AA}$ is chosen as the best compromise between illumination uniformity and maximum light level at the projection screen 98 for selected system constraints and is typically chosen to be located between the acceptance surface $AS_{LV}$ of the LV 100 and the entrance pupil of the projection lens 102.

Two optional masks 124 and 126 are shown in FIG. 5. The mask 124 is located near the exit side of the color wheel 110 and its image is projected with SBT's onto the rectangular shape of the LV 100, thus limiting the amount of excess energy that hits the surrounding area of the LV 100. Note that due to 'Scheinplug'-optical effects, i.e. non-normal incident mode operation for a LV 100, the respective mask 124 and/or 126 can have a somewhat different shape (for example resulting in a trapezoidal shape arising from tilting a mask in two orthogonal axis and then projecting it onto a plane.) than the collection aperture of the LV 100 even while a SBT is used to map one shape into the other. A special shaped mask 126, in a proper location of the illumination beam 122 (see U.S. Pat. No. 5,442,414), can also be used to create an axial, asymmetric, angular dependent energy density function $\theta^{out}(\Psi)$ from an axial symmetric input energy beam. This patent also describes the use of ABT to increase the delivery efficiency by turning an axial symmetric beam into a axial asymmetric beam. The azimuth angle $\Psi$ is conveniently measured against the preference axis 104 of the LV.

FIG. 5 only shows the primary optical elements of a prior art PLE-AA needed for a basic understanding of its relationship to this invention. In general, additional optical elements are used to spatially steer the light beam and couple it onto and out of the LV 100. Other type of PLE are being used as well.

In general, the colors emitted from a lamp S are not properly balanced. Therefore, they can not be used without a wavelength dependent attenuation of selected color bands to balance the overall intensity of the respective color channels for generation of a proper white point and color gamut. In particular, many types of lamps used for PLE are either blue or red starved so that special systems design choices have to be made to find the overall optimum solution within a given product design constraint. Therefore, analog to a throughput efficiency of a color wheel, one can define a color efficiency which represents the ratio of light intensity available after color balancing to the total available light before color balancing. Since most PLE's are being used to generate nearly true color images their design is not only constrained by the total minimum amount of deliverable light, i.e. lumens, but also by the minimum needed color gamut range and the acceptable constraints for white point selection. Some types of PLE designs (three chip system, etc.) are also limited by the available filter manufacturing technology and other physical design constraints. In general, a PLE designer can tradeoff color fidelity for maximum screen brightness. However, this additional design constraint causes in general further delivery efficiency losses.

Therefore in order to optimize a LE for a given target application and given design constraint one must foremost consider to optimize the delivery efficiency of a LE. In many cases étendue efficiency EE, color efficiency and throughput efficiency TE are major limiters to achieve maximum delivery efficiency for cost and performance constraint designs.

The light transportation or radiant power transfer efficiency of a LE and of its optical sub-components can be characterized with a parameter called étendue. The étendue can be interpreted as pure 'geometrical extend' of the spatial and angular physical size of an optical beam and is, per definition, a monochromatic figure of merit that depends only on the integrated energy inside wavelength region of interest.

To illustrate, the simplest case of a source and detector having a perpendicular oriented flat emission or acceptance surface is described here. General LE performance parameters are defined based on this example. The description can be extended to include curved surfaces and volume sources/detection systems by those skilled in the arts.

The underlying concepts of this invention are best understood by first considering the special case of a homogeneous emitting surface source S (for example, a Lambertian surface emitter) oriented perpendicular to its main emission energy propagation axis. (To derive the étendue of non homogenous sources appropriate weighted summations can be performed of appropriately chosen types of homogeneous sources). The source étendue $E_S$ of the light beam emitted by such an homogeneous emission surface $ES_S$ within a solid angle $\Omega$ is defined in many optics books that deal with radiometry by the following expression $$E_S = n \int_{ES_S, \Omega} \int \cos(\phi) dA d\Omega \quad (1)$$

where n is the refractive medium at the emission side of the emission surface $ES_S$. The integration angle $\phi$ is the angle between the normal to the surface element dA and the central ray of the solid angle element $d\Omega$. The double integral is to be performed over all surface elements dA and all solid angle elements dΩ of interest.

For special cases where the investigated beam has a homogeneous, elliptical shaped, angular dependent energy density function, equation (1) yields the following simplified relationship:

$$E_S = \pi * A_e * n^2 * \sin(\theta_h) * \sin(\theta_v) = \pi * A_e * NA_{e,h} * NA_{e,v}, \quad (2)$$

where $A_e$ is the effective surface area of the emission surface $ES_S$. $NA_{e,h}$ and $NA_{e,v}$ represent the effective horizontal and vertical numerical aperture of the emitted beam with either the vertical or horizontal axis being parallel to the major axis of the ellipsoidal angular emission pattern. The angle $\theta_h$ and $\theta_v$ represent the maximum horizontal and vertical emission angle θ inside the medium having the refractive index n at the exit side of the emission surface $E_{SS}$. Equation (2) can often also be used to approximate the exact étendue value of a non-uniform emitter by using effective (average) values for the emission area $A_e$ and angles $\theta_h$ and $\theta_v$. Volume sources can also approximately be described by their effective exit surface.

Light emitted from a source S can be intercepted by a perpendicular orientated acceptance surface $AS_S$. In the case that the light beam of interest and the energy acceptance function of the surface $AS_S$ are spatially and angularly homogenous, analog to the emission case, a collection étendue $E_c$ and an associated acceptation surface $AS_S$ is defined with a respective collection area $A_c$ that collects the energy beam of interest. By interchanging the appropriate values in equation (1) or (2) the collection étendue $E_c$ can be determined in dependence of a given acceptance surface $AS_S$ and its spatial location and orientation. Thus for a given available collection surface area AS intersecting a given beam at a predetermined location and angular orientation, one can calculate how much of the available energy of the incident light beam can maximally be collected and/or where a given collection surface should best intersect the light beam, i.e. be spatially and angularity located, for maximum energy collection.

For each free traveling beam there exists at least one acceptance surface where the collection étendue $E_c$ is at its minimum and where its associated collection area $A_c$ is also at its minimum. Such a surface is called in this invention a Minimum Étendue Surface (MES). The MES can also be interpreted as the most efficient (smallest) collection surface that allows collections of a given portion p of the total available beam energy.

Curved surfaces and volume emitters, as well as curved surface and volume detectors are slightly more complex to calculate. One of the main reasons for this increased complexity is that all optical systems have a different orthogonal and longitudinal magnification. For small distances, compared to the effective focal length of the respective optical imaging system, the longitudinal magnification $M_l \sim M_o^2$, with $M_o$ representing the orthogonal magnification. This means that the larger the orthogonal magnification $M_o$ (=image distance/source distance) is, the greater is this extended source volume effect. Therefore, one has to pay special attention when comparing the performance of different optical systems operating at different numerical apertures and orthogonal and longitudinal image magnifications.

A first preferred embodiment of this invention provides a method to determine the MES for a given focussing beam. This method can either be applied to a ray data set provided by a suitable ray-tracing program or to a real light beam. To find the respective theoretical smallest collection surface comprising one or more spatial isolated surface islands, with each such island possibly being a curved surface oriented in a different direction dependent of a given total collection energy, the respective beam data need first to be 'voxelized' (voxel=volume pixels) in three dimensions in a region surrounding the minimal beam waist region of a given beam. Preferably the respective voxel shape is that of a rectangular tube, and all voxels have the same shape and volume and are sufficiently small to allow sufficient spatial resolution for the given task at hand. To increase the computing efficiencies for a given minimal spatial or power resolution the longitudinal length, width and height of a voxel are best matched to the respective spatial dependent gradient of the intensity I, i.e. dI/dx, dI/dy and DI/dz.

After a proper choice for the respective three dimensional voxel-mapping method of the receptive spatial region of interest, the total integrated energy falling onto the front surface of each voxel needs to be determined. Often only a specific range of spectral energy and/or angular divergence angles is of interest for the application at hand. In that case, only the energy of rays falling inside the predetermined acceptable angular and spectral limits is to be integrated over the respective voxel collection area.

In the case of calculated ray data the rays are to be traced to a first voxel cross sectional plane and the energy falling onto each respective collection aperture (voxel entrance area) is to be determined. Also for each voxel a respective collection étendue value and average beam direction is ideally calculated which accounts both for the collection area of the voxel and the angular distribution of the incident beam below the detection/limiting angle threshold of the respective voxel.

In the case of a focussing light beam, the beam needs to be spatially sampled with a respective spectral band pass and/or angular divergence limiting measurement method in a first x-y plane orthogonal the z-axis. Possible conventional intensity mapping methods are single point scanning and 2D detector systems, like an x and y scanning pinhole, a scanning single optical fiber, a rotating drum with multiple, differently orientated knife-edges, or an array detector (for example a CCD), a photographic system, etc. Preferably, a linear energy measurement method is being used. If that is not possible, the raw data can be corrected for the nonlinear detector response function to derive at the respective total incident and collectable energy for each voxel. Next this 2-dimensional pixelated collection surface is shifted along the z-axis until the next voxel plane begins and the above-described process is repeated. In this manner a three dimensional map is created describing the intensity distribution I(x,y,z) of the beam near its minimum beam waist.

Next the voxel with the highest collection value is found and labeled as a first allowed voxel. In the simplified case discussed here, where the MES has the restriction that it is blocking along its z-axis, all voxels having the same x and y coordinate (z-row) and all voxels that are inside the respective beam divergence and/or pixel acceptance cone angle (as viewed from this first allowed pixel) are labeled as unallowed and need be eliminated from the data set together with the first allowed voxel. This basically removes a conical volume of voxels having its tip located at the first allowed voxel.

Note that for intensity distributions having two or more focuses axially in series, the above describe voxel blocking method, i.e. the particular selection and elimination of unallowed (shadowing) voxels respective to a allowed voxel) would prevent finding a respective MES solution.

This is the case, for example, for a MLE-B with an AC-type source. The elimination of the unallowed voxels from the data set, has therefore, to be correlated to the type of MES solution one is interested in finding, i.e. blocking, partial blocking, local blocking mode, etc.

The entrance surface of the first voxel is the projection of the respective MES in the respective average energy propagation for a collection étendue value or power value that is not more than the collection étendue or power level of the respective first allowed voxel. The MES preferably has a surface normal that is parallel incident main propagation direction of the sub-beam and has a spatial extent such that its projection onto the voxel input area is the entrance surface of the voxel.

In the next step, the highest collection value is again searched for from the remaining data set and labeled the second allowed voxel. Then all associated respective unallowed voxels together with the second allowed voxel are again eliminated from the data set. Similarly, from the respective beam propagation axis's and the resulting projections onto the collection surface of the first and second allowed voxel determines the MES for the case where the total collection étendue or power level is less than the sum of the collection étendue of the first and second allowed voxel. By continuing in this manner a blocking MES can be determined which is dependent upon a given collection power level and/or collection étendue for a given spatial intensity distribution and incident angular dependent energy density function and a maximum angular and spectral dependent acceptance function of the MES.

A calculation method extending the above teaching to include the case of non-blocking MES and/or obvious variations of this method, such as non identical voxel sizes and/or shapes or voxel power level determination, etc. can be performed by those skilled in the art and these extensions are also included as part of this invention. For example, the presorting the voxel data according to their z-coordinates and power level, etc. can aid in speeding up the calculation process.

The radiance (energy) conservation theorem for passive optical systems states that the étendue value of the light beam cannot be decreased when it is transmitted through an ideal optical system, i.e. $E_c \geq E_S$. Just like the entropy of a thermodynamical system, once the étendue of a light beam has been increased (for example by using a specific CCS or LG), it cannot be decreased again, no matter what type of additional passive optical system is being used to further modify the beam's spatial and angular characteristics. That is the reason why the étendue of a given light beam is related to the throughput of a given aperature limited optical system.

To quantify the relative increase of the étendue of a light beam resulting from the transmission of a given power level p through a given i-th optical system, a ratio parameter called étendue efficiency $EE_i(p)$ is defined here as $$EE_i(p) = E^{in}(p)/E^{cmin}(p)/_i \leq 1 \quad (3)$$

where $E_c^{min}(p)$ represents the minimum étendue for the beam exiting the i-th optical system that is necessary to collect a given power level p. Similaryly, $E_S^{in}(p)$ is the minimum respective étendue for a p power level of the input beam. This figure of merit ratio allows the comparison of a given systems 'étendue transmission' performance to that of an ideally performing optical transmission system having EE=1.

Similarly, the throughput efficiency $TE_i(E)$ of a given (passive) optical i-th subsystem for a given input beam is defined as the ratio set forth below $$TE_i(E) = (P^{out}(E)/P^{in}(E)/_i \quad (4)$$

where $P^{out}(E)$ and $P^{in}(E)$ are the amount of maximum light power which is collectable from the output and input beam of the respective i-th subsystem at a given collection étendue value E.

Note that for an active optical systems, for example a fluorescence conversion systems, as discussed below, the power of the output beam in a given wavelength band can be higher under certain circumstances (fluorescence conversion) than for the input beam.

The étendue efficiency EE and throughput efficiency TE of an optical system are related parameters. In the first case, the input power is fixed and the ratio determines how much did the étendue of the input beam increase during a given beams transmission through a given optical system. In the second case, the étendue value E is fixed and the ratio determines how much of the available input power can be transmitted (loss or gained) through a given optical system. These formulas can be expanded as needed to allow characterization of wavelength systems as well.

The delivery efficiency DE of a LE for a given target T and source S is defined here as the ratio set forth below $$DE = P_T/P_S \quad (5)$$

where the $P_T$ represents the total amount of optical power of the illumination light that is both deliverable to and usable by a given target T. Both the emitted type of source energy as well as the beam reformatting ability of a LE often determines how much of the delivered light energy is actually also usable by a given target T, i.e. is within its acceptance specifications. The parameter $P_S$ represents the amount of total optical power emitted by the relevant source S and is used for normalization purposes. This global delivery efficiency DE of a given LE thus characterizes how much of the light emitted by a source S can be coupled to and used by the target T. Similarly, a local delivery efficiency DE can be defined for a given optical sub-system by using instead of $P_S$ its input power level $P_{in}$ as normalization value. The respective delivery efficiency value DE therefore represents the respective efficiency of a LE or of one of it optical sub systems in a straightforward manner.

The LE designs of this invention are based upon the combined recognition of two primary and a third auxiliary concept leading to the preferred key design roles for very delivery efficient LE for étendue limited targets T: 1) use a quasi-imaging and throughput efficient MLE, and then 2), if needed, reshape asymmetrically the angular and cross sectional beam properties with matched ABT's and 3), if needed, also combine it with SBT's for beam scaling and beam steering and non-imaging optic for beam steering and shaping to build a delivery efficient area/angle transforming, remote energy delivery system for more efficient illumination of the target T.

The first concept is based on the realization that in most of the prior art LE's a major part of the biggest étendue and/or throughput efficiency losses occurs at the first beam reformatting stage, i.e. the MLE-stage: typically an asymmetric source S is being transformed into a symmetric secondary source S'. A theoretical analysis of the reasons for the related étendue loss (area increase and/or only partial energy collection and conversion) lead to the first preferred concept that, in contrast to prior art LE's, the CCS of respective MLE should best be both of a quasi-imaging and of a high collection and high étendue efficiency type. Ideally the MLE's should also have the capability to covert at least some of the not usable energy into usable energy, thus forming optionally an active optical system. This lead to the invention of the preferred MLE designs discussed below which does among others a particular good job as ABT for a very étendue efficient angle/area transformation of asymmetric and spatial extended emission sources S into easier manageable, asymmetrically emitting secondary sources S' that have substantially the same étendue as the sources S, but a larger respective cross sectional area/aperature and an associated smaller and easier manageable emission solid angle.

The second concept is based on the realization is that in order to be able to further increase the delivery efficiency of the étendue efficient output beam of a preferred MLE for the predetermined illumination demands of a given target T, further étendue efficient beam reformatting tools are required. A further theoretical analysis showed that none of the equations (1)–(5) limit the shape of the respective collection surface area A or the shape of the respective angular dependent, energy density function of the solid angle $\Omega$. Only the respective total area and total solid angle values count for the étendue evaluation of a beam and only the product of those values is at best preserved. The second preferred concept of this invention is therefore based on the recognition that, in particular for asymmetric beams and/or asymmetric target illumination demands, nonlinear and/or asymmetric shape and/or angle transformations tools are needed. As will be shown below in the description of various preferred embodiments of this invention, properly matched ABT design solutions (in particular hollow or solid light guides with special input and output port preparations) can often be found. When these preferred beam reformatters (which can be designed to be very étendue efficient for specific design constraints) are matched to a preferred MLE and a target T, LE can be designed that have a much higher delivery efficiencies than previously possible for étendue limited targets.

The third (auxiliary) concept of this invention arises from the recognition that input and output ports of respective ABT's and specifically of LG's can be manufactured and/or combined with auxiliary optical imaging and/or non-imaging elements in such a way that, when necessary and/or desired multiple beam reformatting and (local) beam steering capabilities can be combined with remote energy transport and/or area/angle conversion capability. This is useful in making compact high efficiency LE customized for specialized illumination tasks.

Since inefficiencies of prior art LE occur at multiple stages, the various embodiments of this invention discussed below show how selected stage of a LE can be improved and how the different elements can be combined to form delivery enhanced MLE, LGLE, ABTLE, PLE, etc.

Figure 6:
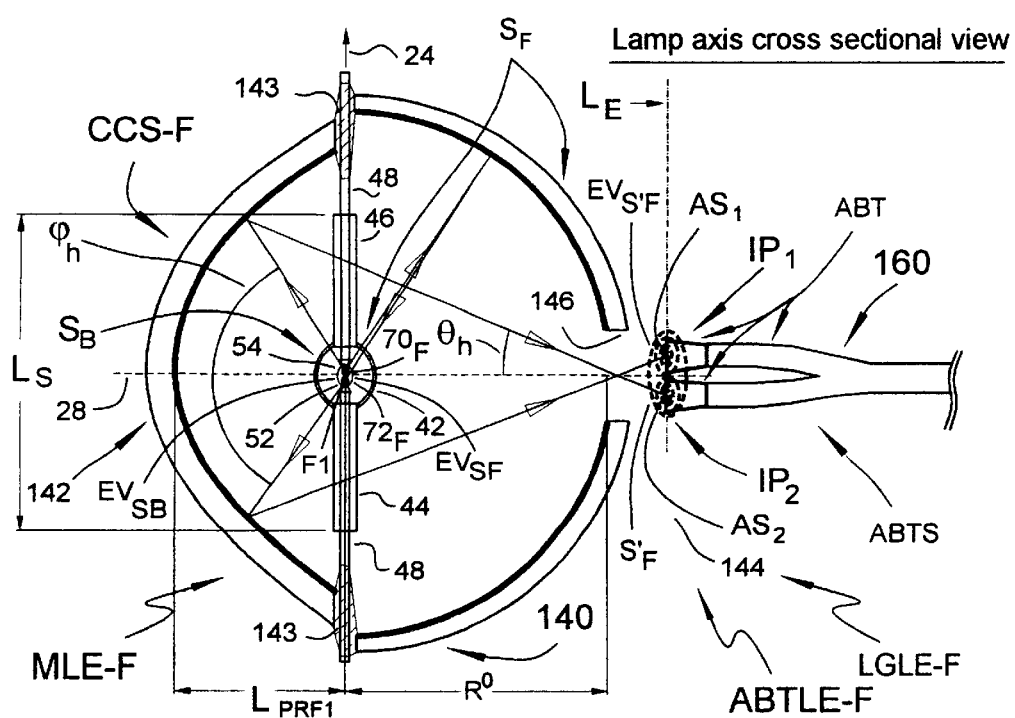
FIG. 6 shows a side cross sectional schematic view of a MLE-F and LGLE-F of this invention with improved étendue efficiency where the source energy is focused around the source envelope and onto a LG with specially matched input ports.
Figure 7:
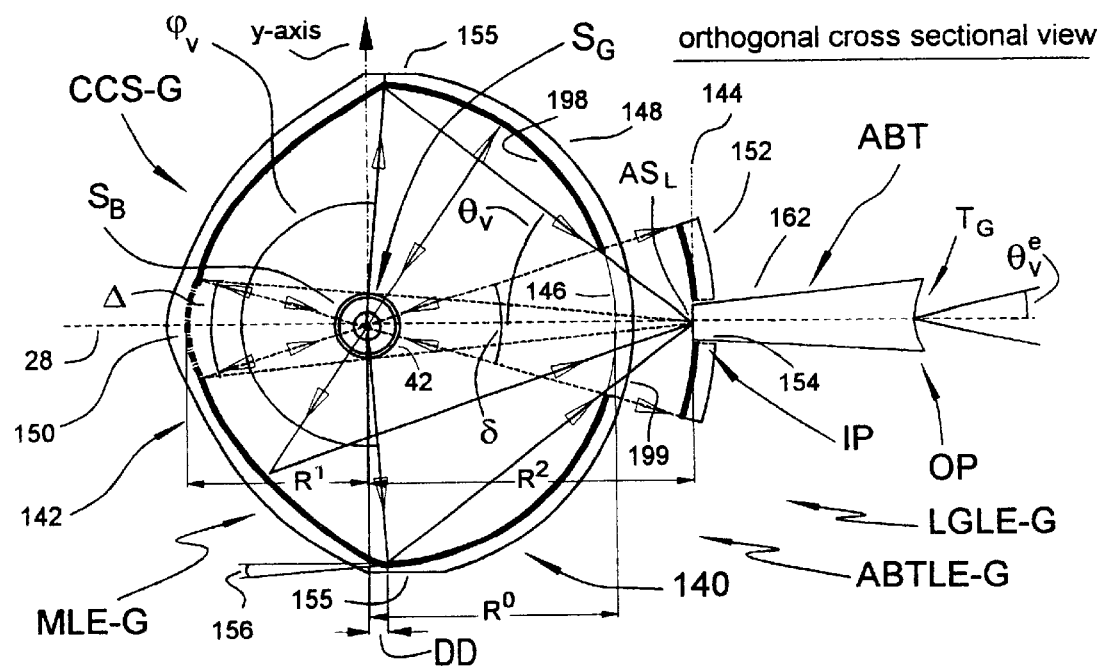
FIG. 7 shows a top cross sectional schematic view of different embodiments MLE-G and LGLE-G/ABTLE-G of this invention.

The basic concept of an étendue efficient MLE according to this invention is shown in FIGS. 6 and 7. FIG. 6 depicts a horizontal (lamp axis plane) cross sectional view for one group of preferred embodiments and FIG. 7 illustrates a vertical cross sectional (plane orthogonal to lamp axis) view of a respective MLE for another group of preferred embodiments. The basic preferred MLE design shown in both FIGS. 6 and 7 of the drawings differs from the prior art MLE thereby enabling the inventive MLE to become an étendue efficient, throughput efficient and delivery efficient MLE as discussed in detail below.

The preferred MLE is comprised of a RRS 140 with a primary curvature radius $R^0$ that together with the source S forms an effective reflector lamp $S_F$, $S_G$, etc. that, as discussed above, emits substantially into a significantly reduced emission solid angle $\Omega < 4\pi$-steradians. It is further comprised of a primary reflector system (PRS) 142 that collects most of the light emitted by the respective reflector lamp and concentrates it around the source S and towards a MES 144. This concentrated energy escapes the respective CCS-F, CCS-G, etc. through at least one respective exit port 146.

This invention relates in particular to spatially extended emission sources S and in particular, but not only, to those which have also an angular asymmetric energy emission density function . Such sources preferably are either filament lamps, gas discharge arc lamps, carbon arc lamps, lamps that have either a single, a double or no envelope or have an envelope forming concave and sealed reflector system with an exit window as exit port, that either use DC- or AC-type electrodes and DC- or AC-currents or HV pulses as energizing means for an electromagnetic energy emitting material or are of an electrode-less, microwave powered, wall stabilized type, or are laser generated emission regions including laser powered X-ray emitter. Such energy emitting materials are either tungsten, thoriated tungsten or carbon, or a range of gases including noble gases like Xe, Ar, Kr, etc., and often include Hg as a major portion of its constituents, as well as Na, S, Ka, etc. as well a combination a metal halide salts. For lamps with electrodes and envelopes is often preferred to have halogen containing molecules and/or other gaseous means for removing deposited (electrode material from the inner wall of the inner envelope. Also some type of lamps preferably have antireflection coatings on the outside surface of the inner envelope with respect to the wavelength bands of interest and/or optional reflective coatings in the non usable energy bands (for example IR, UV) and such coatings are capable of withstanding the operation temperatures of the envelope. For example, multi layer dielectric coatings are being used for tungsten halogen automotive lamps to trap the infrared inside and to reflect it back onto the filament thus saving up to 30% of electrical energy to heat the filament to its operation temperature.

Laser arrays and light emitting diode arrays are also spatially extended emission sources and the present invention can be modified by the skilled in the art to extend to such extended incoherent or partially or fully coherent source as well.

For any given collection étendue value $E_c$ an associated (blocking) MES 144 exists as discussed above. This MES 144 (comprised from one or more spatially isolated surfaces $AS_i$) is preferred to be chosen according to equation (1) or (2) in such a manner that it allows maximum energy collection from the respective emission volume $EV_S$, for a given collection étendue value $E_c$.

The respective PRS-F and PRS-G form the respective CCS-F and CCS-G. They are of a quasi-imaging type CCS that, contrary to the CCS-C, have sufficient distance between the source S and the secondary source S' so that most of the source energy couples around (not through) the envelope 42. With a proper chosen reflector extend for the PRS 142 and RRS 140 these preferred CCS are capable of generating, among others, a tightly concentratable beam focusing near the vertex location $L_E$ of the MES 144 and, as will discussed below, achieve a higher throughput and étendue efficiency. Rays originating from the PRS 142 that get blocked (scattered, absorbed, redirected, etc.) by the physical shape and/or optical properties of the source envelope 42, lampposts 44 and 46, electrodes 48, etc. exit the exit port 146 typically in a non étendue efficient manner and therefore are in general not efficiently collectable.

The preferred MLE designs results in a less distorted, and therefore smaller and more étendue and throughput efficient, respective secondary source image (shown in FIG. 6 as dashed lines representing a flipped view of the cross sectional contour lines of constant collection intensities through the respective secondary emission volume $EV_{S'F}$). To maximize the throughput efficiency TE for a given source S and given envelope 42 and for a given maximum height constraint of the respective CCS in the y-direction the distance between the source axis 24 and the location $L_{E'}$, i.e. the maximum vertical divergence angle $\theta_v$, is preferably chosen such that the given source blockage losses of the PRS 142 and the direct light collection losses of a respective RRS 140 are substantially of similar size, i.e. $\Delta \approx \delta$ with $\Delta$ and $\delta$ being the respective angular extends of the respective 'lost' angular emission energy density functions shown in FIG. 7. Source blockage losses are defined here as the percent of light emitted from the source S that is reflected back into (not around) the source S by the reflector system 142 and which due to the optical and mechanical blockage effects of the source S doesn't reach the respective MES 144 in an étendue efficient manner and therefore doesn't contribute to the throughput of a respective étendue constrained energy collection.

Alternatively, the distance between source S and the secondary source S', i.e. the location $L_E$ can also be chosen in such a way that the resulting CCS delivers light with a pre-selected maximum vertical $\theta_v$ and/or maximum horizontal angle $\theta_h$. In general, however this solution is somewhat less throughput efficient for a two part reflector design than the balanced loss design solution, i.e. $\Delta \approx \delta$, discussed above.

Clearly, for many applications where cost, weight, and size are important, a two part étendue efficiency reflector module designed for maximum throughput, i.e. $\Delta \approx \delta$, like that shown in FIG. 7, has its advantages, even if the maximum vertical concentration angle $\theta_v$ may no longer be a design input parameter. Other preferred embodiments of this invention, as discussed below, allow to build a LE which are both étendue efficient and are still able to delivery a wide range of desired output emission angles. This is either possible with a multi part RRS and/or in combination a suitable ABT.

Another preferred embodiment of the invention increases the throughput efficiencies of preferred MLE's for some types of lamps by combining a single element primary retro-reflector 148 with a primary curvature radius $R_0$ with at least one auxiliary concave first retro-reflector 150 having a different primary curvature radius $R_1$ to create a respective RRS 140 that has a higher total collection efficiency. In particular, specially designed auxiliary retro-reflectors can be used to collect and refocus a portion of the otherwise not efficiently collectable energy back into the emission region of the source S from where it can be redirected towards the MES 144 in a either direct or indirect manner. Such a possible direct manners include, for example, scattering effects occurring inside the energy emission region: i) elastic scattering effects that change only the propagation direction of an interacting photon and ii) non-elastic scattering effects where a photon is absorbed first and then emitted as multiple photons in other wavelength bands and directions (fluorescence conversion, etc.). A possible indirect manner is by providing additional energy to the emission region which indirectly makes the emission region even more emissive: for example heat can cause higher gas pressure which can caused a different chemical component make up, which then can change the optical emission and transmission properties of the energized medium, etc. Such spectral reformatting effects will be discussed more below. Of course, nonlinear photon-material interactions and many other direct or indirect interactions can occur as well and/or can intentionally be enhanced through a choice of selected materials.

FIG. 7 shows such a preferred embodiment where an otherwise not useful section of the PRS 140 is replaced with the preferred shape of the auxiliary concave retro-reflector section 150. This auxiliary reflector 150 preferably has an effective angular extend $\Delta$, as seen from the source S. Its curvature is preferably chosen to either substantially refocus the collected and otherwise bulb blocked light directly back into the respective emission region, or to focus it into the region where the rest of the RRS 140 focuses (instead of redirecting it into the surrounding neighborhood of the source S as the PRS 142 does in its single concave reflector shape embodiment that is shown in FIG. 6). Similarly at least one respective second auxiliary retro-reflector 152 with primary radius of curvature $R_2 > R_0$ can be used to retro-focus in an analog manner a portion of the light that would otherwise escape directly through the exit port 146. The reflector 152 has a respective exit port 154 through which a portion of the light, that has been concentrated by the CCS-G, escapes and is located at a suitable distance farther from the source S than the primary retro-reflector 148 is. By using a suitable number of auxiliary retro-reflectors with appropriately sized exit ports nearly 100% of the light emitted from a source S can be collected (even if the light is emitted into 4π-steradians) and most of it can be focussed into a beam having a chosen maximum vertical concentration angle $\theta_v$.

Together the reflector systems 140 and 142 with the auxiliary retro-reflectors 150 and 152 can be used to form two types of unstable, conjugate, reflective ring-cavities. The first type is a confocal and the second type is a bifocal ring-cavity, with the second type having two symmetrically offset center focus regions from the system axis 28 and the first type having the respective two center focus regions spatially overlap each other. The thus 'trapped' light can 'only' escape the respective ring-cavities by being redirected from inside the source emission region into the direction of the PRS 142 or by being absorbed somewhere in the system or by being directed somehow towards said exit ports 146 and/or 154, etc. Such possibly energy redirection effects will be discussed in detail below. The bigger the source blockage effect, i.e. the smaller the respective PRS 142 with respect to the diameter of the envelope 42, the more such loss recovery methods become worth while.

The total throughput of such a preferred types of MLE's depends among others on the reflectivity of the PRS and RRS, as well as the transmission efficiency of the envelope 42. For example, a change of reflector reflectivity from 86% to 96% results in a net output gain of 17%. This 1.7× reduction in reflectivity losses is due to the fact that the light emitted towards the RRS 140 is being reflected at least twice and about 50+% of the emitted light is being collected directly by the PRS 142. In the same manner, the reducing by 4% of the Fresnel reflection coefficient of the outside wall of the envelope 42 with an antireflection coating results in a net throughput efficiency gain of about 7% for the preferred MLE. The amount of 'lost' light that is partially recoverable with the above discussed preferred auxiliary reflectors, like the reflectors 150 and/or 152, depends in part on the type of source S used, the percentage of collection of the respective auxiliary retro-reflectors and their ability to retro-focus the collected energy in an étendue efficient manner. In particular metal halide lamps have been shown to exhibit desirable fluorescence conversion abilities when used in the preferred MLE's as will be discussed below.

In FIG. 6, the source shown for illustration purpose is an AC-type arc source $S_B$, that together with the retro-reflector 140 forms the effective reflector source $S_F$ with the emission volume $EV_{SF}$ and the two respective sub (emission) volumes $70_F$ and $72_F$. Note that while this discussion involves the case of an AC-type arc source, the invention is not intended to be limited to such sources alone. With the teaching provided herein, those skilled in the art can apply this invention to any other electro magnetic energy source as well, including symmetric and asymmetric electrode-less emission sources, solid state source, X-ray emission sources, etc. As shown in FIG. 6, the electrodes 48 deliver electrical energy to the plasma arc formed between the tips of the two symmetric electrodes 48 and optionally also serve as mechanical mounting fixtures for securing the source $S_B$ with respect to the concave primary reflector 142 and/or the concave retro-reflector 140. The two reflector systems 140 and 142 nearly fully enclose the source $S_B$.

Not shown in FIG. 6 or 7 are optional access ports allowing air to enter and/or exit the reflective cavity formed by the two reflectors 140 and 142. Blowing or sucking air into or from such access ports is necessary for some type of lamp/reflector combinations in order to prevent local or non-local overheating of the source envelope 42, and/or of the seal between the glass of the lampposts 44 and 46 and the metal (for example, molybdenum seals) of the electrodes 48, and/or to keep the temperature of the reflective coating and/or reflector body of the reflector systems 140 and 142 below a given damage threshold. An optional fixation material 143 (cement, epoxy, solder, etc.) can be used to secure the location of the electrodes with respect to the reflective cavity to form effectively a composite reflector lamp where all the critical parts are mechanically locked together and optionally sealed or not sealed in a gas tight manner.

FIG. 6 shows a design where the exit port 146 is a through hole in the reflector 140. FIG. 7 shows another preferred embodiment where the bulk material of the primary retro-reflector 148 is substantially transmissive to the energy bands of interest and where the reflective coating 198 is applied locally on the inside and/or outside of the reflector 148 in such a manner that a transmissive exit port 146 is created. Optionally the transmissive reflector material is antireflection coated on at least one side for wavelength regions of interest and optionally is reflective for other wavelength to increase, as discussed about, the usable energy transmission through the exit window 199, i.e. the exit port 146. Such a partial reflective coated exit window 199 can also be interpreted as an auxiliary retro-reflector of the RRS 140.

For gas energized lamps, the symmetry axis 24 is preferably orientated vertically, i.e. parallel to a given gravitational field vector, in order to minimize the axial asymmetry and respective volume of the emission volume $EV_{SF}$. Another preferred orientation is a horizontal orientation of the symmetry axis 24 with the exit port 146 oriented downward so that the retro-reflected light is hitting the bottom of the envelope 42 so as to minimize the heating of the top portion of the envelope 42 and to make the surface temperature of the envelope 42 more uniform.

The optical properties of the typically quasi-symmetric envelopes 42 introduce significant cylindrical and higher order optical distortions to the imaging capability of the respective CCS, thus decreasing the étendue efficiency for an uncorrected MLE's. A preferred embodiment of the invention is therefore to have the RRS 140 have an axis of symmetry that is co-linear with the source axis 24, i.e. 'symmetry' axis of the envelope 42 and an aspherical surface curvature designed to correct for the envelope distortion so that ideally the retro-focussed source image is the same (with exception of an image inversion) as that of the source. A first order preferred correction to an also preferred spherical type retro-reflector shape is a toroidal reflector selected in such a manner that the image shift caused by the envelope is reduced over that achievable with an optimally off-center located spherical type retro-reflector. For long arc AC-type lamps and or long and thin cylindrical type emission zones a proper orientated section of an ellipsoidal reflector can be an even better retro-reflector, which again can be further improved with aspherical correction terms. Similarly, the auxiliary segment 150 and 192, which are also retro reflecting elements should have ideally the same axial symmetry as the source axis 24 and sufficiently aspherical corrections to substantially compensate the astigmatic focus image shifting effects of the envelope 42. Since these reflector sections have a much smaller angular extend, as seen from the source S, less correction terms are typically needed to obtain satisfactory imaging results. For the case where the envelope 42 is not axial symmetric, the same design optimization applies: for each emission direction the respective retro reflecting mirror element should ideally compensate the optical beam deviations caused by the envelope 42 and of any other optical element in the beam path, so that ideally a non-magnified, inverted source image is formed.

From the above description it follows that AC type or other types of spatial quasi-symmetric emission sources are often preferred since the étendue of an image inverted, spatial symmetrical emission beam is substantially preserved in this manner and they have typically a longer lifetime, lower manufacturing cost and generate a more spatially uniform exit beam. For asymmetrical type emission sources, like DC type sources, the arc gap is preferably offset less than its arc gap from the reflector axis 28 so that the delivery efficiency to a given target or collection area/aperture is maximized.

Figure 8:
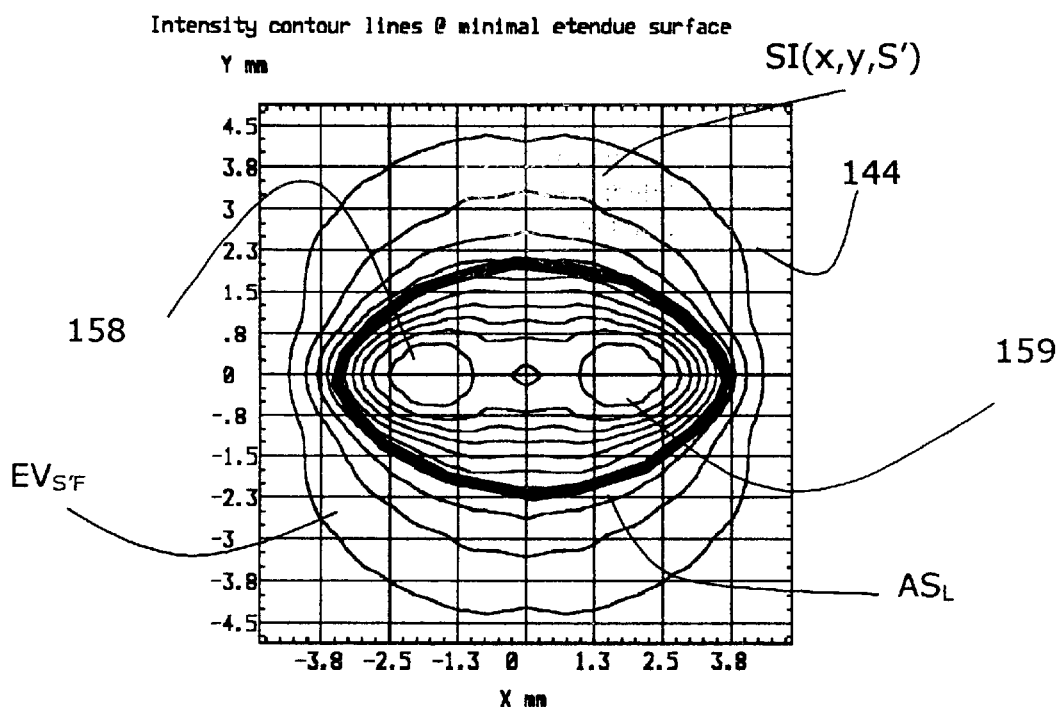
FIG. 8 graphically shows the characteristic asymmetric intensity contour profile of this invention at the location $L_E$ for the MLE-F or MLE-G.

FIG. 8 shows the contour lines of the calculated spatial dependent intensity distribution $SI(x,x;S')$ at the MES 144 (approximated for the calculation purposes as a perpendicular plane located at $L_E$) obtained through numerical modeling with ideal components of the MLE-F design shown in FIG. 6. The primary reflector 142 used had an axial symmetric ellipsoidal shape with a first (F1) focal distance of 26 mm and a second focal (F2) distance of 100 mm from the left vertex point (also called vertex point) of the reflector 142. The retro-reflector 140 had also an ellipsoidal shape but with a minor axis of $b_z=b_x=67$ mm and both focal points offset 1 mm in the direction of the source axis 24 (y-axis) from the symmetry axis 28 (z-axis). The resulting asymmetric, orthogonal maximum divergence angles of the MLE-F are $\theta_h \approx 23$ deg and $\theta_v \approx 29$ deg for a 99% energy cutoff point and the respective CCS was designed to have a maximum geometrical concentration angle or angle divergence $\theta_v=30$ deg.

Figure 9:
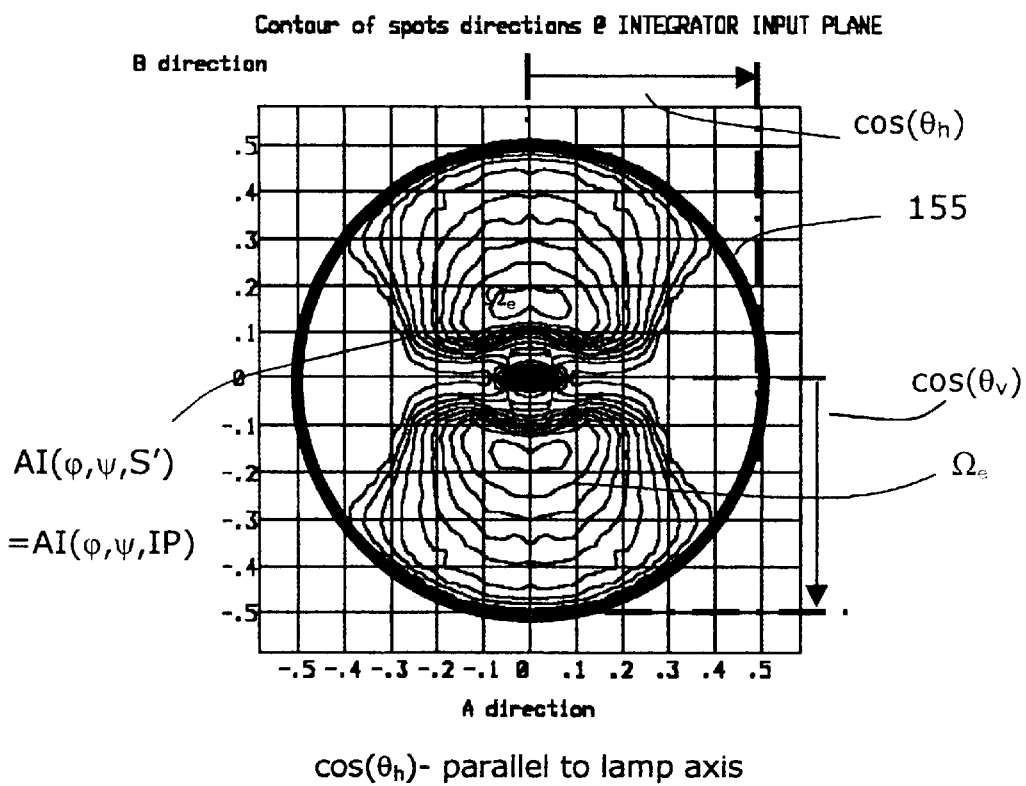
FIG. 9 shows the contour map of the characteristic asymmetric angular dependent energy density function of this invention for the MLE-F or MLE-G.

FIG. 9 shows the contour lines of equal incident energy/steradian of the angular dependent energy desity function the angular dependent energy density function $AT(\phi,\psi;S')$ depending upon the directional cosine of the horizontal and vertical projection angles of rays incident on the MLE 144. The coordinate axis labeled 'A direction' represents the horizontal directional cosine, i.e. $\cos(\theta_h)$. The axis labeled 'B direction' represents the corresponding lamp axis orthogonal directional cosine. The angles $\theta_h$ and $\theta_v$ shown in FIGS. 6 and 7 represent the effective horizontal and vertical maximum of the respective concentration angles θ. Note in FIG. 9 the characteristic, angular dependent, hourglass type, asymmetric cross sectional shape of the collection energy density function for the AC-type source $S_B$. The thick line 155, overlaid on the graph in FIG. 9, represents the angular collection aperture of a symmetric beam with NA $\leq$ 0.5, i.e. θ $\leq$ 30 deg. The area between the hourglass shape (neglecting the most center portion) and the full circle represents about 44% of the hourglass shaped solid emission angle $\Omega_e$. This means that the étendue of such an axial asymmetrical beam is about 60% of that of a beam that fills the angular space uniformly. Multiple distinct areas of energy transmission losses (blockage losses resulting in throughput efficiency losses) can be identified in FIG. 9. The energy missing in the 'polar caps' at the left and right pole of the 'radar'-graph shown in FIG. 9 are mainly a result of electrode 48 tip and lampposts 44 and 46 shadowing effects, i.e. they block the emission direction of some higher angle vertical rays from the emission volume $EV_{SB}$ of the source $S_B$. Clearly one also can distinguish an energy-starved annular ring surrounding the center of the graph that is caused by rays traveling nearly tangential through the periphery of the envelope 42. For those rays the refractive properties of the envelope 42 causes a significant propagation bending so that they miss a finite collection area positioned inside the secondary emission volume $EV_{S'F}$. Therefore, for the preferred MLE, the cross sectional area perpendicular to the system axis 28 of electrodes 48 and the lampposts 44 and 46, as well as that of the envelope 42 together with the optical beam transmission characteristic of the envelope 42 can have a significant influence (depending in part on the size of reflectors system 140 and 142) on the amount of collected light that can be delivered to the MES 144 substantially around the envelope 42, wires 48 and the lamp posts 44 and 46.

The magnitude of such lampposts blocking effects depend on the relative cross sectional width and shape of the lampposts 44 and 46 with respect to the focal length of the reflector 142. Similarly, the magnitude of the electrode tip blockage effect depends both on the arc length L and width W (electrical power level dependent) of the emission volume $EV_S$, the imaging quality of the chosen RRS 140 in combination with the envelope 42 and the spatial positioning of the emission region with respect to the system axis 28. For a given source S, the MLE designer thus has to trade off the physical system size and complexity of the reflector systems 140 and 142 with the maximum achievable delivery efficiency DE.

An angular dependent energy-delivery loss analysis, for example based on the data like that shown in FIG. 9, provides performance feedback to the lamp designer and highlights new improvement areas in lamp design for use in the preferred types of MLE's. FIG. 9, for example, explains why lamps, manufactured according to this invention, can achieve a higher delivery efficiency in combination with a preferred MLE. Note that some of the preferred changes to the construction of a lamp provide no beneficial effects and sometime even deteriorating effects in many types of prior art MLE's.

Such preferred lamps can be designed and manufactured, among others, to result in a reduced effective cross sectional area of the tips of the electrodes 48 and/or the lampposts 44 and 46 (at least near their intersection with the envelope 42) thus lowering the blockage losses of a respective preferred MLE. A preferred embodiment of this invention therefore uses axialasymmetric shapes for electrodes 48 and/or lampposts 44 and 46 and balances mechanical, current delivery and heat loading requirements with the above discussed minimum light blockage requirements. Such preferred cross sectional shapes are axial nonsymmetrical designs oriented to provide a reduced cross section to the concentrating beam of the PRS 142 and are preferably chosen from a group including oval, elliptical, thin rectangular, triangular, T-beam, trapezoidal and narrow slowly twisting rectangular shapes in a plane orthogonal to the system axis 28. Contrast these shapes with the round or nearly square I-beam cross sectional shapes commonly found for parts used for prior art lamp construction. Such a preferred lamp manufacturing design change results on one hand in still sufficient mechanical mounting, heat sinking, and current delivery capabilities and on the other hand can increases the delivery efficiency capability of a given height constrained preferred MLE. In an analog manner the tip-off section of a given lamp envelope is preferably either eliminated all together or placed in a location and direction were its light throughput blockage effect is minimized and the lifetime of the system in conjunction with a respective cooling design maximized.

Another significant advantage of the preferred MLE's is that, contrary to the prior art MLE-A and MLE-B, both of the ends of the lamp posts 44 and 46 can be located outside or close to the outside of the preferred CCS. This allows for better access and therefore better temperature control capability (cooling) while still allowing to more independently control the operation parameters of the envelope 42, i.e. allow it to operate more uniformly and closer to its optimum operation temperature. Also, as FIG. 9 shows, a respective CCS of a preferred MLE can be narrower in the lamp axis 24 direction since only a small amount of collectable energy is being emitted from the emission region of the source S toward those directions. Another preferred design solution based on this invention therefore shrinks the extend of the reflector systems 140 and 142 and the length of the lamppost 44 and 46 in the direction of the lamp axis 24. This allows minimizing the volume the MLE occupies until the delivery efficiency of the respective MLE is affected notably due to lost collection efficiencies. Another preferred MLE design solution uses such an effectively largest reflector design for a given minimum dimension constraint to maximize the delivery efficiency of a height or width constrained MLE by minimizing the source blockage losses.

A different preferred embodiment of this invention for throughput efficiency maximization of a given width constrained MLE in a direction orthogonal to the source axis 24 is discussed below. FIG. 7 shows, for example, a flattening and thinning 155 of the wall thickness of the respective reflector bodies near the mating region of the primary and retro-reflector systems 140 and 142 in two offset parallel plane that are substantially orthogonal to the lamp axis and orthogonal to the direction where the CCS-G is constrained (shown here as the vertical axis). As discussed above, such preferred manufactured reflector components result in an effectively larger CCS having a higher throughput efficiency for a given lamp S. Note that if the CCS is pointed, for example, in a 20 deg downward direction (for example for packaging constraint designs) the flattening and thinning 155 would be done in a different direction.

FIG. 7 shows also another embodiment of this invention with a primary reflector 142 that is overextended from the source axis 24 by an overshoot distance DD>0 and a primary retro-reflector 148 that is underextended by approximately the same distance, thus resulting in a more manufacturable (lower cost) MLE design. Note that the throughput efficiencies value TE of the preferred MLE's types decreases only very slowly with an increasing overshoot distances DD>0 due to the counter balancing effects of the increased collection efficiency of the primary reflector and the reduced bulb transmission losses for the reduced collection efficiency of the RRS 140. The manufacturability of the primary retro-reflector 148 depends in part on the required surface-shape accuracy and the taper angle 156 of the exit surface of the reflector 148 which is geometrically related to the overshoot distance DD. Therefore a preferred, manufacturability constrained, throughput efficiency optimized CCS uses substantially a minimum overshoot value DD that is geometrically related to a given exit taper angle 156 that is predetermined by a chosen reflector body manufacturing process. Typical such exit taper angles 156 range from 4 to 10 deg. On occasion, it is preferred to use a larger over shoot distance to increase the collection efficiency of the PRS 142 and reduce the collection efficiency of the RRS 140. This design choice is in particular preferred when the interaction of the retro reflected light with the source S causes undesirable effects, such as to much color change, shortening of the life time of the respective lamp, etc.

Lower wattage arc lamps S typically have smaller emission volumes $EV_S$, smaller and possibly thinner envelopes 42, thinner electrodes 48 and thinner lampposts 44 and 46. The smaller relevant mechanical cross sectional area of such lower wattage arc lamps result in less light blockage for a given size reflector 142. This enables the design of a preferred MLE with higher throughput efficiency TE and therefore also higher energy delivery DE to the final illumination target T. Under special circumstances, smaller wattage lamps can therefore couple more light into a given collection area than somewhat larger wattage lamps can for a given size constrained MLE.

A comparison of FIG. 8 with FIG. 3A shows that the preferred MLE-F is a quasi-imaging system that is capable of preserving most of the spatial dependent local characteristics of the original source image, but distorts the image somewhat on a global level. The resulting global image distortions and different orthogonal image magnifications, i.e. $M_x \neq M_y$, observable in FIG. 9, are in part attributable to i) the asymmetric angular divergence in the x-axis (lamp axis) and y-axis of the concentrating exit beam, ii) the spatial extend of the emission region resulting in off-axis emission locations for most portions of the emission region together with the three-dimensionality of the shape of the emission region, iii) in part also due to the uncorrected source image distortions (caused by the envelope 42) resulting in a different axial focus location in the xz-plane and yz-plane and iv) due to the approximation of the ideal MES 144 with a perpendicular collection plane, i.e. neglecting the image 'plane' curvature. Note, for example, that the CCS-F operates slightly off-axis, i.e. the centers of the sub-volumes $70_F$ and $72_F$ are somewhat vertically offset from the system axis 28 contributing to off-axis image aberration errors and curved image surfaces, i.e. curved MES 144. For given collection efficiencies, such image distortions result often in a somewhat larger than ideal collection area. According to equ. (1)–(3) this results in an étendue efficiency loss. Such secondary source image enlargements are therefore preferably minimized.

Another preferred embodiments of a this invention further increases the delivery efficiency of a preferred MLE by adding axial not-symmetric correction terms to the basic preferred axial symmetric shapes of the respective CCS. For example, adding proper designed cylindrical correction terms to the basic ellipsoidal reflector surface of the PRS 142 can reduce the image stretching in the lamp axis 24 direction for the secondary source S', and therefore increase the étendue efficiency of the respective CCS. Such correction terms optimally are designed to compensate various optical image distortions caused, for example, by the envelope 42, a solid window forming the exit port 190, a color wheel, an optical band pass filter, a color cube separating spatially various color channels, etc. Similarly, by using an axial symmetrical RRS with an axis of symmetry collinear with the source axis 24 (or more generally with a generalized aspherical shape) the astigmaticity of the image focus of the retro reflected beam (caused primarily by the envelope 42) near the source S can be reduced. This allows the 'squeezing' of a larger portion of the retro-reflected energy between the tips of the electrodes 48, thereby increasing the étendue efficiency and throughput efficiency of the respective CCS system.

A smaller secondary source S' image allows, for a given collection area, to collect a larger portion of the emitted source energy. It also allows to sample effectively from a larger emission region which can further increase the delivery efficiency in some LE applications (for example PLE) where the emission region of the source S has a significant, spectral varying spatial extend (for example metal halide lamps). For asymmetrical optical properties of the envelope 42, asymmetric correction terms need ideally be added to the basic shapes to achieve the highest étendue efficiency EE possible. For practical manufacturing reasons, one can often also chose axial-symmetric quasi-elliptical and quasi-spherical or quasi-toroidal reflector shapes that are easier to manufacture than the optimal generalized, non axial symmetrical, aspherical shapes and which have been optimized together with a respective LE to achieve improved delivery efficiencies over that obtainable without such corrections.

A comparison of FIG. 3B with FIG. 8 clearly shows the superiority of the imaging capability of the preferred embodiment of the quasi-imaging MLE in preserving the local and global spatial emission characteristics of the source S over that achievable with the non-imaging, prior art MLE-B and in thus creating a smaller collection area $A_c$ for a given total power level $P_T$ of both collectable and usable light by a target T. These figures also show that due to the more rectangular shaped beam cross section of the MLE-F with an AC-type source, a better collection efficiency can be achieved for a rectangular target T than is possible with the round beam cross sectional shapes of the non-imaging MLE-A and MLE-B. The more elongated such a rectangular target is, the bigger is in general this (geometrical shape based) coupling efficiency advantage. In other words, with this invention, longer arc gap lamps can be coupled proportionally more efficiently into given rectangular targets T. When a respectively longer arc gap optimized (based on this invention) lamp S is used in such a LE this can result in longer lamp life, better electrical to light conversion efficiency, wider emission angles due to less arc tip blockage and more broad band light emission and collection as discussed in detail below.

It follows from the above discussed analysis, that in order to most étendue efficiently collect the light exiting the MLE-F, the respective light collection area $A_c$ has to be distributed into one or more sub-areas $A_i$ that surround the two intensity peaks 252 and 159 of the secondary source $S'_F$. Preferably, the cross sectional shape of each of these sub-areas $A_i$ has the shape of a contour line of equal relative peak intensity enclosing a higher intensity region. The thick circular and oval line, labeled $AS_L$ in FIGS. 3B and 8 shows, for example, the collection aperature of the best respective acceptance surface $AS_L$ that has a maximum total collection area of $A_c$=19.6 mm².

FIGS. 8 and 9 show that, contrary to the symmetric output beam of the prior art MLE-B case shown in FIGS. 2, 3A and 3B, the spatial and angular dependent emission characteristic of the respective secondary emission volume $S'_F$ is axial asymmetrically shaped. More specifically, at the MES 144, the angular divergence is narrower and the optimum collection area is preferably longer in the direction of the lamp axis 24. Therefore, the collection surface $AS_L$, shown as thick oval line in FIG. 8, is only optimal for maximum coupling efficiency to a given target T, if the respective (effective) emission and collection surfaces and their angular dependent energy density functions can be transformed into each other in an étendue efficient manner.

For axial symmetric beams and for targets with symmetricacceptance angles (for example some type of LV's and LG's), where the shape of an effective emission aperture EA(x,y;S') (for example a mask) of the source S' and of the collection aperture CA(x,y;T) of the target T can be transformed into each other by a linear scaling function, i.e. EA(x,y;S')=k* CA(x,y;T) with k>0, an étendue efficient, delivery efficiency enhancing, beam reformatting task can be accomplished with prior art using an imaging or non-imaging SBT, i.e. an optical system that has an axial symmetric beam transformation capability. For example, an imaging lens or a round or rectangular tapered integrator rod with a constant cross sectional shape and aspect ratio (that is identical to the shape of the respective target collection aperture CA(x,y;T) can be used to increase/decrease the effective 'emission spot size'of an axial symmetric source S' with a simultaneous decrease/increase of the respective divergence angles according to a constant étendue solution of equ. (2). In this manner, for example, by using a proper dimensioned, rectangular shaped, emission limiting 'exit' aperture (see mask 124 and 126 in FIG. 5), the divergence angle of a respective secondary source S' can optimally be matched to the acceptance angle of a given rectangular target T. However, due to the general miss-match of the cross sectional shape of the source S' and the target T, this prior art, axial symmetric beam reformatting approach leads to often to undesirable delivery efficiency losses for étendue limited energy collection.

According to another preferred embodiment of this invention, to increase the delivery efficiency of many types of LE further, i.e. beyond the capabilities of such axial symmetrical coupling systems, for a given asymmetric secondary source S' (produced for example by a preferred MLE) and a given target T, ideally the spatial, angular and/or spectral beam characteristics of the source S' are optimally reformatted with preferred types of ABT's in an étendue efficiency enhanced manner (compared to SBT solutions) to better fit the needs of the target T. Such ABT's are preferably designed as matched optical system with an input port matched to the given asymmetric source S' and an output port matched to a given target T.

Such preferred ABT's can either be i) of an imaging or ii) non-imaging type and can comprise one or more ABT's in a serial and/or parallel arrangement and can optional be intermingled with SBT's to form a respective Anamorphic Beam Transformer System (ABTS). All preferred ABTS's related to this invention have in common that their respective collection aperature $CA(x,y)|_{ABTS}$ is nonlinearly related to the exit aperature $EA(x,y)|_{ABTS}$ of their exit port, i.e. $CA(x,y)_{ABTS} \neq k^* EA(x,y)|_{ABTS}$ with k>0 with the z-axis being the local beam propagation axis. The respected input ports and output ports of the ABT's and SBT's are connected by efficient remote electromagnetic radiation transporting means mapping the energy collected from the collection aperature $CA(x,y)|_{ABTS}$ onto its exit aperature $EA(x,y)|_{ABTS}$. Therefore, these ABTS change the output divergence and/or the beam cross section of an axial asymmetric input beam differently in at least two selected orthogonal planes and they have therefore a preferred alignment orientation with respect to the asymmetric source S' and target T.

For étendue efficient coupling of the energy emitted by the source S' onto a target T, the preferred cross sectional shape of the exit aperature $EA(x,y)|_{ABTS}$ is preferably an étendue efficient, anamorphic linear shape change of the effective collection aperature CA(x,y;T)of the target T, i.e EA(x,y) $|_{ABTS}$=l(x)*l(y)*CA(x,y;T) with l(i)=|sin($\theta_i^T$)/sin($\theta_i^e$)|, i=x or y and with $\theta_i^T$ being the respective acceptance angle of the target T and $\theta_i^e$ the respective exit divergence angle of the output port. For each surface the relevant x and y axis are to be determined based in the local propagation axis z and a given longest dimension or preference axis x. For targets with an asymmetric acceptance angle functions, like the DMD or TMA LV's, that are used in their asymmetric mode, the exit divergence angle distribution is preferably also matched to the needs of the targets in such a manner that the above discussed spatial matching of the output port into the target T also matches the necessary angular dependent emission and asymmetric acceptance function.

The choice of input and output shape depends on the available asymmetric input beam and the illumination requirements for the target T as well as the choice of remote energy delivery means (i.e. their ability not to symmetrizise an angular asymmetric energy density function function) between the respective input and output ports. Optionally such ABTS's contain at least one wavelength converting material capable of increasing the delivery efficiency of usable light in combination with the ABTS. Also, while above only single input and output ports are being discussed, if needed, a composite ABTS can be build having multiple input and/or output ports and the above teachings modified accordingly to fit the situation at hand.

To be able to compare the delivery efficiency gains achievable with an ABTS based on this invention over prior art, a base line, delivery efficiency value $DE_0$ is defined with the formula $$DE_0 = \max(P_T/P^{in}), \quad (6),$$

where $P_{in}$ is the total available, spectrally, spatially and angularly integrated energy of the respective input beam. The power level PT is defined as the maximum achievable local delivery efficiency according to equ. (5) between a given input beam and a given target T and with or without the aids a suitable SBT's. In other words, the value $DE_0$ represents the maximum achievable delivery efficiency with axial symmetric coupling means.

For example, in the case of a LGLE using a non tapered LG, i.e. one which has a constant cross sectional shape, its input port (=output port) is the respective illumination target T. It can either be placed directly into the focus of the source S' or be coupled with an axial symmetric magnifying or minifying optical system which scales the beam cross sectional area in an étendue efficient manner. The respective value $DE_0$ represents the maximum coupling efficiency between the given input beam and the input port of the respective LG. In general, a suitable chosen SBT aids in the maximization of the output power of such a LG. For the special case with $\theta \approx \theta_L^{in}$, i.e. where the divergence angle $\theta$ of the respective input beam is matched to the maximum acceptance angle $\theta_L^{in}$ of the LG, the input port is optimally placed directly into the focus of the respective input beam without the aid of any SBT's.

Therefore, after achieving the first step of an étendue efficient emission solid angle reduction with a preferred MLE of this invention, the delivery efficiency of a LE for many étendue limited target illumination application depends now mostly on also identifying practical means for further reformatting, preferably in an étendue efficient manner, the asymmetric beam emitted by the respective secondary source S' into a more usable illumination beam at a specific given target T.

Many commonly used illumination targets T (LG's, LV's, etc.) have an axial symmetric, angular dependent energy acceptance function. Therefore, according to this invention, by transforming with an ABTS the asymmetric angular dependent energy density function (shown in FIGS. 9) into a more symmetrical one, additional input collection area can be gained for the same output collection area if such an ABTS operates in an étendue efficient and sufficiently transmissive manner. The preferred ABTS allows therefore, in combination with an étendue efficient asymmetric input beam, i.e. a beam that has its narrowest beam waist in a plane having the largest angular divergence, to further increase the delivery efficiency of a respective étendue limited LE by effectively creating a larger collection aperature that is stretched in the direction of the longest beam waist for a given size and shaped exit aperature.

Different preferred embodiments of this invention use different types of ABT's. For example, to transform the oval cross sectional area $AS_L$ that is shown in FIG. 8 into either a different oval or round shape, a preferred implementation of this invention is to use an orthogonal oriented, bi-cylindrical optic chosen such that both the x- and the y-axis create an image of the emission source S' at about the same image distance along the respective optical system z-axis, but where the divergence and respective orthogonal magnification in the x and y axis are different and chosen to accomplish the desired étendue efficiency and delivery efficiency optimized area/angle beam reformatting function. Additionally, by suitably designing such an anamorphic optical imaging system, a PCS can easily be added to the system which generates a highly polarized output beam having about twice the cross sectional area and respective étendue. For some type of LE applications, this can improve the delivery efficiency of the system. Such PCS can also be added, when useful, in some of the other embodiments discussed below. Alternatively, concave and convex reflectors with non a axial symmetric reflector section (spherical, parabolic, toroidal, oboloid, ellipsoidal, aspherical, etc.) and their combination with axial symmetrical and asymmetrical lenses can be used to combine beam steering with étendue efficient area/angle transformation.

Another preferred embodiment of this invention uses a pair of matched lens arrays or phase arrays to both reshape the beam cross section and to spatially average the beam intensity at the respective systems exit aperature EA(x,y) $I_{ABTS}$. The first element of the respective pair breaks the beam up into multiple sub-beams and then performs a respective étendue efficient angle/area conversion for each sub-beam and the second element combines and overlaps each sub-beam thus creating an area, angle and spatial intensity transformed output beam. Note that due to the typically more rectangular shaped output beam (see FIG. 8) of the preferred types of MLE's and its étendue efficiently matched asymmetric angular dependent energy density function (see FIG. 9), a respective beam transformation into a rectangle with an aspect ratio of 4:3 or 16:9 is typically more étendue efficient than an equivalent round to rectangular area conversion. Such a round to rectangular shape conversion for an axial angular symmetric input and output beam results in an étendue efficiency loss of at least 30% and it often used in combination of a prior art MLE-A or MLE-B for three LV PLE applications.

Another preferred ABT that is based on this invention is manufactured using high efficiency LG manufacturing technology. Preferably it is build similar to a fiber bundle and its input and output shapes are preferably matched to the spatial characteristics of the respective illumination beam and target T demands and its neighboring input pixel are preferably randomly mapped to the output area. Preferably such beam shaping LG's are manufactured either by a high efficiency tip preparation method as described in U.S. Pat. No. 4,983,014 to Natterman (1991) to achieve a >90% transmission efficiency or by another manufacturing process yielding the similar functional results. For example, to convert the oval collection aperture that is shown in FIG. 8 as the most efficient collection surface $AS_L$ with area $A_c$ into a rectangular shaped emission surface having the same area $A_c$, the total available cross sectional area is rearranged at the respective input port (or ports) to matched optimally a respective contour line of the MES 144 and the output port (or ports) is shaped into a rectangle having a desired aspect ratio. This preferred anamorphic, spatial beam-shaping method can typically accomplish a required spatial beam reformatting task in a more efficient manner than either a SBT system, a rectangular mask, or a polished, rectangular, hollow reflective or solid transmissive, total internal reflecting integrator rod can, due to the ability of this type of ABT to collect and emit light in a more spatial efficient, i.e. étendue efficient manner. As long as the transmission loss of such a manufactured 'tapered' fiber bundle is smaller than the gain achieved in collection efficiencies such a beam reformatting design solution is worth considering.

Note that such a special type of area reshaping LG also changes (axially symmetrizies) any axial asymmetrical angular dependent energy density functions thereby increasing the étendue of the respective exit beam over that of the asymmetric input beam. For the case shown in FIG. 9, and depending on the manufacturing design of such LG's, this can amount to an étendue increase of as much as 1.44× by transforming the hourglass shape into an axial symmetric round shape. Therefore, while such a preferred ABT can deliver for some LE design cases more usable output energy than a SBT can, it doesn't allow to take advantage also of the asymmetric angular dependent energy density function of a respective input beam and therefore gives up a further potential input collection aperture area gain of up 144%.

A more improved beam reformatting method based on this invention for LG based ABT's is therefore to perform in general first an étendue efficient, angular symmetrization, beam reformatting step, and then, if worth while, to further reformat the resulting exit area with the preferred asymmetric area reformatting method described above.

A different preferred ABT based on this invention is a single channel, solid, transmissive, axial asymmetrically tapered, non-imaging LG-integrator element having either a suitable low refractive index cladding or very good optically polished and clean surfaces. Still another preferred manufacturing method is to make such an ABT from a hollow, highly reflective axial asymmetrically tapered tube. The transition from the input cross sectional form to the output cross sectional form is preferably appropriately slow varying, or stepwise differentiable, with a shaped chosen to maximize the delivery efficiency of the respective LE for given manufacturing cost constraints.

FIG. 6 shows in a cross sectional view another preferred embodiment of this invention where two different type of ABT's operate, first in parallel and then in series, are used to create, as a ABTS, a highly delivery efficient area/angle reformatting composite LG thus forming the respective LGLE-G and ABTLE-G. Note that in this example the case is highlighted where the collection optimization is done for such a small exit aperture of the respective (not shown) output port that the optimum collection solution requires two different spatially isolated energy collection locations near the two hot-spots (respective images of the emission sources $70_F$ and $72_F$) of the emission volume $EV_{S'F}$. The respective optimized energy collection is therefore shown with two different input ports $IP_1$ and $IP_2$ which are then combined to result in a single output port OP (not shown in this figure) by a bifurcated area reshaping LG 160. The first type of ABT's primarily symmetriesise the given axial asymmetric, angular dependent energy density function in an étendue efficient manner. The second ABT reshapes the area without substantially changing the already symmetric angular dependent energy density function. This tandem approach allows separating an optimum angular-reformatting step from an optimum area-reformatting step, so that as a matched serial pair they further increase the respective delivery efficiency. While FIG. 6 shows as first type of ABT's the use of asymmetrically tapered integrator rods, other types of imaging or non-imaging, étendue efficient anamorphic beam transformers can be used to accomplish the same task.

FIG. 7 shows another embodiment of a preferred ABT that is a single, rectangular, asymmetrically stretched tapered integrator 162 performing also an exit angle $\theta_v^e$ reduction function orthogonal to the lamp axis, i.e. having a larger exit height than entrance height in the y-axis. This tapered integrator 162 is shown with a curved exit surface forming the respective illumination target $T_G$ for the respective LGLE-G. Such a properly chosen, curved exit surface can be used, for example, to create, in combination with a not shown, symmetric beam transforming coupling optic, a quasi telecentric incident beam with a single coupling lens. Such preferred surface preparations (tilted, curved exit and input surface, etc.) can therefore allow further LE system optimization by allowing to integrate such above discussed auxiliary optical elements to aid in beam steering, 'Scheinplug' optical corrections, telecentricity control, field flattening, color separators, polarization splitting/combining, laser light 'despecling', etc.

The asymmetrically stretched tapered integrator 162, is a very simple and low cost ABT design solution allowing increased delivery efficiency over prior art coupling technology for the special case of a rectangular target T (LV, etc.) in combination with a preferred type of MLE. The targets T can either have an inherent asymmetric angular dependent acceptance functions (like the DMD™ or TMA™ light valves) or have inherently symmetric acceptance angles (like LCD's, projection slides, etc. and like other types of inherently asymmetric devices which are used in a symmetric illumination mode. The asymmetrical tapering in the two orthogonal directions (x and y) of the tapered integrator 162 are therefore preferably chosen to approximate the illumination needs of the respective target: quasi-symmetric or asymmetric with a predetermined horizontal and vertical divergence.

For example, for a DMD or TMA with a vertical tilt axis, the natural angular dependent asymmetric energy density function (see FIG. 9) is a nearly ideal illumination beam for improving the coupling efficiency to the LV and without causing contrast losses and without the use of an asymmetric mask 124 like the one shown in FIG. 5. In particular the lamp blockage section around the horizontal center axis helps to minimize the scattering for high contrast PLE applications. A preferred use of the preferred type of MLE's is therefore to use its natural asymmetric angular dependent properties to increase the delivery efficiency of a related DMD or TMA PLE operating in either a symmetric or its inherent asymmetric mode.

Once the discussion is made to use a tapered integrator as area/angle reformatter, one can also consider to use it to further reduce the exit divergence $\theta_v^e$ in one or two orthogonal directions to simplify the demand for a follow-on coupling optic (see FIG. 7). For PLE application such an asymmetrically tapered ABT is often a preferred solution since it can made long enough to also provide spatial averaging function within the same part and the rectangular collection and exit shape of such an asymmetrically tapered LG can be chosen to more efficiently map onto the target and the secondary source S'. To increase throughput efficiency and spatial output intensity uniformity multiple matched tapered and non-tapered integrating section can be combined to maximize the delivery efficiency for PLE applications.

For example, for a rectangular output shape with a 4:3 aspect ratio, a 1.25× 1-dimensional stretch in the lamp axis direction (convert 24.5 deg into 30 deg in the horizontal direction) results in a 25% larger rectangular input collection aperture with an aspect ratio of 5:3. As FIG. 9 indicates, such an elongated input aperture is an even better match to the ideal shown oval shaped acceptance surface $AS_L$ than a 4:3 collection aperture. Therefore, while such an tapered integrator 162 does not allow fully étendue efficient beam reformatting up to the full theoretical limit (44% area gain), it provides a very good compromise between achievable delivery efficiency gains and manufacturing/development costs for such a delivery efficiency enhancing single part.

Depending on the illumination task and input beam, more complex asymmetrically tapered shapes, for example hexagonal to hexagonal, hexagonal to rectangular, octagonal to rectangular, rectangular to rectangular with increasingly beveled corner forming an eight sighted polygon, with linear and non-linearly longitudinal shape changes, etc. can be used to further enhance the delivery efficiencies for specific LE design cases.

A further preferred method based in this invention for the manufacturing of respective hollow, reflective ABT's is the gluing of two 2, 3 or more (possibly identical) segments together, for example two L-shaped segments to form a rectangular cross section. Such preferred solid and hollow ABT components can also be formed with extrusion processes and optional secondary slumping and grinding/polishing operations. If needed, multiple such ABT's and SBT's can be connected in a series to perform as a group the required delivery efficiency-enhancing beam reformatting task.

Figure 10:
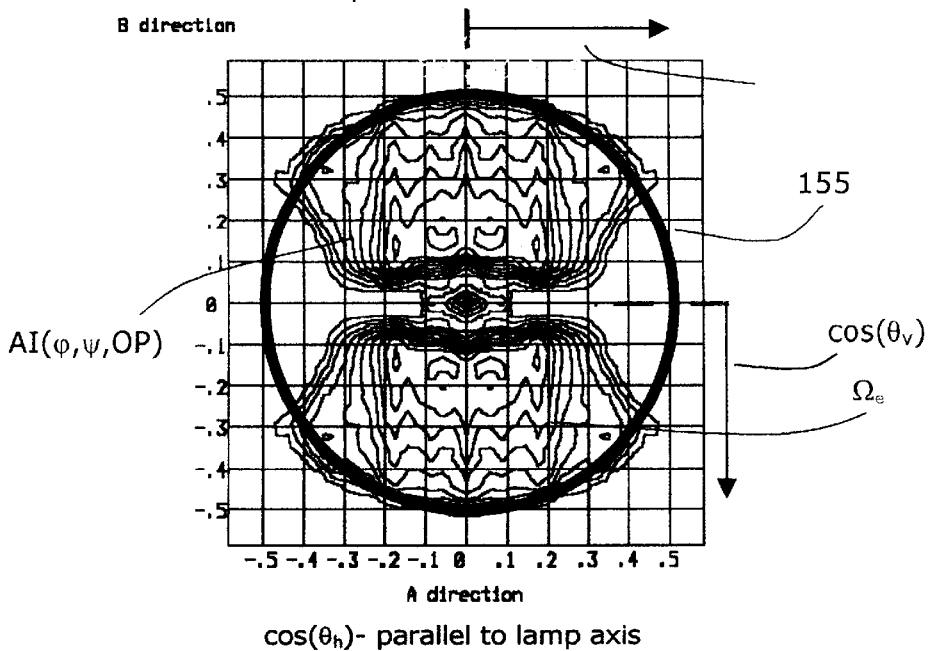
FIG. 10 shows the angular reformatting capability of this invention for a 1.2× anamorphically stretched tapered integrator rod

FIG. 10 shows the change in a typical angular dependent energy density function for a rectangular tapered quartz integrator rod that has been stretched linearly along its s-axis in the direction parallel to the lamp axis 24 by a factor 1.2. FIG. 9 shows the respective input distribution used to generate the data and the output port of the respective asymmetrically stretched taper was an 6.4×5 mm rectangular shaped emission aperature. FIG. 10 shows, that such a simple constructed ABT is capable of creating a much more uniform angular dependent energy density function, thus providing a better matched beam for a given 0.5NA acceptance cone (shown as circle 155 in FIGS. 9 and 10.) than the more asymmetric input beam. FIG. 9 also shows that in the four corners there is some spillover of energy outside the circle 115 reducing the collection efficiency somewhat. By using more complex integrator shapes and/or other types of ABT such throughput efficiency loosing, spillover losses can be somewhat reduces and the respective delivery efficiency further increased.

Thus while the beam divergence $\theta_h$ is increased in the source axis direction to match that of the orthogonal source axis direction $\theta_v$, the total collection area of the input port of the respective tapered LG is increased as well.

Thus, by taking advantage of the axial asymmetric, angular energy density function of the output beam of the preferred MLE, the effective collection area $A_c$ for a given collection étendue $E_c$ at the secondary source S' level can be increased leading, among others, to further delivery efficiency increases in étendue limited collection cases.

In addition, since most molecular radiation of gas discharge lamps are emitted over a larger emission zone than the respective atomic radiation, proportionally more broad band light is being collected with the preferred MLE (over that of the MLE-A and MLE-B type) due to 1) the quasi-imaging and nearly 100% collection efficiency of preferred MLE's and 2) due to the collection area gains arising from the use of étendue efficient, angular energy symmetrisazing ABT's. Both of these effects help in the deliver efficiency for color image generating PLE's.

A further delivery efficiency gain often arises out of another étendue efficient color reformatting opportunity that is inherent in the preferred MLE's design. By reflecting about 30–50% of the total emitted energy back into the emission region, this light can interact one more time with the electromagnetic energy emitting materials that are located inside the respective emission region. Another preferred embodiment of this invention is therefore the use of the preferred type of MLE for efficient color reformatting purposes. Since the respective MLE-F, MLE-G, etc., as discussed above, are capable of collecting and angular reformatting in substantially an étendue preserving manner the light emitted from the respective emission region into nearly 4π-steradian, such a CCS can deal with the beam redirection effects that typically occur in non-stimulated (non-laser type) light-material interactions. In particular, for some of the preferred embodiments of this invention, about 30–50% of the emitted energy is transmitted through the emission region one more time. In particular for gas discharge arc lamps, this amounts to effectively approximately doubling the optical path length of the emission region without increasing its size. Such an increased optical path length can be used to increase the conversion efficiency from narrow band atomic lines (for example Hg) to broad band molecular lines (more Xe-like spectra). Also from the above teachings it becomes clear that ideally, due to the effectively doubling of the optical path length, a different gas filling mixture is to be chosen in order to achieve an optimized delivery efficiency through such an optimized color reformatting effect.

For example, in the case of a tungsten filament lamp with a RRS 140 that is designed to focus back onto the filament (instead of adjacent to it), the non-transmitted, (absorbed by the filament structure) retro-reflected and absorbed UV, Visible and/or IR energy, can be used to further heat up the tungsten electrodes. Thus through an indirect effect, some of the non-usable light (UV and IR) and some of the lost (absorbed) visible light, can be converted into visible light. Due to the hotter tungsten surface temperature the resulting lamp will have a changed output spectra with a higher color temperature and a more blue enriched spectral intensity and operate more electrically more efficiently, i.e. it will emit more total light for the same electrical energy input. This is delivery efficiency enhancing color efficiency gain for PLE and for some other types of color dependent applications since tungsten lamps are typically blue starved.

Figure 11:
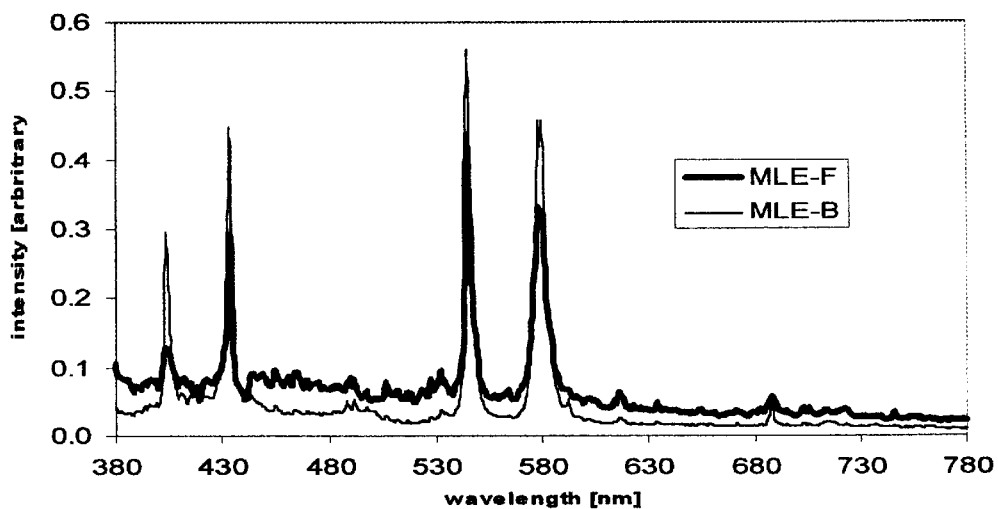
FIG. 11 shows the spectral reformatting capability of this invention

In a similar manner, the hot and energized gas inside a gas discharge arc lamp (AC- or DC- type or electrode-less, microwave powered, wall stabilized lamp, etc.) can reabsorb some the retransmitted light (in particular for optically thick wavelength bands) and then i) emit it either directly at the same wavelength, but in different directions (elastic scattering) or at a different (mostly longer) wavelength (fluorescence conversion, multi photon pumping, etc.) or ii) emit it indirectly by creating a hotter gas temperature which increases the densities of various components, which then increases their broad band emission conversion efficiencies, etc. FIG. 11 shows a representative case of such an observable spectral reformatting behavior for the preferred MLE-F and a same F/#, prior art MLE-B. Both spectra's where taken with the same 3 mm arc gap, AC-type, metal halide lamp with the respective cooling adjusted to yield the same voltage drop across the electrodes for the same electrical power consumption. The thick (thin) line shows the measured emission spectrum observed with a MLE-F (MLE-B) type system. The output beam of the MLE's was collected with a rectangular 6.4×5×25 quartz integrator rod of same length, output area and output shape. While the MLE-B case used a constant-cross section (unstretched) integrator rod, the MLE-F case used an linear anamorphically tapered integrator rod with a 1.2× 1-dimensional stretch at its input side in the lamp axis 24 direction. Note in FIG. 11 the increase in broad band molecular light emission and in particular the >100% red band output increase of the otherwise red starved metal halide lamp light output beam and the attenuation of the peaks of the respective atomic Hg-lines. The enabling element to this efficient spectral reformatting effect is the preferred MLE design that allows a very high portion of the nearly 100% collected light that escape the source S to be concentrated in a very étendue efficient, throughput efficient and color reformatting efficient manner.

Figure 12:
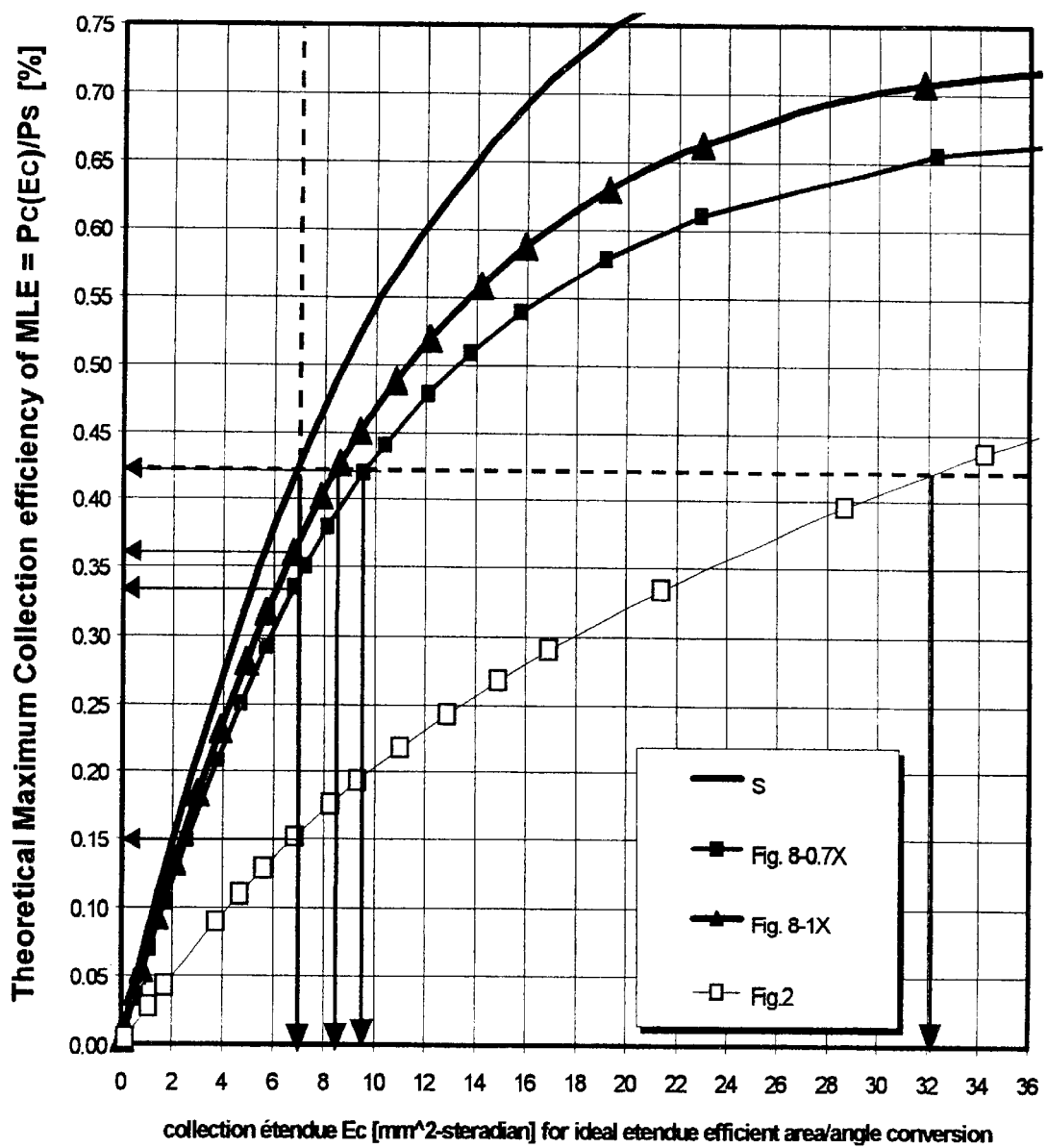
FIG. 12 shows the relative collection efficiency vs. acceptance or emission étendue for different MLE's designs.

The curves shown in FIG. 12 allow comparing the maximum theoretical collection efficiency CE, i.e.

$$CE = CE(E_c) = P_c(E_c)/P_S \qquad (6)$$

for different MLE designs. $P_S$ represents the total output power of the source S and $P_c = P_c(E_c)$ represents the maximum collectable power for a given collection étendue $E_c$. For all calculations, the reflectivity of the respective primary and/or retro-reflectors was assumed to be 100%. The Fresnel reflection losses of the lamp envelop 42 where assumed to have been antireflection coated to yield a 0% reflectivity at the outer surface of the envelope 42 and are left unchanged on the inner surface. The optical redirection abilities of the envelope 42 were included into this numerical model. All electrodes 48 and lampposts 44 and 46 were assumed to be 100% light absorbing. To determine the maximum achievable collection efficiency of different MLE designs, i.e. to determine the upside potential of this invention at the level of the MLE output stage, an ideal (EE=1) performing ABT or SBT was assumed to exist that is capable of reformatting spatially and angularly the respective output beam into any form needed for maximum étendue efficient illumination of the target T having collection étendue $E_c$. Note that the data shown in FIG. 12 represent a strictly monochromatic calculation and assuming no color conversion effects and no absorption of the retro-reflected and re-transmitted beam in the emission region of the source S due to light-material interaction inside the emission region, except mechanical blockage effect at the respective electrode tips. This calculation allows thus to separate the collection ability of a given lamp from the performance of the given MLE and from that of a given LE.

The curve 'S' in FIG. 12 shows the characteristical monochromatic emission/collection efficiency of the chosen volume source $S_B$ itself; i.e. it represents the maximum achievable collection efficiency CE for an ideal performing CCS operating in a perfect étendue efficient manner.

Another embodiment of this invention is a preferred calculation method for a collection étendue dependent maximum collection efficiency estimation of a given source S (which is more accurate than the approximation method published by M. S. Brennesholtz in Proc. SPIE, Vol. 2430, pp. 71–79 (1996)). A special version of this preferred calculation method has been used in this invention to determine the characteristical source curve 'S'. This calculation method uses a preferred MLE-F type design with DD=0 and with $|S'-S|=R1$, i.e. with a zero overshoot distance DD and with the image location of the secondary source S' chosen to be at the vertex of the RRS 140 and with a minimal sized exit port 146 that maximizes the total output of the system. Ideally, the RRS 140 is a sufficiently corrected axial symmetric, aspherical concave reflector compensating for the optical distortions of all respective envelopes of a given source S. To minimize optical imaging aberrations and the above discussed blockage effects from the source S, the reflector systems 140 and 142 are preferably scaled to $\geq 10$ times than the longest dimension $L_S$ (shown in FIG. 6 as distance between the ends of lampposts) of the source S compared to the distance $L_{PRF1}$ between the vertex of the PRS 142 and the respective source axis 24, i.e. $L_{PRF1} >> 10 * L_S$.

The collection energy of the respective secondary source S' is preferably collected on a respective flat MES on a pixel by pixel basis. Each collection pixel is preferably chosen to be sufficiently small to allow good spatial resolution of the collection intensity distribution at the MES and optionally has the same collection area to simplify the calculation if needed. Due to the chosen large reflector size, the source image curvature is negligible and the respective characteristical CCS behaves as if it images a point source. Equation (1) or (2) can be used to calculate (estimate) the proper étendue value for each pixel. The chosen exit divergence angle $\theta_v$ of the respective enlarged MLE-F, to some very minor extent, influences the maximum collection efficiency for very étendue limited values due to the different magnification of an imaging system for orthogonal and axial off-axis locations, as discussed above. However, such refinements are usually not needed and a typical divergence angle value $\theta_v=30$ deg is chosen here that is relevant for most applications at hand.

In general, the respective minimum étendue for each pixel will be a constant for all collection pixels of interest for a constant area, gap less, 2-dimensional pixel mapping of the respective MES within an area of interest. Proper care has to be taken to determine the proper solid angle value for the axial asymmetric angular dependent beam. For example, in the case shown in FIG. 9, such a calculated minimum collection pixel étendue value is about 40% smaller than that of the value calculated with equ. (2) from a maximum divergence angle $\theta_v$ alone. This provides calculation choices for either theoretical maximum collection values or theoretical maximum effective collection values based on given assumptions of angular reformatting ability of a follow on beam reformatting optical system. This effective pixel étendue value selection permits calculation also of an effective maximum collection efficiency curve that is relevant for a particular LE design (beam reformatting) constraint.

By first sorting the collection pixels according to their collection power values with the highest value being the first pixel and by then integrating (summing) their respective collection power values and pixel étendue values incrementally until a given total collection étendue value $E_c$ is reached, the maximum CE of the source S can be estimated for a given collection étendue $E_c$.

This preferred calculation method therefore allows good estimations of upper CE values and does not depend on any assumptions of the spatial and angular dependent emission characteristics of a given source S. It does however depend on a good description of the optical and mechanical properties of the lamp and of the spatial (and optional angular) dependent emission properties.

To obtain maximum collection efficiencies for different collection colors the respective color dependent emission regions needs to be modeled. Those skilled in the art can extend the above describe model to include the above discussed color reformatting gains with a suitable optical (linear or nonlinear) transfer function that can depend on the operation characteristic of a given lamp, the input spectra, the input intensity, etc., and be as sophisticated as needed for modeling the lamp under investigation; all of the above falling into the concepts of this invention.

The shape of the curve 'S' represents the monochromatic maximum collection characteristics of a source S that is relevant for designing étendue limited LE's. The more spatially concentrated and the narrower its orthogonal emission angle $\phi$ the energy emission is of a source S, the steeper is the initial rise of its associated characteristic curve 'S' and the flatter is its slope in its saturation region. That is the main reason that point-like emission sources S are typically favored for coupling light to small targets since there is more room for étendue loss to couple to a given target T. Another point, which is made clear by the curve 'S', is that typically only a fraction of the total emission power is available for energy collection at a given collection étendue $E_c$. FIG. 12 also shows a dashed vertical (horizontal) line indicating a chosen collection étendue value of $E_c=7$ mm$^2$-steradian (CE=42% and the respective horizontal (vertical) projections (indicated with arrows) show the respective collection étendue values CE for the given curves.

The curve labeled 'FIG. 2', for example, shows the results obtained with the prior art, LGLE-B shown in FIG. 2. By dividing the curve 'FIG. 2' with curve 'S' the throughput efficiency curve, i.e. TE=TE($E_c$), of the MLE-B can be calculated for the chosen system parameters. In a complimentary manner the étendue efficiency curve, i.e. EE=EE($P_c$), of a respective MLE can be calculated from the ratios of vertical projections for different collection power levels $P_c$.

The curve labeled 'FIG. 6-1X' shows the improved performance of a preferred embodiment of the invention, i.e. the MLE-F shown in FIG. 6 for the same system parameters that lead to the data shown in FIGS. 8 and 9. The curve labeled 'FIG. 6-0.7X' shows the reduction in collection efficiency for a shrunken down (0.7X sized) MLE-F illuminated by the same size source $S_B$ due to the above discussed source blockage effects. To show the magnitude of the source blockage versus reflector size effect the respective pixel étendue values for the curves 'S', 'FIG. 6-1X' and 'FIG. 6-0.7X' used all the same effective pixel étendue value which is reduced by a factor of 0.7 from the pixel étendue value associated with a axial symmetric beam having a respective maximum divergence angle thereby under representing somewhat the maximum theoretical achievable CE for the 1.0X and 0.7X curve.

The reflector systems 140 and 142 can have the same or different reflective coatings. Often dielectric multi layer coatings are used to generate a wavelength selective reflection. A typical example is a cold reflector coating that transmits most of the infrared and UV light and reflects the visible portion of the spectrum. The substrate material of the reflectors 140 and 142 can be of similar or dissimilar materials. Each of the reflector substrates can be glass, quartz, ceramic, metal, etc. and made form a homogenous or inhomogeneous material (for example honeycomb support structure of thin reflective surface for larger size reflector structures). Some of the transmitted energy is preferably transmitted through the reflector substrate and/or absorbed and conducted thermally to its external surface. A (continuous) flow of air or liquid can be used to remove heat from the external (and optionally internal) reflector surface to prevent an overheating of the reflectors and, in particular their reflective coatings and or the source S inside the reflector housing.

For some types of ABTLE's, a portion of the incident energy is retro-reflected by and/or through a respective ABTS. This can occur either through Fresnel reflections, or total internal reflection effects of a given ABTS, or through external retro-reflecting means, for example wavelength selective reflectors. Rays that get reflected by a ABTS that has its respective input port located near the secondary source S' position of a preferred MLE, behave just like any other retro reflected ray that travels back to the source S. Such rays can therefore, by interacting with the source emission region, as discussed above, generate some incremental light output that is not reflected by the ABTS due to its different spatial, angular and/or spectral input conditions. Another preferred embodiment of this invention is therefore the method described above to increase the effective throughput efficiency and color-reformatting efficiency of such preferred ABTLE's by using partial retro-reflective ABTS or ABTLE's.

By choosing a respective auxiliary retro-reflector 152 (for example a reflective mask that is either flat or optionally has a suitable surface curvature like that shown in FIG. 7) in combination with a minimal sized exit port 154 and suitable LG means for energy collection and remote delivery a portion of the otherwise lost energy (spilled outside the effective collection aperture of the input port of the LG) can be redirected back into the emission region of the source S where it can directly or indirectly be converted into light that now is partially collectable by the respective LG input port and thus aiding in the maximization of the total delivery efficiency of the respective LGLE.

A further preferred embodiment of this invention is the use of a LGLE using a preferred type of MLE and a LG collecting light from the respective secondary source S' and having at least one chosen wavelength conversion material between or near its input and output port which absorbs some of the incident energy and convert it into another wavelength band. While such wavelength conversion effects typically have a low collection efficiency due to the small collection efficiency of such wavelength converted light, when used in this preferred manner an increased delivery efficiency can often be achieved due to 1) the high forward collection efficiency of a chosen LG and due to the ability of the MLE to retro reflect and color reformat some of the backwards emitted light. Preferably such materials are either a doping material of the LG's solid, fluid or gaseous inside material itself and/or is localized near the input port of the respective LG. For example, such wavelength conversion material can be supplied in a solid form as a spinning doped wheel located near the respective input port of the LG, or imbedded into the core material of a respective LG. Alternatively it can also be a continuously moving doped fluid or gaseous medium filling the inner space of the respective LG or be permanently attached to its input port, or flow as a thin sheet in front of the input port of the LG, etc. As described above, steeply tapered LG's can often be used which have a high collection NA and therefore a high forward and backwards collection efficiency and which relay on a matched MLE design to retro reflect a portion of the backwards emitted light.

Optionally, as discussed above, such a special LG can be combined with auxiliary retro-reflectors 150 and/or 152 to aid in the coupling of usable light into the LG's input port. Additionally for narrow band spectral output needs, the output port of the respective LG can be provided with means (or optional external means like a physically separated dialectically coated band pass reflecting mirror) for retro-reflecting a portion of otherwise unusable spectral energy back into the LG thus effectively allowing a portion of such otherwise unusable energy to travel one more time through said color shifting material and to be retro reflected directly or indirectly by the MLE, as discussed above. In such a manner, a wavelength converting, unstable, retro-reflecting cavity can be formed which can further enhance the delivery efficiency of usable light for a particular application.

Therefore with the proper choice of gas discharge lamps and in combination with the just discussed wavelength converting LGLE a dual color reformatting systems (lamp and auxiliary color conversion material) can be build that can further increase the delivery efficiency for particular band pass limited LE applications (material processing, narrow band illumination, etc.) and thus able to compete in some remote energy delivery application with lasers. Also, special color conversion material can also be added to the gas mixture itself. For example by adding Ar, Na, K, or Kr, etc. to a Xe- or Hg-lamp the output spectrum of the lamps can be modified to be more usable for a particular application. Similarly metal halide salts can be added aid in the color reformatting task of such a dual color conversion LGLE system.

Instead of optimizing the input port of a respective LG or ABTS for maximum delivery efficiency one can also use the linear dependency (result of quasi-imaging capability of preferred MLE's) of the secondary emission region on the arc gap length of a gas discharge arc lamp to design a slightly elongated, sub optimal, collection aperature which is better matched to the spatial characteristic of the emission region of an aged lamp. Thus by slightly de-rating the potentially achievable initial delivery efficiency of a respective LGLE or ABTLE one can achieve superior long term output stability. Since the linear increase of the arc-gap of an aging gas discharge lamp results, in combination with a preferred type MLE, in a linear increase of the respective secondary source S' such an output stabilization design tradeoff results in a much lower output efficiency loss and much higher output color stability than a similar design efficiency/output stability tradeoff for a prior art non-imaging type MLE and respective LGLE, PLE, etc. It is therefore another preferred embodiment of this invention to achieve a superior output stability of usable light by slightly over-stretching the input collection aperature in the direction of the lamp axis 24 of the respective input port to achieve a more constant output level of usable light for a reduced tradeoff of initial output levels at the beginning of the life of a respective lamp. An optimized use of this preferred embodiment of the invention can, for some types of arc sources result in a total output power stability of better than +/−15% over the total life of a source $S_B$ while allowing an arc gap change of 25%. Ideally such a lamp contains gaseous means for removing deposited (electrode) material from the inner walls of a respective inner envelope 42 at least near the regions where the collectable light exits the bulb, i.e. its center and widest portion.

Therefore, the use of this embodiment enables also the use novel arc lamp designs were the constraint on arc gap erosions are being reduced in favor of more usable color generation and/or other desirable benefits.

Figure 13:
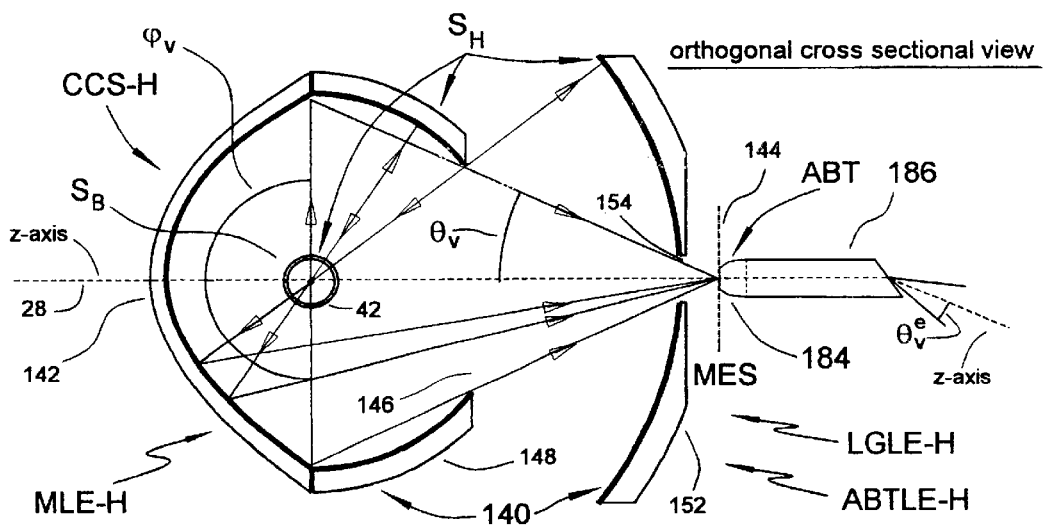
FIG. 13 pictorially shows a top cross sectional view of a LGLE-H with a folded retro-reflector.

FIG. 13 shows a top view of a different preferred embodiment of this invention applied to the design of a LGLE-H (and ABTLE-H) which is a modification of the basic LGLE-F and LGLE-G designs. This design variation uses a 'folded' RRS 140 to reduce the width and/or height of the reflector 140 for MLE design situations where the concentration angle $\theta_v$ needs to be significant smaller (for example 20 deg) than a respective minimum blockage loss solution for the same height limitation, and where the throughput efficiencies TE of the respective CCS-H still needs to be as high a possible. Just like in FIG. 7, a primary retro-reflector 148 and at least one auxiliary reflector (one being shown as reflector 152) is used here, but the exit port 146 of the primary retro-reflector 148 is larger and the auxiliary reflector 152 collects a proportional larger portion of the emitted energy. The system is shown with the second exit port 154 being located before and very close to the respective MES 144. Similarly, the PRS 140 can be folded and/or truncated as needed to obtain a more compact CCS-H.

The LGLE-H design allows to easily insert, if desired, an optical flat, or curved, or segmented, etc. band pass filter 180 between the reflectors 148 and 152 to spectrally filter the concentration beam at a location where the intensity at the filter surface is low, thereby reducing filter deterioration through long term light exposure and overheating. This design feature is useful for high power MLE system where a spectral filter 180 cannot be located near the respective MES 144, without degrading the filter over time in an unacceptable manner. Optionally such a filter element can be rotated continuously or semi-continuously to minimize local filter overheating. If need, a variable beam attenuator can also be positioned conveniently near the location of the filter 180 shown in FIG. 13. Alternatively, such an attenuator can be placed in front of the input port of the respective LG 186.

Asymmetric beam reformatting of the concentrated energy at the MES 144 can be accomplished, as discussed above with one or more respective ABT's. For example, FIG. 13 shows the case where an ABT 184 connects to a constant cross sectional shaped LG 186 that has a biased exit surface as an special output port configuration that is tilted against the beams z-axis (=auxiliary prism) thus providing an additional beam steering function. The type of ABT shown here is a hollow or solid LG 184 that is either a separate part that is attached to the input port of the LG 186 or is a special input surface preparation of the respective input port. For example, FIG. 13 shows the example of a CPC as a preferred cross sectional shape in the vertical plane, that is used to lower the vertical divergence angle from $\theta_v$ to $\theta^e_v$, and is an ABT that changes the direction of each ray with substantially only a single reflection interaction. In order to change the respective divergence in two directions, a bi-axial CPC shape can be used. Typically such asymmetric CPC-type shaped anamorphic beam transforming, light guiding, reflective hollow, or total internal reflecting solid elements, have the highest étendue efficiency for a given angular conversion task since only one reflection interaction is by design used to modify the beam directional angle with respect to its optical axis. This makes them very space and high throughput efficient. Depending on the desired beam reformatting task in a given preference plane (reducing or increasing the respective divergence angles). Other types of non-imaging, étendue or quasi étendue efficient shapes can be chosen. For example: a trumpet shape, a conical shape, a section of an oboloid or ellipsoid, a hyperbolical shape, i.e many other types of shapes as discussed for example in the book High Collection Non Imaging Optics by Welford and Winston). Due to this minimal interaction between such a type of ABT and the incoming beam they are typically not also able to spatially homogenize a beam so that SBT need to be used as beam homigenizer. For example, FIG. 13 shows the use of a constant cross sectional, rectangular integrator rod, i.e. LG 186.

Alternatively the LG 186 can just be a conventional, constant cross sectional shape, LG that is used for energy collection and remote delivery as discussed above to form a respective LGLE-H.

Figure 14:
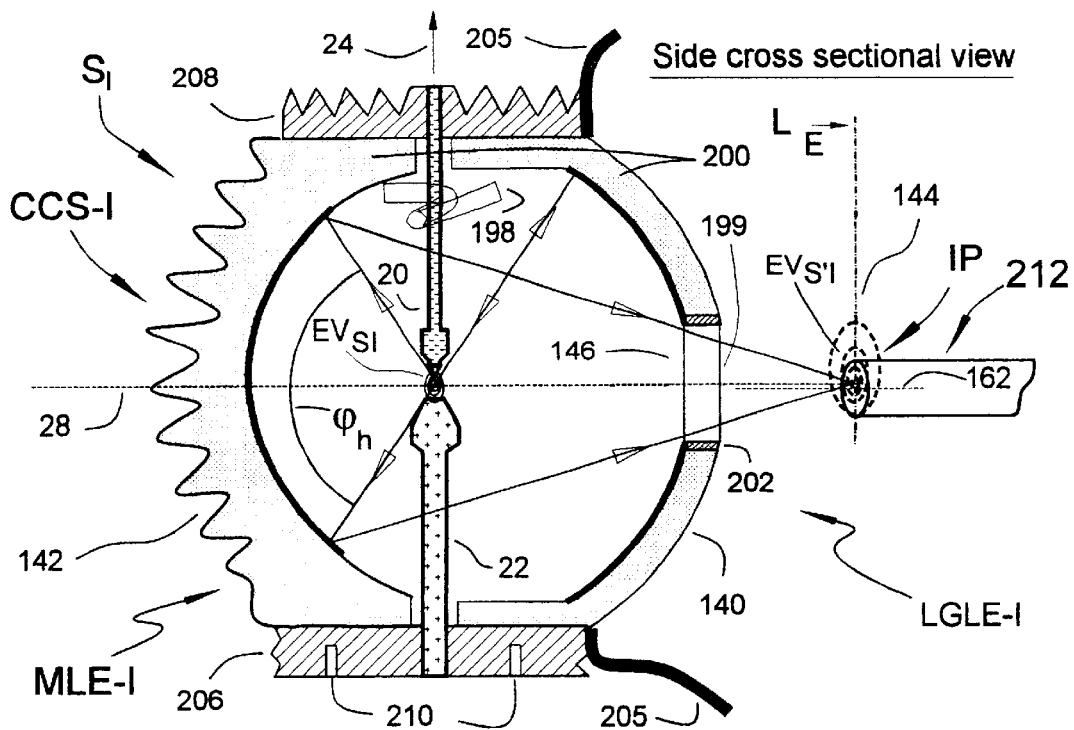
FIG. 14 pictorially shows a compact, sealed reflector lamp for a LGLE-I.

FIG. 14 graphically shows a side view of another embodiment of the invention with a very compact, étendue efficient, single output port, sealed reflector lamp $S_I$ that is related to the MLE-G design. The preferred embodiment shown in FIG. 14 uses as a source example a vertical oriented DC-type plasma arc energized by the cathode 20 and anode 22. Although not shown the above and below teachings can be applied to other orientations and sources as well, like, for example, AC-type type plasma arcs and tungsten or tungsten halogen filament lamps operated in continuous, pulsed or AC modes, etc.

In FIG. 14 the reflectors systems 142 and 140 form a sealed reflective cavity 200 that encloses an energy emitting materials (for example Xe, Xe-Hg, Xe-Kr, metal halide salts, etc.) as long as the chosen materials used to build such a MLE-I are compatible over time. The retro-reflector 148 has an exit port 146 that is sealed gas tight with a seal 202 to a transparent exit window 204 through which the light escapes. The exit window 204 can be optionally coated with a dielectric multi-layer for selectively transmitting and reflecting chosen wavelength bands. The cavity can be made from glass, quartz, ceramic with a glazing overcoat, etc. with appropriate manufacturing technologies to result in the desired final concave surface shape with acceptable surface finish. Dielectric or metal coatings can be applied to control the reflectivity of the reflectors and optionally other transparent sealing layers can be put over these coating surfaces to protect them from the gas exposure. Optionally the reflective coating can also be put outside of a transparent surface (for example glass or quartz) with an appropriated reflector surface curvature correction as necessary.

The reflective cavity can be made from one or more parts. For example, in one preferred embodiment of this invention a suitable accurately blown shape of a quartz or glass envelope can be used to make a single part cavity that optionally uses no seals 202 and extra window 204. Instead a portion of the primary retro-reflector 148 can be coated differently to form the exit window 199, thus allowing light to escape the exit port 146 as shown in FIG. 7.

Note that this case is similar to a prior art projection lamp manufactured by PHILIP$_S$ which uses a very tightly wound flat tungsten helix with a substantial rectangular cross sectional shape that is placed in an on-axis position into a single part reflective cavity made from blown glass with a vertical source axis orientation so that its retro-reflector portion images the collected energy back onto the tungsten helical rectangle. The reflected energy is thus used primarily to heat up the tungsten element. Very little of the re-imaged energy reaches the exit port 146 directly through follow on reflection on the primary reflective portion of the single part reflective cavity. The primary application of this lamp is to illuminate a rectangular aperature uniformly, like that of a film projector.

A preferred improved embodiment of this invention over this prior art single cavity MLE places the tungsten helix in an off-axis position with respect to the reflector axis 28 of a single part reflective cavity 200 and additionally uses a ABT as discussed above to build a novel LGLE for efficient energy collection and delivery. The resulting advantages of this MLE design modification for non transparent tungsten helix sources will be discussed in more detail below in relationship to FIG. 16.

A preferred embodiment of this invention uses 2 or more molded glass or quartz reflector parts which are then fused, soldered, braised or otherwise sealed in a suitable manner of form the cavity 200. A different preferred embodiment of this invention uses cast ceramic reflector parts that are almost completely comprised of alumina. A thin glaze coating followed by a metal or dielectric coating is applied to the inside surface of the reflective portion of the parts to achieve the desired surface quality and reflective characteristics. In the case of a dielectric coating it is preferred that the radiation transmitted is not being reflected back into the beam and is instead being absorbed into the glaze and ceramic body and heat conducted away from the reflective surface. A preferred window material 199 is sapphire or quartz or tempered glass shaped as a flat window or concave-convex lens as shown in FIG. 7. The preferred choice of window material depends on the operating requirement (pressure, gas chemistry compatibility, operation temperature, braising material, etc.) of the sealed reflector lamp $S_I$.

Still referring to FIG. 14, just as discussed for the MLE-G and MLE-H shown in FIGS. 7 and 13, the reflector systems 140 and 142 can be folded as necessary to save space. Note that typically the reflector body heats up and expand somewhat. This makes the sealing of the electrodes and exit port 146 particularly challenging. Optionally, if desired, one can consider to design pre-distorted reflector surfaces that deform to the right shape and location when operated near the design temperature range.

The PRS 142 is shown in FIG. 14 with an optional rippled outside surface while the reflector system 140 has been shown with an optional smooth surface which has a quasi-constant wall thickness. Of course both concepts can be mixed and applied to each part as appropriate. A quasi-constant wall thickness is often desired for molding, stamping and other manufacturing process which are based on plastic deformation of softened materials, like for example glass. The rippled outside surface is can be produced with cast or molded process where a viscous material is used to fill a suitable designed mold which is designed in such a manner that the varying part thickness doesn't result in a rippled inside surface. The purpose of the rippled outside surface is to increase its surface area and therefore to increase the cooling efficiency and heat conduction of the reflector to increase the heat removal of the non reflected energy discussed above. Optionally a metal, ceramic or glass surface with or without surface ripples can be put in thermal contact with the outside of a (smooth) reflective cavity to increase heat removal. Care has to be taken that metal heat sinks do not shorten out the arc current. Such heat sinking aid can of course be applied to other types of MLE, i.e. not sealed ones, etc. as well and in particular can be attached to the ends of lampposts 44 and 46 to lower the temperature of the molybdenum foil seals used remove heat from inside the inner envelope and to deliver electrical energy to the electrode tips.

Electrical lead wires 205 are shown in FIG. 14 in contact with optional heat sinks 206 and 208 that are in thermal contact with the electrodes 20 and 22. The latter assist in the cooling, electrical connecting and mounting of the reflector source $S_I$, i.e. MLE-I. Again, the heat sinks 206 and 208 have been shown with an optional rippled exterior surface for increased surface cooling. In addition, the heat sink 206 has been shown with optionally mounting holes 210.

Note that FIG. 14 shows a design case where there is no envelope 42 which distorts and/or blocks the energy propagation as discussed above. Therefore the preferred shape of the primary reflector 142 for this invention is substantially ellipsoidal with a first focal point at the maximum of the emission volume $EV_{SI}$ and the second focal point near the axial location $L_E$ which is also the vertex of the MES 144. The preferred RRS 140 is shaped substantially spherically for a DC-type plasma source and substantially elliptically (see discussion on LGLE-F) for an AC-type plasma sources. If however the source volume $ES_{SI}$ is significantly elongated, for example a tungsten helix, the preferred shapes are no longer axial symmetric. This will be discussed more below in relationship to FIG. 16. Depending on the optical property of the exit window 199, the elliptical RRS 142 can optionally be slightly aspherized to pre-compensate the optical defocusing effects of the exit window 199 as discussed above. Note that the exit windows 199 can also have curved surfaces resulting in a lens-like behavior in order to jointly improve (in a matched manner together with the PRS 142) the beam concentration ability of the CCS-I and/or to comply with some manufacturing constraints.

The input port IP of the LG 212 is preferably configured as discussed above. Note that for a DC-type plasma source the arc gap erosion is asymmetric. Therefore to minimize output decay of the LG 212 over the life of the lamp, as discussed above, the optical axis 213 of the LG 212 needs to be slightly offset vertically (parallel to the system axis 28) from its ideal coupling position (as shown in an exaggerated manner in FIG. 14).

Optionally the input port IP of a LG 212 itself can form the respective sealed exit window 199, thus collecting the light near the vertex of the reflector system 140 and guiding it through an air tight seal 202 outside the cavity 200 where its output port OP can either be used directly or coupled to a further LG's or ABT's. Again as needed the LG 212 can be suitably matched ABT.

A major advantage of the preferred MLE-I type is the reduced size of the reflective cavity 200 for a chosen throughput efficiency TE and a given emission volume by talking advantage of the significantly reduced blockage losses. Optionally it is preferred for this invention that the electrodes 20 and 22 near their tips are shaped axial asymmetrically as discussed above. This allows further reducing the beam blockage of the electrodes, in particular for such DC-type sealed reflector arc lamps.

Figure 15:
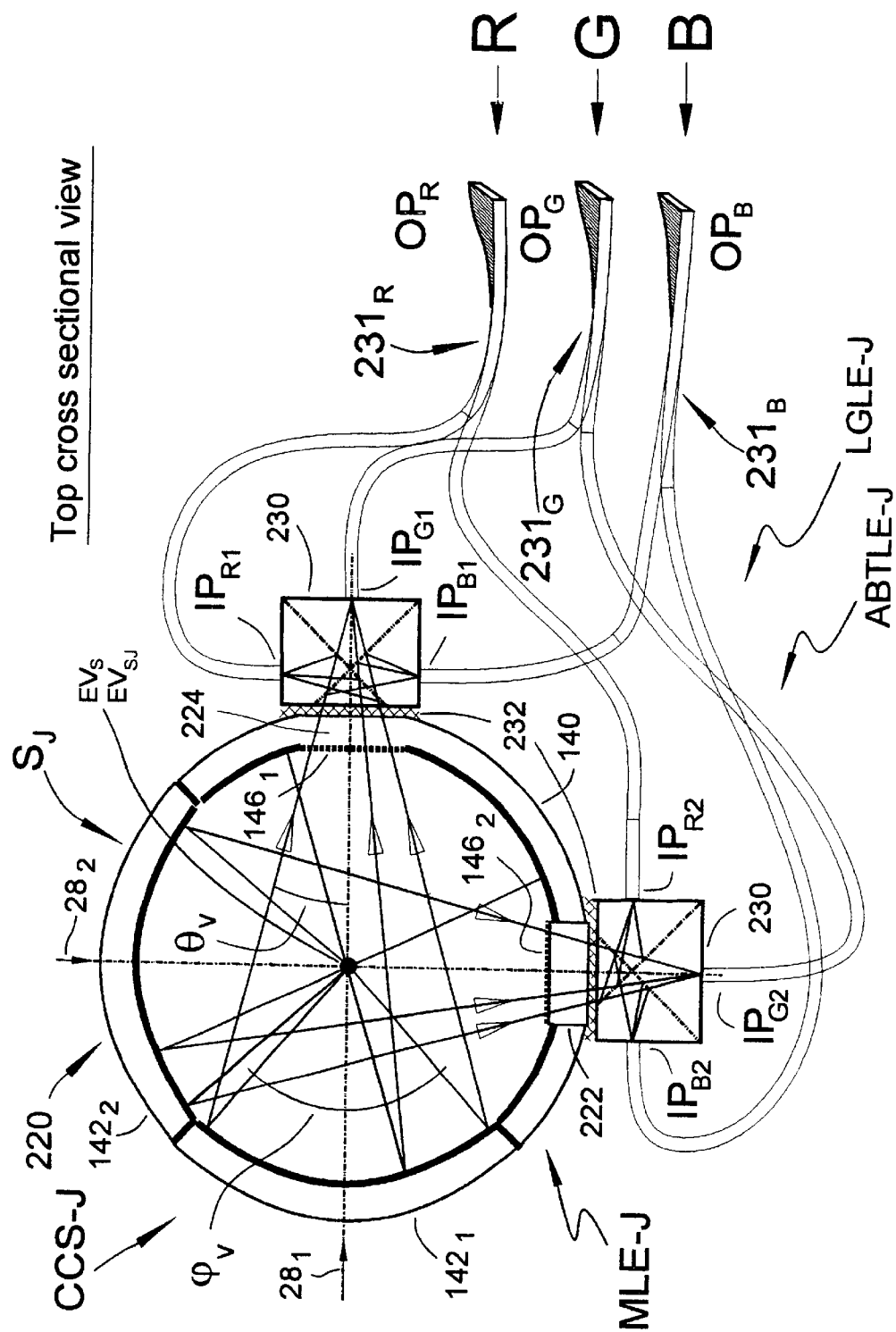
FIG. 15 shows a dual port LGLE-J with a triple color band generation system.

FIG. 15 shows schematically a top cross sectional view of another preferred embodiment of this invention for a LGLE-J. This figure highlights two different preferred embodiments that can be used simultaneously, individually and/or in combination with other embodiments of this invention. The first embodiments relates to a two or higher axis version with a two axis version shown in FIG. 15 of the LGLE-I and represents a compact reflector lamp $S_J$ comprised of an emission volume $EV_{SJ}$ and a sealed reflective cavity 220 which has two exit ports 146$_1$ and 146$_2$ with respective system axis's 28$_1$ and 28$_2$. The cavity 220 is formed by two substantially elliptical primary reflectors 142$_1$ and 142$_2$ rotated 90 degree apart around the source axis 24 (normal to drawing plane) and a substantially spherical, elliptical or axial symmetric aspherical RRS 140 (see discussion above). Each primary reflector 142$_i$ collects a vertical angle $\phi_v$ ($\approx$90 deg for a two port system). The retro-reflector 140 collects and reflects ($M_o$=−1) all the radiation emitted into a substantial portion of a hemisphere (>180 deg) back to the emission volume thus creating the effective emission volume $EV_{SJ}$ that emits only into one hemisphere. Depending on the manufacturing technology available, the two primary reflectors 142$_1$ and 142$_2$ can be made as one part that is sealed with a single or multiple part retro-reflector 140 to form a gas tight cavity 220 together with the exit windows 222 and 224.

The two exit ports 146$_1$ and 146$_2$ are shown sealed with two different preferred types of exit windows 222 and 224. The exit window 222 is shown here as a flat optical element with a dielectric coating on the inside for spectral filtering of the output beam which has been secured to the RRS 140 with a gas tight seal. Exit window 224 is shown optionally as flat, plan parallel segment of the curved retro-reflector 140 that has been coated differently than the rest of the reflector and that has an optical transparent substrate in the wavelength bands of interest. Other types of windows can be chosen as needed.

The optional dielectric multi layer coating (shown as dashed line applied to the windows 222 and 224 on the inside) additionally spectrally filters the escaping energy. The color filtering of the emitted energy can be shared between the reflective coatings of the reflectors 142$_1$, 142$_2$ and 140 and the surfaces of the exit windows 222 and 224. For example, all curved reflector parts 142$_1$, 142$_2$ and 140 could be coated with standard, low cost, mass production coating technologies with a highly reflective, protected, broad band, metal coating. Since in this case no special coating manufacturing provisions are necessary to minimize coating non-uniformity's caused by local varying incident angles of the reflector surface this would allow to assembly such composite reflector lamps from the fewest components possible.

Wavelength filtering dielectric coatings can also be put on the outside surface (opposite to the surface shown in FIG. 15) if the energized gas chemically reacts with the coating materials over time or if it simplifies the coating applications. By applying an anti reflection coating to the exit window 222 and/or 224 surfaces, the total energy delivery efficiency DE of these reflector lamps $S_J$ can be improved between 4%–15% depending on the refractive index of the window material (glass, quartz, sapphire, etc.)

FIG. 14 shows a side cross sectional view of such preferred compact reflector lamps having at least one axis 28. A comparison between an one and a two system axis case, i.e. one or two exit port case, i.e. MLE-I and MLE-J, shows that the volume occupied by the cavity 220 is $\approx$⅛ the volume occupied by the cavity 200 when both design are laid out both for the same maximum vertical concentration angle $\theta_v$ ($\leq$45 deg) and the same first and second focal point for the PRS 140. Also note that in the 2 axis case the respective primary reflector extends from its vertex to a significant undershoot plane, i.e. DD $\approx$|F1$_i$|/3 with |F1$_i$| being the distance between the intersection of the respective primary reflector segment and a given optical axis 28$_i$ to the focal point of the ellipse, i.e. the center location of the emission region.

Although multiple port MLE's are slightly less throughput efficient than single port MLE's (due to increased electrode shadowing), the achievable significant volume reduction makes multi port MLE-J attractive for special applications where diameter, volume and/or material costs are less an issue than multi port energy collection.

In principal, a two or multi-port MLE's based on this invention can also be build with sources having an envelope 42 (for example for a source $S_B$). However the size of the envelope and lampposts require larger multi port reflective cavities 220 than the MLE-F requires for similar throughput efficiencies requirements to reduce the increased bulb and lamppost shadowing effects of multi port MLE's. Therefore, multi-port MLE's often are only practical for sources having very small bulb and lamppost diameters (relative to $L_{PRF1}$).

The second embodiment of this invention shown in FIG. 15 relates to efficient simultaneous delivery of different colored light beams. As this figure shows, the exit beam of the MLE-J is first spectrally separated into different colored output beams (three being shown) with a color separators 230. Next, each of these color separated outputs beams is collected with appropriately shaped input ports $IP_i$ of various LG's 231$_i$. The LG's that transmit the same colored light can then be combined into a single respective output port $OP_i$ as shown in FIG. 15 for a red (R), green (G) and blue (B) channel. Optionally the color separator 230 can be bounded (either permanently with optical cement or with a thin layer of index matching fluid 232 to the exit window 222 and/or 224. Together the color separators 230, the respective reflective cavity, the respective electrodes (sealed in a gas tight manner to the reflective cavity) and the emission volume $EV_S$ form the respective MLE-J. Preferably the LG is of a high efficiency type (>90%) as discussed above and its input port (not shown in FIG. 15) contains an auxiliary ABT for étendue efficient angular dependent, energy density function symmetrisazion the total system thus forming the respective ABTLE.

FIG. 15 shows a 'color cube' as preferred color-separating device 230 due to is superior space efficiency. Many other types of color separators are known and can be used in conjunction of the teachings of this description. FIG. 15 shows the case where the outputs of three respective color beams (R, G, B) are collected with six or twelve input ports $IP_i$ and combined into three LG output 176$_i$ with respective output ports $OP_i$. The surfaces of the input ports $IP_i$ are shown in optical contact (for example by using a thin layer of index matching fluid or gel) with the color separator 230 to minimize Fresnel losses at the glass-air interfaces. If desired, the color separator 230 and/or the input ports $IP_i$ can also be separated by an air gap and the respective surfaces can optionally be antireflection coated to reduce the Fresnel losses at these interfaces.

In FIG. 15, the output beam cross section of the three LG's 176$_i$, have a chosen narrow rectangular exit aperture that is similar to output beams requirements of the prior art PLE case discussed in U.S. Pat. No. 5,484,318 for a scrolling color band, single LV, projection display system. This invention provides additional design freedom to optimize the configuration of the respective LG output ports $OP_i$ in various ways. U.S. Pat. No. 5,484,318, for example, suggests curving the entrance surface of the scanning prism to increase the linearity of the color band sweep over the respective LV surface area. A preferred embodiment of the invention (see FIG. 7) uses a LG's with an output configurations having a curved output surface and/or non-parallel beam directions (auxiliary optics) to simplify the design and/or improve the performance/cost of the scanning prism/light engine system. Optionally also a preferred MLE-F, or one of its variations is used to further improve the delivery efficiency of the thus resulting PLE. For example, curved output surfaces $ES_t$ or LG in combination with a scanning prism having flat polished surfaces could be used to achieve the same functionality that U.S. Pat. No. 5,484,318 achieves by using three parallel narrow beam strips illuminating a rotating prism having concave polished surfaces. This design change would simplify the manufacturing of the prism.

Alternatively the native asymmetric beam divergence parallel to the lamp axis can be used to simplify the building of PLE for scrolling type color applications.

Figure 16:
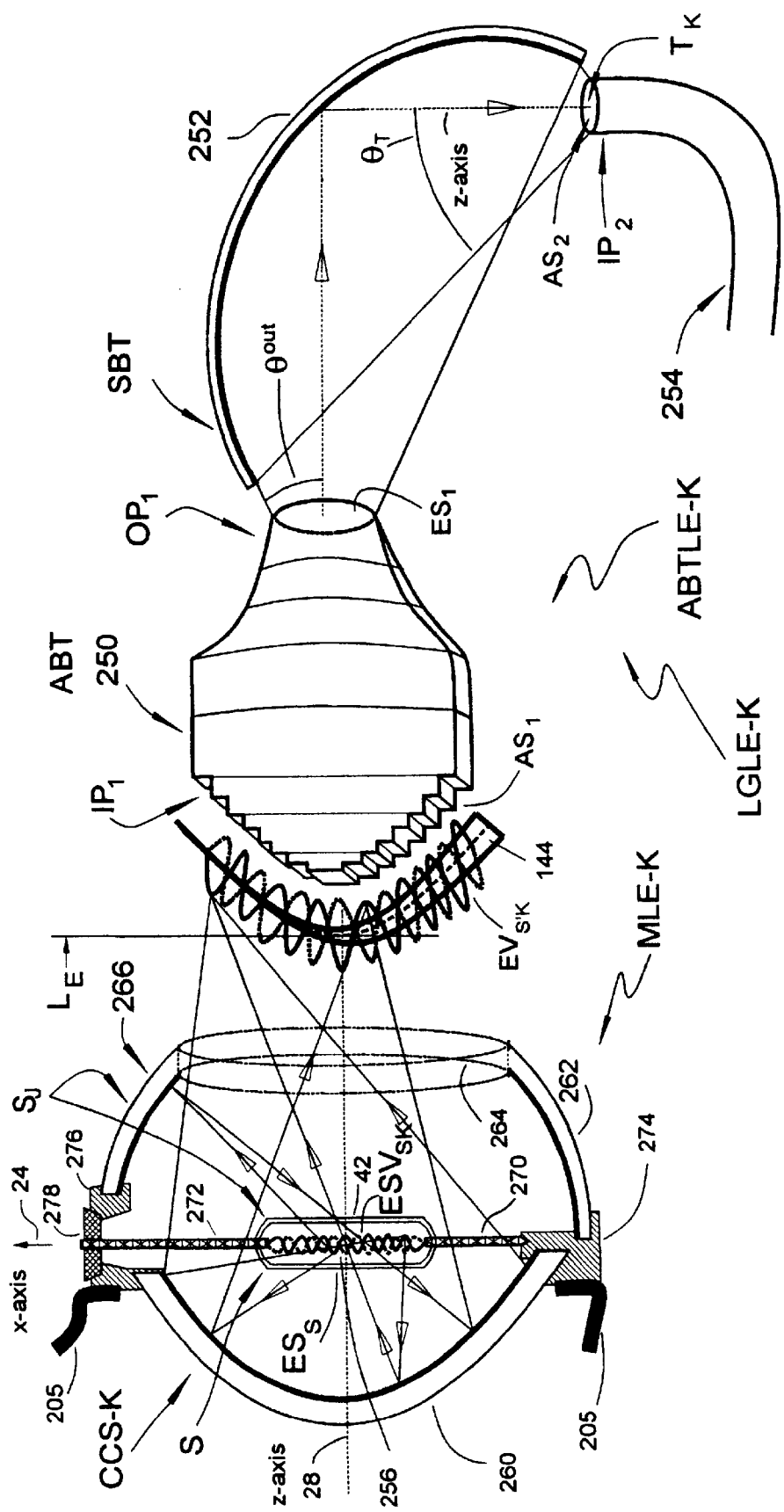
FIG. 16 pictorially shows a LGLE-K with a curved minimal étendue surface and matched LG adapter whose output is coupled to another LG.

FIG. 16 shows in a schematic way (part vertical cross section and part perspective view) the ABTLE-K and LGLE-K. Again, two different preferred embodiments of this invention are shown in one figure. The first embodiment focuses on an étendue efficient MLE-K design for a cylindrical tungsten or tungsten halogen source S. The second embodiment shows an ABT 250 with matching coupling optic 252 and collection LG 254 as LGLE-K and ABTLE-K. While mainly cylindrical semi-and non-transparent helical surface emitters are being discussed below, the teachings in this invention can be adopted for other shapes as well. In particular shapes of long arc, AC-type plasma emission sources having two spatially very distinct and separated emission maximums connected by a lower luminous straight or bowed cylindrical shape zone or an elongated cylindrical emission column like a small linear arc or fluorescence lamp.

The source S shown in FIG. 16 has a source axis 24 and a transparent inner envelope 42 enclosing in a gas tight manner a primary emission surface $ES_S$ which is surrounded by either vacuum or a suitable energizable gas. Such a gas can be chosen for example for its ability to reduce the speed of electrode erosion (halogen-tungsten cycle) and/or as energizing, spectral shifting and/or light-emitting medium (volume source like a metal halide arc source or a high pressure Hg source).

The MLE-K design shown in FIG. 16 is similar to the MLE-F shown in FIGS. 6 and 7. It is made up of a source S, a primary reflector 260 and a retro-reflector 262 having a single exit port 264 through which the energy escapes the reflective cavity 266 to reach the MES 144 (shown as a curved band in a semi-perspective way) that intersects the system axis 28 at the axial location $L_E$. Optionally the exit port 264 (shown in a perspective view) has an elongated cross section to maximize the reflective surface area of the retro-reflector 262. This exit port can be covered by an optional window (with or without dielectric coating) as discussed above for other embodiments of this invention.

FIG. 16 shows as example of an emission surface $ES_S$ an elongated straight helix 256 made from tungsten wire. The inside of the envelope 42 can optionally be coated with a fluorescing material as found in standard low pressure fluorescent lamps, thus forming the effective primary emission surface $ES_S$. Optionally the outside or inside of the envelope 42 can be coated with a dielectric multi-layer coating which selectively transmits and reflects chosen wavelength bands (IR reflection and anti reflection in visible).

The mounting electrodes 270 and 272 are shown as electric conductive holders who are used to energize the source S and to secure its spatial position with respect to the reflective cavity 266. Optional lamp holding systems are shown schematically as blocks 274 and 276 that hold the reflectors 260 and 262 together. These blocks 274 and 276 conduct electrical energy from the electric lead wires 205 to the electrodes 270 and 272. Further they can secure the spatial position of the source S as well as facilitate its field replacement. For example, the electrode 272 is shown with a conical plug 278 that locks its position with respect to the holding block 276. In the same manner, the conical end of the electrode 270 is shown to fit a conical depression in the holding block 274. The MLE-K shown in FIG. 16 facilitates the replacement of the source S without destroying or separating the reflective cavity 266. Without limiting the above description the reflective cavity 266 can also be designed in the spirit of any other preferred MLE including a gas tight sealed system having a single or optical axis and optional having no envelope 42 and appropriate sealed windows for the radiation to escape to the respective MLE.

The non-magnifying, vertical image inverting, retro-reflector 262 creates [if optimized for this function by correcting for the optical distortions of the envelope 42 and minimizing off-axis aberration with n axial symmetrical (with respect to source axis 24) aspherical reflector (quasi-elliptical or quasi-toroidal)] a substantial mirrored image of the emission surface $ES_S$ which shown in FIG. 16 as left-right and up-down inverted image of the original helix. This source image now forms a volume source that together with the surface emitting helix 256 forms the effective emission surface/volume $ESV_{SK}$ that illuminates the primary reflector 260. Do to self-blocking of the emission along the helix axis (longest dimension of the filament oriented orthogonal to the system axis 28 the angular dependent emission function of such an extended filament lamp is donut shaped.

Note that due to the non-transparency of the helix 256 some of the energy re-imaged by the retro-reflector 262 is now being blocked by helix 256. These results in some losses for the total energy delivery of MLE-K but also in an increase the usability of the output light as discussed above.

Therefore, the optimization of the retro-reflector 266 and the on-axis positioning of the source S now depends on the spatial fill ration of the helix 256 used as surface source and the collection étendue of the illumination target. If the light blockage is too high, a preferred embodiment of the invention (pending collection étendue permits) to offset laterally the tungsten helix by an offset distance D≈W/2 (neglecting envelope 42 effects) from the vertical plane containing the system axis 28 with W being the cylinder diameter or width of the helix if the envelope 42 is wide enough to allow an offset and mirror imaged source image opposite to said system axis 28. This results in a retro-reflector image that is then vertically offset by an offset distance D≈−W/2 from same system axis 28. The net result is an effective emission surface/volume $ESV_{SJ}$ that is approximately twice the size of the original cross sectional area of the helix 256. This effectively increases the source étendue $E_S$ and the output of the MLE by roughly a factor of two. For not étendue limited LE applications where the intermediate target étendue $E_T^{max}$ is much larger than the source étendue, i.e. $E_T^{max} >> E_S$ (for slide projectors, overhead projection LE's, large LCD PLE's, fiber optic automotive illumination, total internal reflective large light pipe illumination systems, large area fiber optic illumination system, etc.) and where total delivery efficiency is more important than étendue efficiency this may still be acceptable. If a sealed reflective cavity is used, as in the MLE-J case, the cross sectional shape and coverage and offset of the emission helix against the system axis 28 is ideally designed with the concepts of this invention to maximize the throughput of the MLE for a given collection étendue and/or collection area. Similarly for the case where the retro-reflected image needs to be ideally offset by a distance D≈W/2 ideally the respective source axis is also offset with the respect of the axial symmetry axis of an inner and also optional an outer envelope, for example for a tungsten filament lamp or a double envelope, large wattage metal halide lamp.

FIG. 16 shows a preferred embodiment of this invention useful for a very long elongated extended source $S_K$. To illustrate, the special case is discussed below of a helical emitter with large enough helical windings that it can be positioned on-axis, i.e. D≈0. Since the present LE invention doesn't relay on flat image surfaces for efficient energy collection the respective CCS-K can be optimized for maximum throughput efficiency and étendue efficiency, as discussed above and explained in greater detail below. By allowing the energy collection surface to be curved in the z-axis, i.e. to follow substantially a respective curved MES 144 a much better throughput efficiency can be achieved. This is indicated in FIG. 16 with the secondary emission volume $EV_{S'K}$ representing a curved quasi-image of the emission surface/volume $ESV_{SK}$. Note the two distinct helical images from the original helix 256 and its reflection image.

When the secondary emission volume $EV_{S'K}$ is bisected with a perpendicular oriented plane, a bow-shaped intensity distribution is obtained at its optimal z-position. However when the collection plane is curved, as shown FIG. 16, a magnified quasi-image is obtained of the source $ESV_{SK}$, i.e. a curved rectangle with helical cross sectional windings can be observed occupying a smaller collection area. As discussed above for another preferred embodiment of this invention, the field curvature of this on- and off-axis imaging MLE-K can be influenced for energy collection purposes (depending on reflector size and helix length) by adding cylindrical correction terms in the source axis plane to the basic reflector surface with the cylindrical symmetry axis of these correction terms being the y-axis.

A preferred retro-reflector 262 has a substantial axial symmetrical curvature with the source axis 24 being its symmetry axis for the case where the emission region is axially centered inside a respective axial symmetrical envelope 42. If the emission region is located off center with respect to its envelope 42 ideally an non-axial symmetrical retro-reflector system is used. The aspherical curvature in a plain containing the source axis is preferred to be chosen in such a manner that the retro-reflected source image has a minimum image distortion, i.e to balance the optical distortion effects of the envelope 42 and the off-axis image aberration for the extended source. Preferably the resulting retro-focussed image is as flat as possible. However curved image solutions are also useful for optimizing total delivery efficiency in combination with an ABT 250.

Still referring to FIG. 16, in order to collect the thus resulting emission volume $EV_{S'J}$ in an étendue efficiency manner, a ABT 250 is used with special matched input port $IP_1$ and output port $OP_1$. As discussed above, to further improve the étendue collection efficiency of the input port $IP_1$ that is matched to the MES 144, a special input port preparation is preferably be used for its acceptance surface $AS_1$. In FIG. 16, the input port $IP_1$ is shown set back from the MES 144 for better visualization of the various points being discussed. The overall curvature of is acceptance surface $AS_1$ preferably matches the curvature of MES 144. Also shown is a staircase type local surface preparation that minimizes the étendue losses due to the curvature of the acceptance surface $AS_1$. This is an example of a preferred possible auxiliary optic surface preparation as discussed above. The body of the ABT 250 can either be a hollow reflective or solid transparent suitably tapered LG.

Optional an auxiliary optics, as discussed above can be placed near the respective input port $IP_1$ and optionally wavelength converting material, as discussed above can be place near and/or inside the ABT 250.

An elongated tungsten source has also an axial symmetric angular emission energy density function due to self shadowing of the filament in the direction of its axis. The exit beam of such a respective preferred MLE has therefore also an axial asymmetric angular energy density function. In the case where the spatial shape miss match between the source and the collection target are very large, like for example a long cylinder and a circle or nearly square rectangle the area gain is the most important factor so that one can consider, as discussed above, to focus on the area reformatting task and to use area reformatting ABT which also symmetrisize the angular dependent energy distribution. Optionally an Anamorphic coupling optic and or an Anamorphic tapered LG can be used as auxiliary input optic.

As discussed above, there are different ways to accomplish the beam redirection task compensating for the local prism effect of an angled LG acceptance area. FIG. 16 shows the case where a staircase like approximation to the ideal curved MES 144 is being used to minimize the angle redirections effects (resulting in some étendue loss) caused by the locally varying the prismatic beam redirection effect at tilted entrance surface, i.e a curved LG acceptance surface $AS_1$.

Another preferred embodiment of this invention specifically uses the prism effect obtained by a specific curvature of the respective acceptance surface $AS_1$. This preferred surface curvature is matched to a given change of the average beam propagation direction (as indicated in FIG. 16 for the image location of two different helical features) in such a manner that the prism effect accomplishes by itself the desired beam propagation axis redirection (for example straightens out main beam propagation axis). Both embodiments can be combined so the local staircase steps act also as auxiliary optical elements for beam redirection to correct the local variation of the incident beam main propagation axis.

An additional optical surface layer can be applied to the acceptance surface $AS_1$ to accomplish local corrections of the beam propagation axis to improve the throughput efficiency of LG 250 for the given beam. Also, if the helical shape and respective LGLE-K manufacturing is sufficiently controlled that the helical energy density function can be observed at the MES 144, one can improve the throughput efficiency TE of the LG 250 by building the acceptance surface $AS_1$ in such a manner that light is being collected only from the imaging areas of both helix images (3D-pickup). Alternatively, if the LG 250 is made from many individual fibers only those fibers are combined to an output port $OP_2$ that collect light from the proper image location a the respective MES 178.

Referring once again to FIG. 16, the output surface shape of this LG adapter 250 was chosen to have a round shape to illustrate coupling to an optional detachable LG 254 with a constant cross sectional round shape and a perpendicular terminated acceptance surface $AS_2$. Other output shapes can be chosen as needed. Also FIG. 16 shows, as another example of a preferred embodiment a reflective, high NA, quasi imaging, coupling optic 252 that changes the angular divergence of the beam by magnifying the divergence angle and at the same time reduces the beam cross sectional area in a substantially étendue preserving manner. Such system can be use for a wavelength independent symmetric beam transformation and simultaneous beam steering function. The acceptance surface $AS_2$ of the LG 254 forms the target $T_K$ for this LGLE-K.

If an additional area/NA matching function is not required, the acceptance surface $AS_2$ can also be placed in direct contact with the emission surface $ES_1$ of the LG 250. If necessary, the Fresnel coupling losses can be reduced by either using antireflection coatings at the 'glass'-air interface or a thin layer of a suitable index matching transparent material, like an index matching gel or oil, between the exit and input surfaces $ES_1$ and $AS_2$. If it is not necessary that the LG 254 be separated from the system, then both LG's 250 and 254 can be bonded together with optical transparent cement. Without limiting the scope of this invention, the LG 250 can also be the only LG in the LGLE that collects and delivers suitable source energy directly to the final location of use. Further, area/NA matching can be accomplished by the LG's 250 and/or 254 directly. For example, tapered, optical fibers can be used to construct a suitable LG 250.

FIG. 16 also shows how to make throughput efficient low cost fiber optic illuminators to illuminate standard round LG's by using low cost linear tungsten helix sources or long arc lamps or higher efficiency linear lamps in an MLE-K together with an optional LG adapter 250 functioning as ABTS, and, if necessary, a suitable optical coupling optic 252. This is of particular interesting for fiber optic light sources which require both lower cost and higher delivery efficiency than possible with prior art LGLE's. In particular the option of eliminating of the need of a sophisticated (switching) power supply for Tungsten-Halogen based LE makes them particular attractive candidates for low cost fiber optic or LG based delivery systems like those found in automotive illumination system, information display systems such as street signs, neon replacement signs, remote light pipe illumination for tunnels, factory floor, ships halls, radio towers, etc.

Utilizing the above teachings of the invention to show how to collect and concentrate extended sources in an étendue efficient manner for a generic volume or surface source, it is possible to deduce from the preferred embodiment shown in FIG. 16 that for further improved efficiency of the LGLE the source S design has to be done together with the MLE and LGLE design for which it is intended to be used.

For example, a tungsten wire could be arranged to form a densely covered half-circle. The retro-reflector would then image the emitted energy back in such a manner that it appears as if a full circle emits light at the respective CCS. Based on the above teachings, it is possible with this invention to create many dimensional source configurations that are optimum for a particular design and/or LG input port manufacturing situation. The basic commonalty of all these lamp design solutions is that the three dimensional shape of the emission volume/surface and the complexity in the manufacturing of the respective source S, MLE and matched energy collecting input port(s) $IP_i$ of a remote energy delivering LG have to be traded off against each other in order to achieve optimum cost-efficiency balance.

Consequently it becomes clear that the above-discussed methods and embodiments of this invention can be used to increase the collection efficiency for most extended sources. Surface or volume emitting light emitting diodes arrays and semiconductor laser arrays are also extended sources. With some adaptations of the above teachings of this invention their energy output can also be collected, concentrated, and coupled into a LG. For example, the coupling efficiency of a LED that emits in all angular directions can be improved by placing its emission volume $EV_S$ or emission surface $ES_S$ inside one of the above discussed preferred MLE. For this special case of volume emitter, the preferred embodiment of this invention uses a respective cavity comprising at least one primary and one retro-reflector. However, instead of being hollow, as in the previous embodiments of this invention, in another preferred embodiment of this invention, they are filled with a transparent material (for example transparent epoxy). Further this filling material has to have a suitable external surface shape and finish that allows its external surface to be made locally reflective (coated outside with suitable reflective coating materials like Al, Ag, dielectric multi-layer, total internal reflection at it material-air inteface, etc.), thus forming the desired reflective cavity. This so formed cavity also needs to allow light to escape through respective exit ports.

By using auxiliary retro-reflector, as discussed above, preferred super fluorescence unstable resonating cavities can be formed which allow to collect and concentrate much larger emission angle and thus build more efficient color reformatting MLE where non usable light is used to aid in the generation of usable light.

In another preferred embodiment of this invention, a LE for a given target T can be further optimized if one has the freedom to also optimize the spatial shape of the emission volume or surface. This additional matching design optimization step for the source shape can improve the delivery efficiency for a given target and electrical power levels and/or reduce the manufacturing cost of the overall LE. For example, the shape of the emission volume or surface of the source S can be chosen to simplify the manufacturing of the optimum surface configuration of the respective input and output ports of the LG forming the FRTS and/or to minimize source image aberration of the respective size limited CCS. Given that solid state sources often emit only into one hemisphere and thus do not require an image inverting retro-reflector, a preferred embodiment of this invention uses extended emission surface sources S that are built from multiple smaller surface emission sources, which been arranged in such a manner that they approximate a desired round concave or convex emission surface $ES_S$, instead of a conventional flat and rectangular shaped emission surface.

The above can be accomplished, by three dimensionally positioning individual semiconductor laser lasers to form a curved semiconductor laser array surface. The same can be accomplished with surface emitting LED's and individual illumination fibers, with the latter being arranged to form a curved LG output port OP. The radius of curvature of these emission surfaces $ES_S$ are preferably chosen in such a manner that the resulting MLE's have flat and round MES's for optimum collection with round LG's. Another benefit of the use of this embodiment of this invention is the option of creating arbitrarily shaped, highly uniform illumination beams at the output of respective LGLE or at MES of respective MLE when starting from large area sources. This can result in an improved large area illumination intensity control (homogenous or non-homogenous intensity distribution) for smaller size and/or simpler optics than is typically possible with prior art MLE's or LGLE's. Some applications of this embodiment are material processing functions (like homogeneous mask illumination during semiconductor processing steps) where large area uniform illumination is critical.

Figure 17:
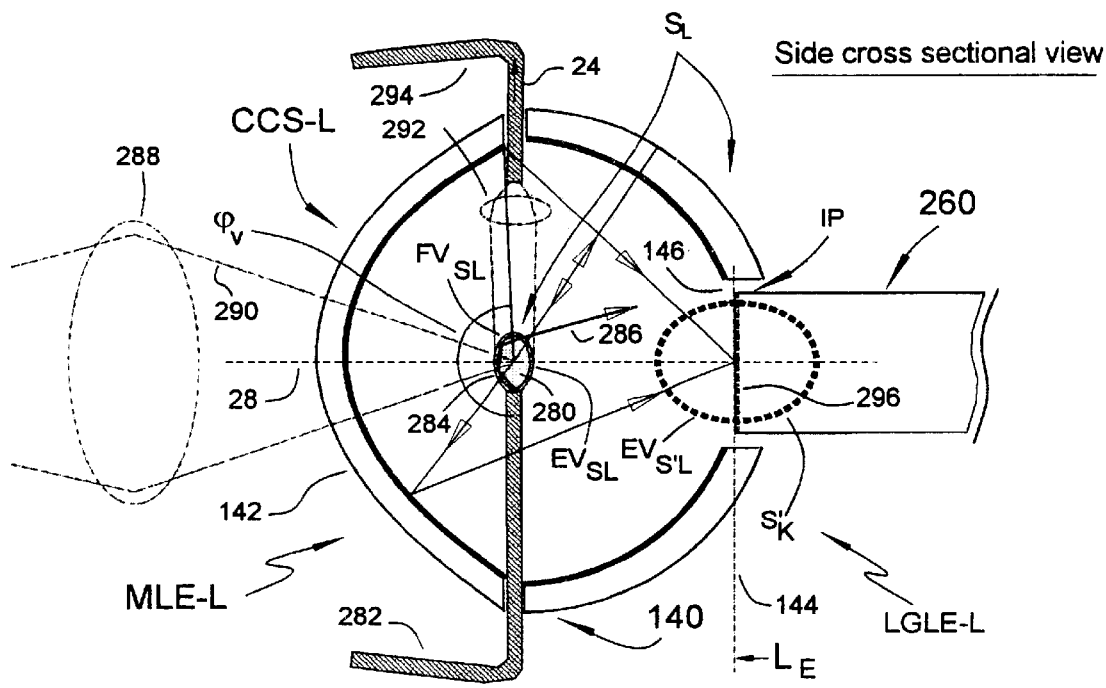
FIG. 17 shows pictorially a fluorescence conversion system as LGLE-L.

FIG. 17 shows schematically an extension of the source configuration embodiment of this invention to allow building another type of étendue efficient fluorescence conversion LE. The LGLE-L, shown in FIG. 17, uses a reflective cavity formed by a PRS 142 and a RRS 140 to collect substantially all the light emitted by the fluorescence volume $FV_{SL}$ and to concentrate it at the secondary emission volume $EV_{S'L}$. The RRS 140, together with the fluorescence volume $FV_{SL}$, forms the effective emission volume $EV_{SL}$ that emits only into the left hemisphere. A LG 260 is shown as remote delivery system with input port IP near the vertex of the RRS 140 that is shown here as the chosen axial location $L_E$ for the MES 262 of the MLE-L.

The fluorescence volume $FV_{SL}$ is the overlap between a (shorter wavelength) excitation beam and a fluorescence material 280 which (1) absorbs selective wavelength bands of the illumination beam based on its matrix material (for example solid or liquid or gaseous) and the concentration and type of fluorophores and (2) emits in a random orientation (longer wavelength) fluorescence light. Unabsorbed or reabsorbed light is typically scattered by the material 280 so that the entrance angle and exit angle of both non-wavelength a and wavelength modified rays is somewhat different. Substantially all rays emitted into the left hemisphere of the material 280 will be collected and concentrated by the CCC-L, i.e. the PRS 142. Since not all of the incident illumination energy is being converted into fluorescence light, the material 280 typically heats up, and, over time, its concentration of fluorophores diminishes. The resulting decay of the fluorescence output, due to excitation light dosage and excitation intensity at the fluorescence volume $FV_{SL}$, is often eliminated through constant or periodic physical exchange of the material 280. This can be accomplished, for example, by using a continues flow of liquid material or a physical exchange (for example, a rotating disk or a translating rod, etc.) of solid and/or liquid and/or gaseous materials that has been doped with proper concentrations of wavelength shifting materials (like fluorescing dyes in a dye lasers).

Referring back to FIG. 17, the material 280 is shown in a preferred embodiment as having an axial symmetric ellipsoidal shape with its major axis (source axis 24) orthogonal to the system axis 28. Preferably, the ratio of its minor to major axis is approximately inverse proportional to the orthogonal magnification $M_o$ of the reflector 142 so that the resulting secondary emission volume $EV_{S'L}$ is an approximated sphere. Other fluorescence volume forms can be chosen as required. FIG. 17 thus allows, among others, to illustrate again the concept and advantages of custom emission volume tailoring to maximize the coupling efficiency and manufacturability of respective MLE. Many variations of the basic examples shown will now become apparent to those skilled in the art.

Three different basic preferred excitation schemes are shown in FIG. 17. Typically, only one is being used at the time, to excite the fluorescing volume $FV_{SL}$. Other related excitation schemes will be apparent to the skilled in the art based on the examples and teachings given.

The first excitation scheme uses a LG 282 whose output port is in optical contact with an elongated fluorescing material 280. Optionally, the material 280 is surrounded by a coating or cladding material 284 which reflects back some of the unconverted illumination light at the exit surface interface of the fluorescence material to increase the path length of the light rays 286 that, unless they gets absorbed before, will ultimately escape the material 280. Unabsorbed rays 286 escaping in the direction of the reflector 140 have a second chance of being absorbed after getting re-imaged onto the fluorescence material 280. Optionally the cladding material 284, that surrounds the material 280, can be a transparent cooling liquid and preferably has a lower refractive index to aid in the reflection of excitation light.

The second excitation scheme shown in FIG. 17 uses a transparent primary reflector 142 which has a special dielectric coating that allows the shorter wavelength excitation light to be transmitted and the longer wavelength fluorescence light to be reflected at its concave reflective surface. A focusing optic 288 concentrates an excitation beam 290 onto the fluorescence material 280.

The third excitation scheme uses a coupling optic 292 to focus the output port of the LG 294 onto the fluorescing material 280.

The spatial shape of the emission volume $EV_{SL}$ thus depends not only on the shape of the material 280 and the shape of the reflectors systems 140 and 142, but also somewhat on the intensity distribution of the excitation beam. All parameters have to be balanced, as discussed above, to yield the highest throughout efficiency at the MES 262 for a given excitation source and MLE size.

Optionally the LG 176 can have a dielectric coating 296 or filter element at or near its input surface for increasing the out-of-band rejection of unwonted wavelength. Wavelength filtering can also be accomplished through properly chosen dielectric filter coatings at the reflector 142 and/or 140. For example, for a volume target application like the one encountered during photo-dynamic therapy or diagnostic of tumors during medical procedures, the undesired shorter and longer wavelength light is preferably removed to minimize tissue hyperthermia during the procedure. In addition, by removing the unneeded wavelength at the MLE-L level, it may be possible to use plastic materials to form suitable LG's 176 which offer many cost and manufacturing advantages and which otherwise may melt down. In addition ABT LG and wavelength converting doped tapered LG's, as discussed above can be used in combination with the MLE-L to further enhance the delivery efficiency for a given target T's illumination needs.

Figure 18:
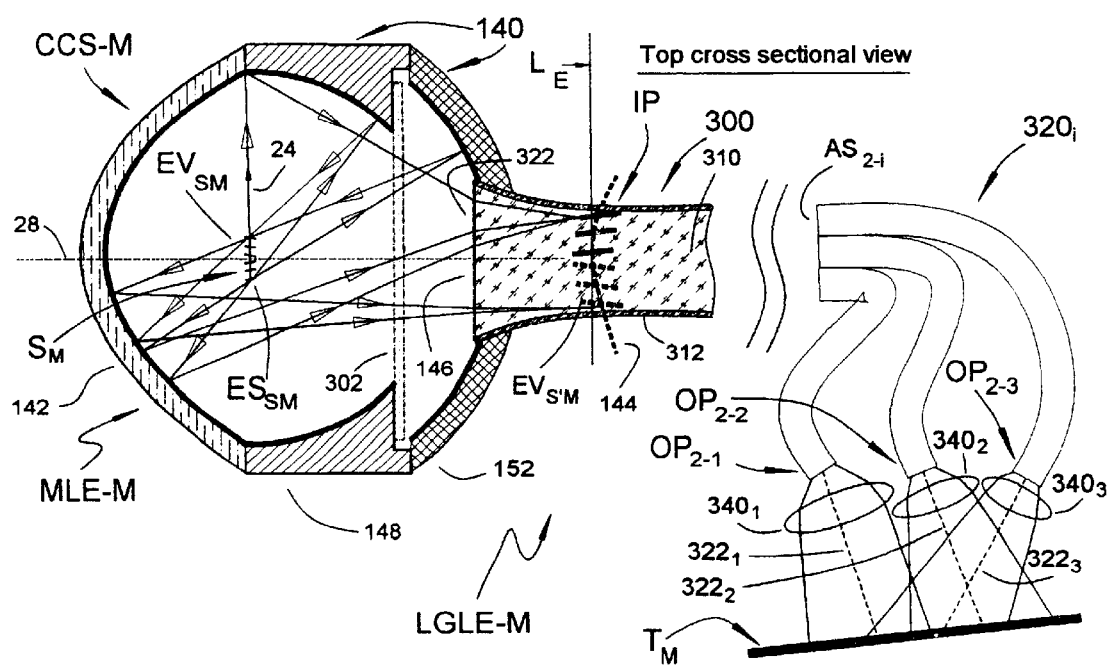
FIG. 18 pictorially shows a LGLE-M with an integral tapered LG suitable for automotive illumination.

FIG. 18 schematically shows a light guide light engine M (LGLE-M). Two additional primary concepts/embodiments of this invention are described with respect to this figure. The first is a sealed reflector lamp $S_M$ (similar to LGLE-H, LGLE-I LGLE-K) with an integral tapered LG 300 as a respective ABTS. The second concept shows a preferred embodiment of this invention applied to a road illumination system or material processing system.

The emission energy of the source S of FIG. 18 is shown here as being emitted by a tightly wound (not transparent) tungsten helix (three turns being shown) having an emission surface $ES_{SM}$ and a width W and that has a rectangular cross sectional shape and a depth that is as thin as the helix can be wound. The optical axis 24 of this helix is orientated orthogonal to the system axis 28 and has an offset distance D≈W/2 (as discussed above). The emission of this emission surface $ES_{SL}$ into the right hemisphere forms, after reflection at the RRS 140, generates the image inverted, virtual emission volume $EV_{SM}$ which is located opposite to the emission surface $ES_{SM}$ and mirror symmetric to the axis 28. Optionally, as discussed above, the emission surface $ES_{SM}$ can have a curvature/orientation other than flat/perpendicular to the system axis 28 to increase the delivery efficiency for a particularly constrained LE.

The CCS-M, i.e. PRS 142, concentrates the emission into the left hemisphere into the secondary emission volume $EV_{S'M}$ which is designed to be located inside the tapered LG 300. The retro-reflector 140 is shown here as a folded reflector (similar to LGLE-H) comprised of two reflector elements 148 and 152 with the LG 300 at the exit port 146 of the MLE-M. Optionally a filter element 302 (shown here as secured by a molded or ground feature of the reflector 148) can be used to conveniently spectrally filter the output beam of the MLE-M. For example, by removing unneeded IR energy, LG's made from plastic materials or LG's having epoxied fiber optic input ports can be used for some type of systems. Optionally this supplemental filter element can also be put at the input surface of the LG 300 and/or the reflective coating of the reflector 142 can have spectral bandwidth limiting properties.

The major difference to the above-discussed preferred embodiments of this invention is that the MES 144 is located inside a tapered LG 300 instead near its input surface. The special LG 300 is shown in FIG. 18 as a single core, tapered LG having a suitable transmissive core material 310 and a surrounding suitable lower refractive cladding material layer 312. The LG 300 is shaped in such a manner that the tapered LG section before the MES 144 is not interfering with the propagation of section of interest of the concentrating light beam (with exception of the standard refractive effect due to the different refractive index of the core material 310 of the LG 300). However, near the axial location $L_E$ of the MES 178, the cross sectional area of the LG 300 transitions to such a cross section (as discussed above) that the chosen portion of the light beam (depending on the desired collection étendue $E_c$) is guided by the LG 300 thereafter. If desired, the cross sectional shape of the LG 300 can then further transition slowly to a more convenient output shape suitable for either final illumination of a target or for coupling to another optical system (for example multiple LG's $320_i$ as shown in FIG. 18). This captures light in an étendue efficient manner from curved MES's 144 without having to special input port configurations, as discussed above in relationship to the LGLE-K shown in FIG. 16.

The section of the LG 300 before the MES 144 can therefore be viewed as an auxiliary optic aiding in the étendue efficient light collection with a LG 300. For that purpose, the input surface 322 of the LG 300 can also be curved and perform as an optical imaging element, which, in combination with the CCS-M, is optimized for balance between collection efficiencies and manufacturing costs.

In another preferred embodiment of this invention, the MLE-M, the auxiliary retro-reflector 148 and the LG 300 are made from one molded glass or plastic part with proper reflective and/or filtering coatings at its concave side and with a proper cladding or reflective coating layer 312 starting at least before the axial $L_E$ position and continuing thereafter to create a suitable LG compatible with the core material 310. Another preferred way to manufacture a tapered LG 300 is, as discussed above, to use many partially etched tapered single fibers that have been fused into a single core and re-cladded to form a single core LG near the section of interest.

Multiple tungsten helix's located near the first focal point of the reflector 142 (with optional individual power controls) can also be used as emission sources and concentrated into the same or different (optionally) tapered LG's 300. This concept would allow, for example, a high and low beam light collection system for an automotive road illumination system by optionally sacrificing some collection efficiency to gain other advantages like source redundancy and/or cost reductions.

Referring back to FIG. 18, a LG based road illumination system (for example head light system) is further shown in a schematic diagram having one or more LG's $320i$ (three being shown with i=1,2,3) to ultimately receive the light from a MLE and/or specifically from the LG, with the LG 300 being shown as special example. Further, the optical axis's $322_i$ of the output ports $OP_{2-i}$ of these second LG's $320_i$ are oriented in such a manner that in combination with the coupling optics $340_i$ they achieve a suitable illumination intensity in a selected section of the road, while simultaneously limiting the illumination into undesired directions. In other words the freedom to design the output port configuration of the LG or LG's $320_i$ allows the construction of novel illumination systems. For example, when this invention is applied to automotive head lights, the car designer obtains a new design freedom for body styling, cost optimization, lamp location, etc. and, most important, also efficient control of the road illumination intensity pattern, internal car illumination, etc. Optionally a single reflector lamp (in a sealed or non-sealed version) can illuminated multiple exit ports $146_i$ and each of these exit ports $146_i$ can have an electrical controlled shutter for blocking the exit beam. Further the output of multiple MLE's can be combined into individual exit ports for redundancy (one source burns out), and/or intensity control and/or directional control (high-low beam with different exit angles). Given that the exit beams of the output ports $OP_{2-i}$ of the LG's $320_i$ are typically well defined, they required in general smaller diameter optics than prior art illumination system. In addition, many more output ports can now be used, each with a smaller lens to achieve a desirable illumination, safety, and styling effect. Another preferred embodiment shapes (not shown) the LG 300 in such a way that it both conducts light and acts as its own output coupling optic (tapered fish eye lens) therefore reducing the parts needed to build such an (automotive or industrial) illumination system.

Remote industrial illumination of tunnels, towers, ships, etc. can also be build based on these concepts to lower the total cost of light delivery and/or maintains cost per desired output levels.

In the same manner, the output ports $OP_{2-i}$ and the associated coupling optic $252_i$ can be chosen to match a particular light enhanced material processing application. For example, the exit port can be shape in a long rectangle to provide a suitable line source. Other shapes can be produced as needed.

Figure 19:
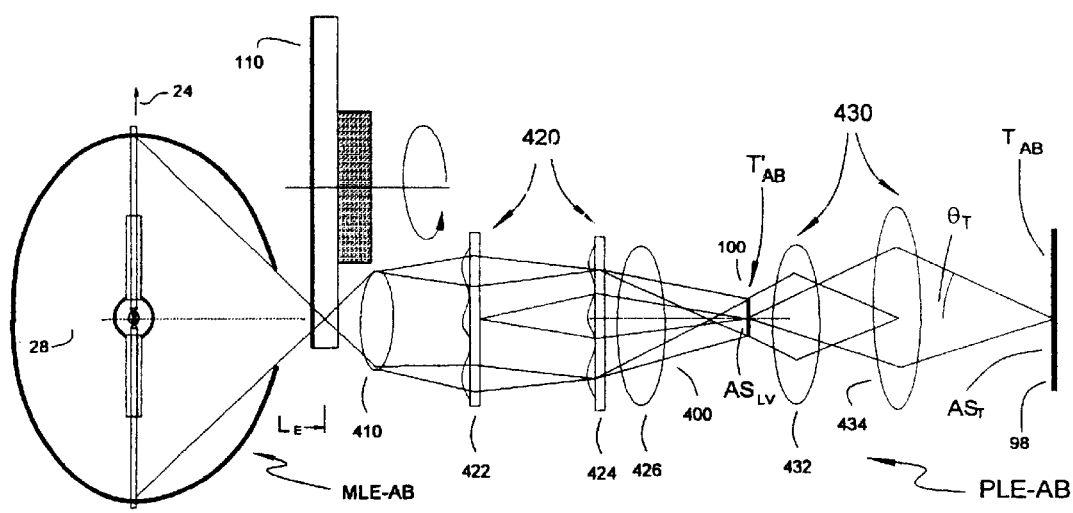
FIG. 19 shows pictorially an improved PLE-AB with a conventional beam shaping/homogenizing optical system.

FIG. 19 shows a first preferred embodiment of this invention for the design of a special type of LE, i.e. a PLE-AB that is used for the projection of the image intensity of a single LV 100 onto a projection screen 98. This projection screen 98 is the target $T_{AB}$ of the respective PLE.

The respective MLE-AB, is shown in FIG. 19 as basic MLE-F type. However, all other MLE embodiments and their variations of this invention can be used as well. A color wheel 110, located near the axial minimum étendue location $L_E$ of the MLE-AB, generates a time sequenced color beam which is being collected by the lens 410 and projected onto the beam cross sectional shaping/homogenizing optic system 420. FIG. 19 shows as example of such an optical element 420 a first lens array 422 and a second lens array 424 formed as similar or dissimilar a matched pair. Alternate ways to make system 420 are with phase grating or diffractive lens pairs. The system 420 is preferably designed to reshape and homogenize the beam 400 cross section to better match the functional beam shaping requirement at the LV 100. An auxiliary focussing lens 426 helps to match the cross section of the illumination beam 400 to the acceptance surface $AS_{LV}$ of the LV 100.

The LV 100 (with a transmissive LV shown as example) is a key étendue limiting optical element of the PLE. Preferably, the illumination beam 400 has, in contrast to illumination beam 122 of the PLE-AA shown in FIG. 5, an image focus location near its acceptance surface $AS_{LV}$ or slightly thereafter.

A projection lens system 430 collects the output of the LV 100 and focuses it onto the projection screen 98. Optionally, as shown in FIG. 19, the lens system 430 can be comprised of two sub systems 432 and 434 with the system 432 located near the LV to collect the output of the LV 100 and the system 434 located near the image location of the system 432.

Figure 20:
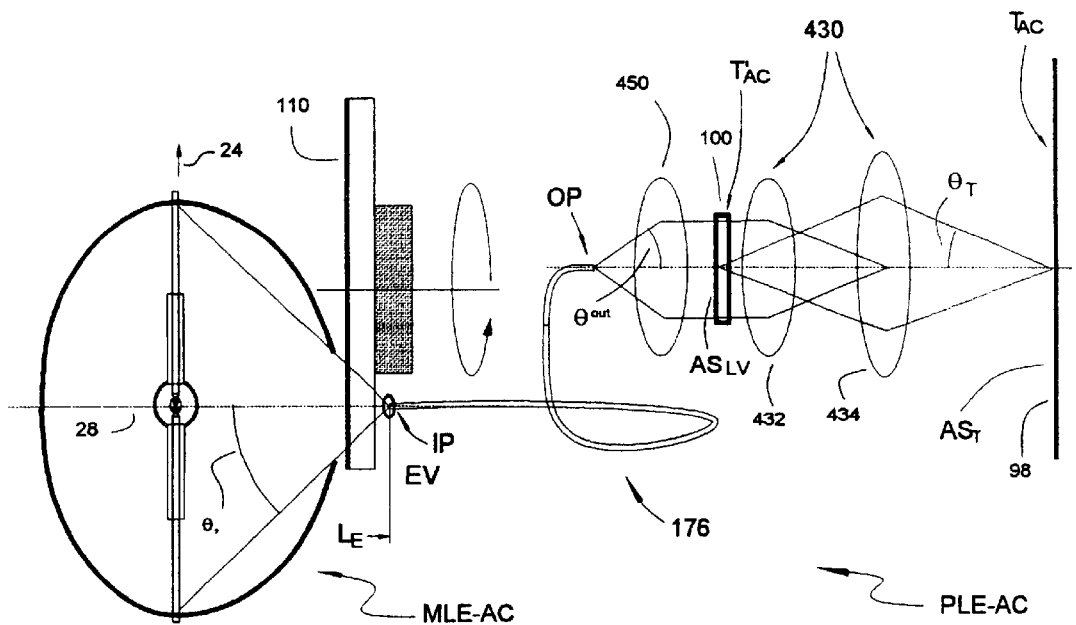
FIG. 20 shows pictorially a PLE-AC using a LG as beam shaping/homogenizing optical system.

The increased delivery efficiency of the PLE-AB is achieved through the use of a respective étendue efficient MLE-AB and the usage of a matched beam shaping/homogenizing optical system 420. Further optional improvements are achieved by using critical illumination (focus at LV) and a matched projection lens system 430. A preferred improvement of this invention is the usage of an anamorphically beam transforming beam homogenization system 420 which is étendue efficiently matched to the needs of the intermediary target $T_{AB}$ and the respective MLE-AB FIG. 20 shows another preferred embodiment of this invention for the design of a PLE-AC that is used for the projection of the image intensity of a single LV 100 onto a projection screen 98. The major difference between the PLE-AB and the PLE-AC is that the latter uses a semi flexible high transmission efficiency LG 448 that performs at least both an energy delivery function and an area reshaping function and that the color wheel 110 is located slightly before the axial minimum étendue location of the respective MLE-AC chosen from one of the preferred MLE embodiments of this invention. The benefit of such a LG 448 is, as discussed above, that it can be made into an even more étendue efficient cross sectional shape and/or beam homogenization element than the optical system 420 typically. To maximize the ON-time efficiency of the color wheel 110 the location of the color wheel 110 is preferably as close to the axial minimum étendue location $L_E$ as possible.

The input port IP of the LG 448 is preferably shaped, as discussed above, to match the MLE-AC for étendue efficient energy collection and optionally include a NA symmetrisazion auxiliary input optic and the output section include a spatial intensity homogenization section (for example rectangular polished, single core integrator rod. Again, the case of a transmissive LV is shown. Optional, a PCS (not shown in FIG. 20) can be inserted conveniently between the output port OP of the LG 448 and the acceptance surface $AS_{LV}$ of the LV 100 for polarization sensitive LV's 100 and the respective input port collection are is then reduced by approximately 50%.

The output port OP of the LG 448 permits the creation of a well defined surface source with chosen divergence angles and cross sectional shape. Therefore for optimum delivery efficiency to the target $T_{AC}$, i.e. projection screen 98, the NA matching and image magnifying coupling optic 430 images preferably the output port OP of the LG 448 onto the acceptance surface of the LV 100 or shortly thereafter. The latter assists in the minimization of high spatial frequency intensity variation caused by some type of output port manufacturing processes (for example epoxied and/or fused fiber bundle ends) and eliminates the needs for an auxiliary optic to remove high spatial frequency intensity variations (pixelation) at the acceptance surface $AS_{LV}$ of the LV 100. The matched projection lens system 430 collects the LV output and images it efficiently onto the projection screen 98. Ideally the surface of the LG output is curved to aid in the image flattening at the LV surface with simplified coupling optic 450.

Figure 21:
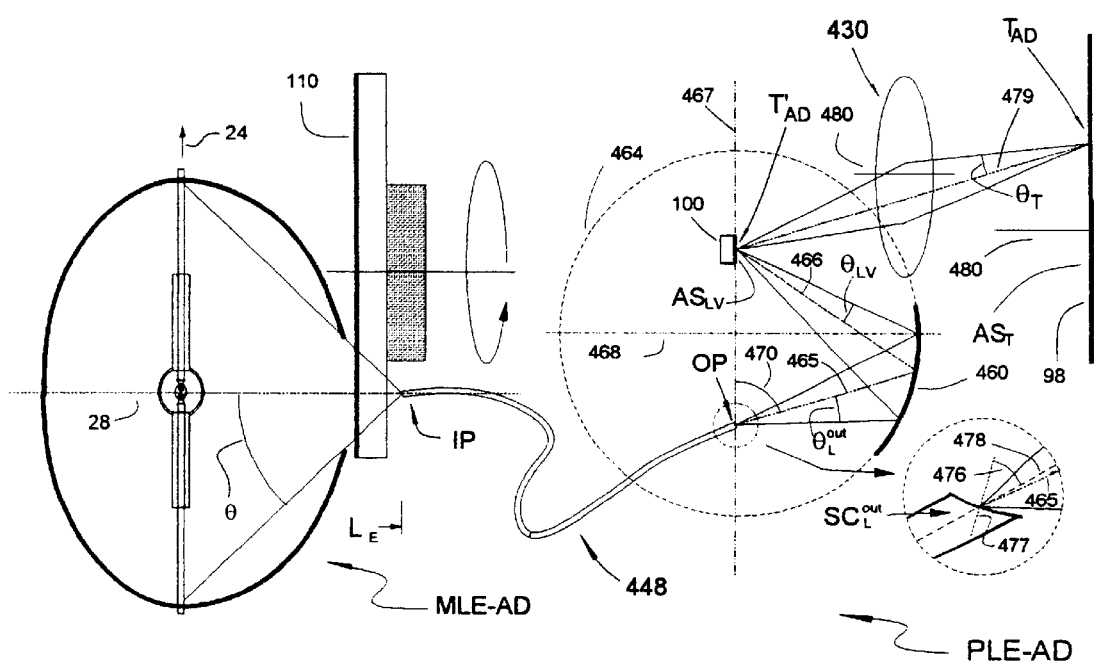
FIG. 21 shows pictorially a PLE-AD for a reflective LV.

FIG. 21 shows a different preferred embodiment of a projection light engine AD (PLE-AD) using a reflective LV 100 as intermediate target $T_{AD}$. Again an étendue efficient MLE-AD, as discussed above, is used in conjunction with a LG 448 with special matched input and output ports IP and OP. A concave on- or off-axis (shown here as off-axis) reflector 460 is used as coupling optic to couple the output of the LG 448 to the intermediate target $T_{AD}$, i.e. the acceptance surface $AS_{LV}$ of the LV 100. Such a reflector 460 can be, for example, a suitable portion of an ellipsoid 464 which redirects the output energy propagation axis 465 so that it coincides with the acceptance direction 466 of the intermediate target $T_{AD}$ and which matches the output divergence angles $\theta_L^{out}$ with the acceptance divergence angles $\theta_{LV}$ the LV 100. To accomplish this, the reflector preferably is used in an off-axis position, as shown in FIG. 21, with the output port OP and the LV 100 located on the main axis 467 of the respective ellipsoid 464, each near a respective focal and approximately symmetrically to its minor axis 468. By orienting the output port OP of the LG 448 at a suitable angle 470 with respect to the major axis 467, the desired image magnification and NA matching can be achieved with a single element. To minimize the imaging errors of this coupling optic, i.e. reflector 460, the minor axis of the ellipsoid has to be chosen suitably large. If a smaller package is required to achieve a suitable coupling result, an auxiliary lens and or reflector (not shown) can be used near the output port OP. Also in another embodiment of this invention, the reflector 460 is a reflective lens, i.e. a lens with one side coated with a suitable reflective coating. Both the auxiliary lens or lens system and/or a reflective lens are useful to reduce LE size.

To the right of the output port OP a magnified image shows another preferred optional embodiment of this invention, i.e. a surface configuration $SC_L^{out}$ that has an angle 476 other than 0 deg between the normal axis 477 of the emission surface $ES_L$ of the LG 448 and its optical axis 478. This allows to generate asymmetric angular dependent emission pattern with simple manufacturing means, i.e. polish the LG output port OP at an angle other than 90 deg to the axis 478. Such a biased output port can simplify the demands on the coupling optic and/or allow a more compact design. Also (see FIG. 21) shown) the output surface of the output port OP be an appropriately chosen curved surface to yield a flat image plane at the acceptance surface $AS_{LV}$.

Referring back to FIG. 21, it shows a design situation preferred for a DMD or TMA type reflective LV with an oblique target illumination direction 170. Also shown is the off-axis use (axis 479 is different than lens axis 480) of the projection lens system 430 which collects the light reflected by the LV in the general direction 479 and images it onto the projection screen 98. This PLE design allows generating a keystone corrected imaging of the LV intensity distribution onto the projection screen 98 under oblique incident angle. This oblique screen illumination is a very common situation for a front projector that is located at a table in front of the projection screen it illuminates.

This situation is also common for sealing mounted projectors that illuminate a lower mounted projection screen under an oblique angle.

Note that instead of an ellipsoidal reflector shape, other aspheric shapes accomplishing the same imaging task can be chosen as well. For example, toroidal reflectors are often a good approximation to an ellipsoidal reflector portion and can be made with eyeglass manufacturing machinery at a much lower cost. Also sometimes asymmetric coupling systems are preferred (described below with respect to FIG. 23) and the reflector 460 has to be modified accordingly or combined with cylindrical or bi-axial lenses near the output port OP of the LG 448 to achieve a sufficiently good enough imaging system within the design constraint of the PLE.

Figure 22:
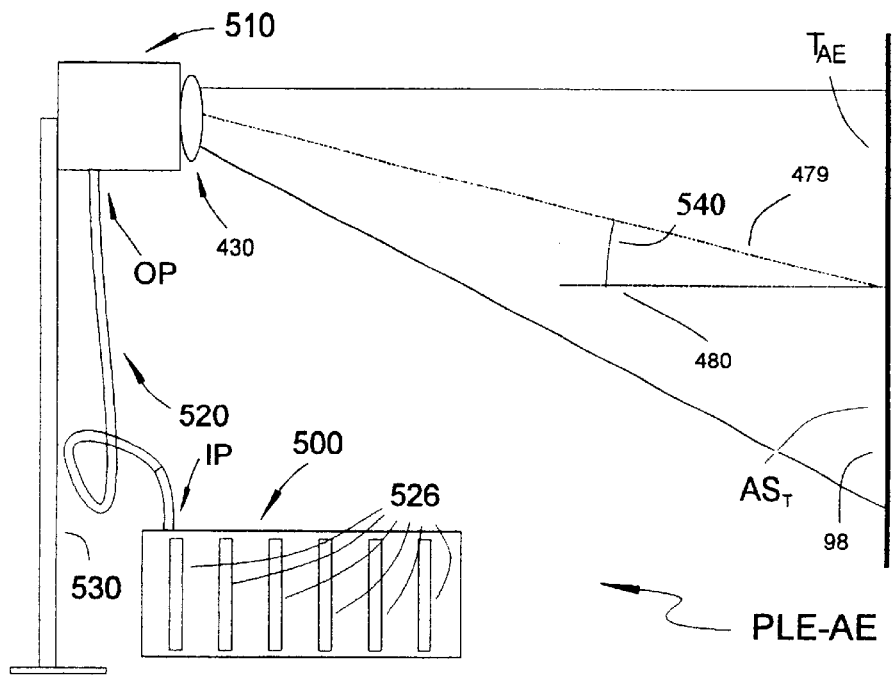
FIG. 22 shows a new type of projection display system.

The use of a LG 448 in a PLE, as shown in FIG. 20 and FIG. 21, provides a further system design benefit that leads to another preferred embodiment of this invention shown in FIG. 22: a projection display system comprised of a main projector unit 500 and a remote, stand alone projector head 510 with the two units connected by a cable 520. The main unit 500 is a stand alone unit which contains a MLE, necessary color filtering optic, video signal processing and other necessary control circuitry and has optional (as shown in FIG. 22) slots 526 where different cards can be inserted into this 'mother unit'. These optional slots are similar to the slots at a computer where cards for different add-on functions can be interfaced to a computer motherboard. For example, they can be filled with a TV tuner card, a video signal resolution re-mapping card that automatically detects and translates incoming video signals formats to the native display format of the LV located in the projection head 510, a WebTV card that provides a link to the internet, a modem card, a computer card adding a PC to the system so that the projector head can be used as computer screen, a video phone card, RF or infrared data link cards, etc. The modularity of this preferred projection display system allows to add and and/or upgrade selected components of the system without requiring the whole projector to be send back to the factory as is presently necessary (if they can be upgraded at all). Therefore, this PLE-AE provides a merging of projection display systems with PC to provide a whole new product line of home entertainment system. Such a projection display platform system is suitable for home entertainment centers and extends the life of the various components.

The projector head 510 contains the minimum parts necessary to make lightweight projector head that can be positioned independently of the main unit 500. The head 510 includes at least a coupling optic, a LV, a projection lens, and the circuitry to control the LV from a video signal. The video signal (emitted by an emitter located in the main unit 500) can be received either with a RF antenna, an infrared sensor or through electrical connections that are part of the cable 520. The illumination energy is delivered from the main unit 500 to the projection head 510 through the cable 520 that preferably includes a rigid or flexible LG with input and output ports IP and OP configured as discussed above and preferably including an ABTS at its input end for delivery efficiency maximization. Thus, the efficient LE technology of this invention is used to build a projection display system that has at least two distinct components and that allows to upgrade and/or modify and/or position each separately. (Optionally the main unit can be split into a MLE and a color filtering unit connected by another LG as shown below with FIG. 23.). Through proper designed standardized input and output ports of the cable 520 it thus becomes possible to mix and match products from different vendors, (like it is possible to mix and match HIFI stereo components from different vendors).

FIG. 22 shows the projection head 510 mounted on a high stand 530. Such a stand together with a light weight projection head 510 facilitates the positioning of the projection in a more favorable location (shown as elevated projector) than is possible with a bulkier and much heavier single unit projection display system. Also shown in FIGS. 21 and 22 is that the target illumination direction 170 can be at an angle 540 other than 0 deg with respect to the normal 480 of the acceptance surface $AS_T$ of the projection screen 98, i.e. target $T_{AE}$. Optionally, the projection head 510 can have a fixed keystone corrected optic (as shown for example in the PLE-AD) or have the below discussed adjustable key stone correctable optic to facilitate the easy setup of the head with respect to a projection screen from a preferred, out of the way location of the stand 530. Optionally the projection head includes a triangulation device (IR, ultrasound, or other) which automatically determines the angle 540 adjusts the keystone correction of the projection optic 430 accordingly in an automated or semi-automated way.

As shown in FIG. 22, the optionally flexible cable 520 allows positioning the projection head 510 independently of the main unit 500. The PLE-AE is not practical for the PLE-AB and for prior art PLE which are all either based on rigid FRTS's (see FIG. 6), or that do not incorporate a flexible LG or other flexible transmission optic, or are not delivery efficient enough to be practical without the improvements in efficient light delivery of this invention.

Figure 23:
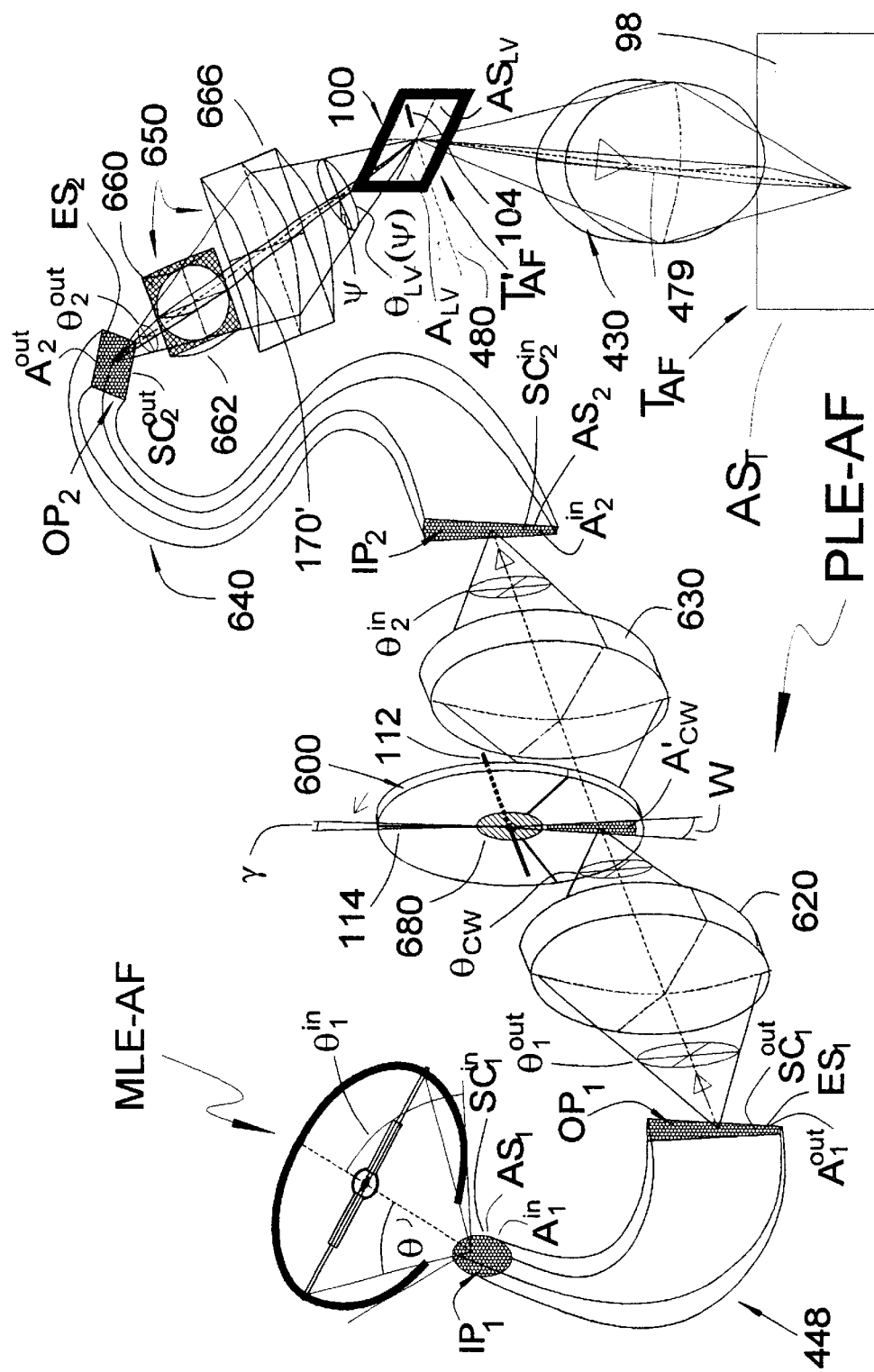
FIG. 23 shows pictorially a PLE-AE using two LG's to improve the throughput efficiency of the color wheel.

FIG. 23 shows another embodiment of this invention for a PLE-AF. Two LG's are part of the respective FRTS to increase the throughput efficiency of a color wheel 600. The output of an étendue efficiency MLE-AF, as discussed above, is concentrated at divergence angles θ onto the input port(s) $IP_1$ of a first LG 448. All its input ports have a total input surface $AS_1$ and an associated effective surface area $A_1^{in}$ with associated acceptance angles $\theta_1^{in} \geq \theta$. The output port $OP_1$ of the LG 448 has an emission surface $ES_1$ that has an effective surface area $A_1^{out}$. Light exiting from the output port $OP_1$ at exit angles $\theta_1^{out}$ is collected by a coupling optic 620 and concentrated onto a color wheel 600 such that the concentration beam has a cross sectional area $A'_{CW}$ at the color wheel 600 and associated exit angles $\theta_{CW}$. A coupling optic 630 collects the light beam transmitted through the color wheel 600 and concentrates it with divergence angles $\theta_2^{in}$ onto the input port $IP_2$ of the second light guide 640. The input port $IP_2$ has an input surface $AS_2$ with an effective light collecting surface area $A_2^{in}$. Light exiting the output port $OP_2$ at a exit angles $\theta_2^{out}$ is collected with a coupling optic 650 and concentrated onto the effective acceptance surface $AS_{LV}$ of the LV 100, i.e. the respective intermediate illumination target $T'_{AF}$.

Optionally when size and weight of a PLE is very important, it is preferred for another embodiment of this invention that one of the coupling optics 620 or 630 be omitted from the PLE shown in FIG. 23. This reduces somewhat the delivery efficiency DE of the PLE-AF, but also reduces the parts count and size of the PLE.

The output of a reflective or transmissive LV 100 (shown in FIG. 23 as a reflective type) is then collected by a projection lens system 430 and projected onto a distant screen 98 where a magnified image of the intensity distribution at the output stage of the LV 100 is formed. Special optical coupling elements 650 similar to the total internal reflective prisms discussed in U.S. Pat. No. 4969,730 to Andrianus H. J. van den Brandt and the coupling optics discussed in U.S. Pat. No. 5,022,750.

Although a critical illumination scheme (LV 100 is intermediate target as shown in FIG. 23) is preferred for maximum delivery efficiency a Kohler illumination scheme (not shown in FIG. 23 with focus into the entrance pupil of projection lens system 430) or in between scheme (see FIG. 5) can be used as well with this invention to balance PLE design constraint with delivery efficiency. For example, a non-critical illumination scheme permits the use of a smaller diameter projection lens 430 at the expense of some delivery efficiencies to the projection screen 98, i.e. target $T_{AF}$ of the PLE-AF.

Note that the PLE-AC (FIG. 20) and PLE-AD (FIG. 21) are simplified versions (less LG's) of the PLE-AF and use only one LG as part of their FRTS. The below discussion of preferred PLE design method applies also to the PLE-AB, PLE-AC, PLE-AD and PLE-AF case with only one coupling optic 620 or 630 discussed above.

Note that for most PLE designs the angles $\theta_1^{out}$, $\theta_{CW}$ and $\theta_2^{out}$ are axial symmetric, i.e. independent on a respective azimuth angle $\Psi$. However, if the LG's 448 and 640 are not terminated perpendicularly to their respective energy propagation axis's the respective acceptance or emission angles exhibit some axial asymmetry which in some preferred embodiments of this invention (see FIG. 21) can be used to further simplify and/or improve the LE design.

A LG guide 448 with optional coupling optics 620 and/or 630 can be used to further improve the On-time efficiency of the color wheel 600. In general, the surface configuration $SC_i^{in}$ and $SC_i^{out}$ of the input and output ports IP and OP of the respective LG's are chosen to optimize the coupling between different optical elements. Still referring to FIG. 23, there are at least two or four primary opportunities to perform area reformatting. The coupling of the output port $OP_2$ to the acceptance surface $AS_{LV}$ of the LV 100 is discussed first. Afterwards the coupling between the ports $OP_1$ and $IP_2$ and the color wheel 600 is reviewed. The coupling optimization between the MLE-AF and the input ports of matched LG 448 has already been discussed above.

Every given LV 100 has a characteristic acceptance angle function $\theta_{LV}(\Psi)$ The azimuth angle $\Psi$ is defined here against the optical preference axis 104 of the LV 100 in a plane perpendicular to the energy propagation axis of the illumination beam. This angular acceptance function $\theta_{LV}(\Psi)$ is defined in part by the design and illumination direction of a given LV and depends in part on the desired contrast of the PLE. The delivery efficiency of a PLE depends therefore both on the type of LV used and on the limitation of a chosen optical design for its LE to maximize the characteristic acceptance angle function $\theta_{LV}(\Psi)$ of a LV for maximum delivery efficiency DE of the PLE to the projection screen 98.

An optional mask 660 that intersects the coupling beam at a suitable surface between the output port $OP_2$ and the acceptance surface $AS_{LV}$, can be used to create any type of asymmetric angular illumination pattern desired starting from a given illumination beam which has a larger angular energy density function than the masks 660 allows.

In another preferred embodiment of this invention, as shown in FIG. 23, the surface configuration $SC_2^{out}$ of the output port $OP_2$ is chosen such that the coupling (delivery efficiency DE) between the light emitting output port $OP_2$ and the LV 100 is optimized. Note that for some types of LV 100, for example of the DMD or TMA type, the average incident energy direction is not parallel to the normal axis 480 of the acceptance surface $AS_{LV}$. In these cases, the preferred optic 650 is of a 'Scheinpflug' type, i.e. its optical axis and the respective emission surface $ES_2$ and acceptance surfaces $AS_{LV}$ are oriented in space in such a manner that the resulting magnified image of the emission surface $AS_2$ at the acceptance surface $AS_{LV}$ is the same level of focus across the whole surface. This facilitates uniform illumination intensity even if the focus location is after the acceptance surface $AS_{LV}$, i.e. non-critical illumination scheme. Further, as schematically illustrated in FIG. 23 with two perpendicularly oriented cylindrical lenses 664 and 666 functioning as imaging ABTS that are aligned to the optical preference axis 104, the preferred orthogonal magnification $M(\Psi)$ and associated angle change of the optical coupling system 650 is different in different angular directions $\Psi$. The preferred embodiment of this invention utilizes therefore in general an axial asymmetric or anamorphic coupling optics 650 which transforms a beam having a given kind of azimuth $\Psi$ dependent angular emission distribution $\theta_2^{out}(\Psi)$ into a beam having an angular energy density function that is matched as much a possible to the desired acceptance function $\theta_{LV}(\Psi)$ of the LV 100. In this manner, the optional mask 660 clips only a minimum amount of available energy thus maximizing the delivery efficiency of the PLE-AF.

Figure 24:
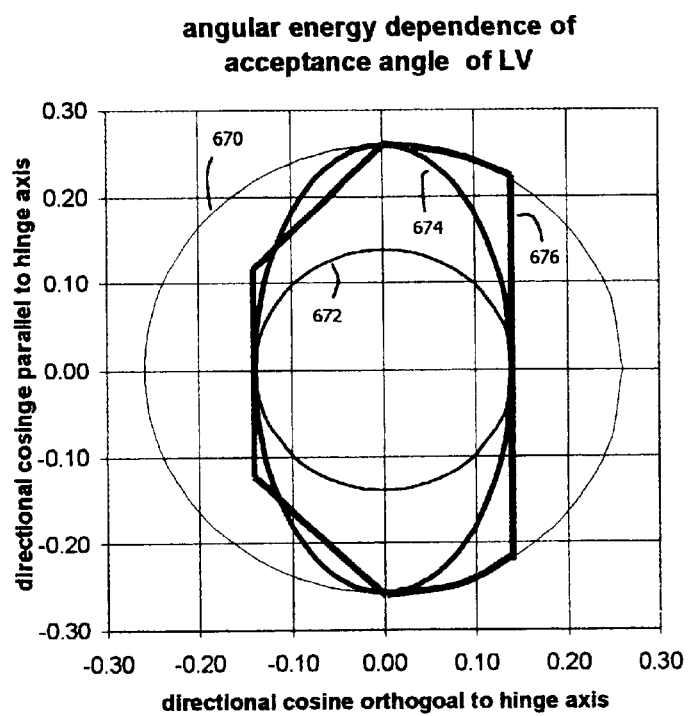
FIG. 24 shows different acceptance angles of a DMD type LV.

FIG. 24 shows the outlines of different azimuth $\Psi$ dependent maximum acceptance distributions $\theta_{LV}(\Psi)$ of the illumination beam coupling energy from the output port $OP_2$ to the acceptance surface $AS_{LV}$ with the vertical axis being parallel to the optical preference axis 104. The large circle 670 and small circle 672 represent a beam having a maximum acceptance angle $\theta_{LV}(\Psi)=\theta_{LV}$ with $\theta_{LV}=15$ deg and $\theta_{LV}=10$ deg respectively. The ellipse 674 which borders the large circle 670 in the vertical axis and the small circle 672 in the horizontal axis is a preferred azimuth $\Psi$ dependent maximum acceptance angle $\theta_{LV}(\Psi)$ of this invention for the improved illumination efficiency of a DMD or TMA type LV 100. This elliptical shaped azimuthal function 674 is for example the result of bi-axial imaging an axial symmetric (or asymmetric as discussed above) LG exit beam with two orthogonal cylindrical lenses 662 and 666 that have a different orthogonal magnification, i.e. $M(\Psi=90)=1.89*M(0)$. Note that the elliptical shape 674 is related in size and functions to the project mask 675 discussed for a DMD type light valve in U.S. Pat. No. 5,442,414. However, the above-preferred embodiment of this invention uses no mask at all and has higher throughput efficiency. Under certain circumstances, therefore, the above-discussed preferred embodiment of a coupling optic 650 can eliminate the need for a mask 660 altogether. This maximizes the delivery efficiency DE of the coupling optic 650 while still fulfilling the functional requirements of the LV, i.e. reducing energy transfer diagonal to the optical preference axis 104 to minimize scattering and the associated contrast loss.

Figure 25:
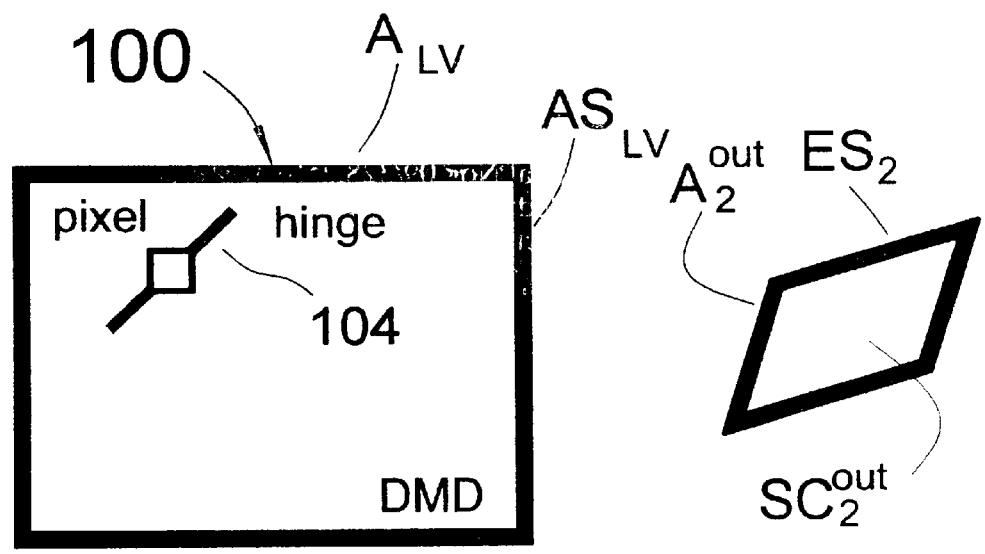
FIG. 25 shows the relative size and cross sectional shape of a LV with matched output port of a LG.

In order to obtain a matched cross sectional illumination beam shape at the acceptance surface $AS_{LV}$, the output surface $AS_2$ has to be matched to the cross section of a pre-distorted LV surface which is proportional to the inverse of the magnification $M(\Psi)$ of the coupling optic 650. To be more precise, additional distortion effects arising from having an average energy propagation which is different than the respective surface normal need also be considered to find the ideal cross sectional pre-distorted shape of the emission surface $AS_2$. FIG. 25 shows as an approximation, i.e. neglecting the effects of surface curvatures and tilts against the surface normal 480, the relative scale and shape of the cross section of the acceptance surface $AS_{LV}$ and the matched LG guide emission surface $E_{S2}$. To calculate the preferred size and shape of the surface $E_{S2}$ the following angular assumptions have been made: the surface $AS_{LV}$ has a maximum half cone acceptance angle of 15 deg parallel and 10 deg orthogonal to its optical preference axis 104 axis, and the surface $ES_2$ has an axial symmetric emission half cone angle of $\theta_2^{out}=30$ deg. Note that these are the same assumptions that resulted in the ellipse 676 in FIG. 24.

Thus, for a critical illumination scheme, the preferred shape, size and orientation of the optimum LG emission surface $ES_2$ is primarily determined by a given LV 100 with is associated acceptance surface $AS_{LV}$, its associated average incidence angle 170 and its optimum acceptance angles $\theta_{LV}(\Psi)$. The emission surface $ES_2$ is further determined by the angular dependent energy density function exciting the output port $OP_2$ and, to some lesser extend, also by the non ideal performance of a chosen coupling optic 650 influencing the ideal curvature of the emission surface $ES_2$. The interaction between the output port $OP_2$ and the coupling optic 650 can be further influenced through usage of the above discussed auxiliary optics for changing the main energy propagation direction and simplifying the manufacturing procedures of a respective preferred LG output port $OP_2$. Therefore, to both optimize the manufacturing costs and performance of the delivery efficiency DE of the output port $OP_2$ to the acceptance surface $AS_{LV}$, the coupling optic 650 and output port $OP_2$ design have to be optimized simultaneously together.

Several options are possible to increase the spatial uniformity of the illumination beam at the acceptance surface $AS_{LV}$ of the LV 100. Some of the design options have already been discussed above and are related to the construction of a LG (randomizing input and output fibers, inducing cross talk near the ends of the LG, etc.). By coupling two or more LG in series, the intensity variations at low spatial frequencies can simply be reduced. In order to decrease intensity variations at high spatial frequencies, the coupling optic 650 can be designed to operate slightly out of focus. By appropriately designing the optic and/or curving the emission surface $ES_2$, a low pass filter effect can also be achieved for the illumination of a planar surface. Further, auxiliary optical elements can be added to the output port $OP_2$ to act as low-pass filter elements. Examples of such low-pass filter elements are hollow reflective tubes and/or single cladding rods with an appropriately chosen cross section and optional tapered transition to a larger emission area with a lower divergence angle $\theta_2^{out}$. Other optical elements that can be added to the coupling optics 650, are moire filter elements that shifts a portion of the beam laterally with respect to another portion of the beam. Phase gratings, diffraction optics, controlled diffusers, etc can also be used to achieve a desirable effect. Using modern manufacturing methods, individual optical elements of a proper designed optics 650 can perform several functional tasks at once. For example besides of accomplishing an orthogonal magnification and an associated angle-changing task, these elements can also accomplish, if necessary, a low pass-filtering task, and/or a controlled diffusion task, and or a masking task, etc. In addition, whenever the PLE parameter constraint allow, it is preferred that the coupling optic 650 is a single transmissive element. Analog to the reflector 460 shown in FIG. 21, such a lens can be simple refractive, or a combination of refractive, diffractive and or phase gratings.

FIG. 23 shows a special design solution using this invention optimized for high throughput efficiency $TE_{CW}$ for a color wheel 600 buy providing very narrow illumination beams and similar sized collection LG's.

For example, as shown in FIGS. 20 and 21 in the case of PLE-AC and PLE-AD, the respective MLE is preferred to be positioned in such a manner with respect to the color wheel 600 that the longest dimension of the cross section of the respective secondary emission volume $EV_S$, is aligned radially with the color wheel axis 112. Preferably the color wheel 600 intersects the emission volume $EV_S$, slightly before its axial location LE and the input port $IP_2$ of the LG 448 is configured in such a manner to collect light from the emission volume $EV_S$, in a suitable manner.

Referring again to FIG. 23, the design configuration choices of the surface configurations $SC_1^{out}$ and $SC_2^{in}$ thus allow to chose between a gain in timing efficiency $TE_{CW}$ and/or area efficiency AE of a color wheel 600. The new design freedom resulting from the use of this invention gives the PLE designer new flexibility to optimize the compactness and portability of a total projection display system together with its efficiency and manufacturing costs.

Further, the LG's 176 and 640 allow an easy physically separation of the PLE into two or three spatially separate components (see FIG. 22). The freedom of the placement and orientation of these sub components with respect to each other permit the design of an overall spatially more compact and optionally also more light weight PLE.

Figure 26:
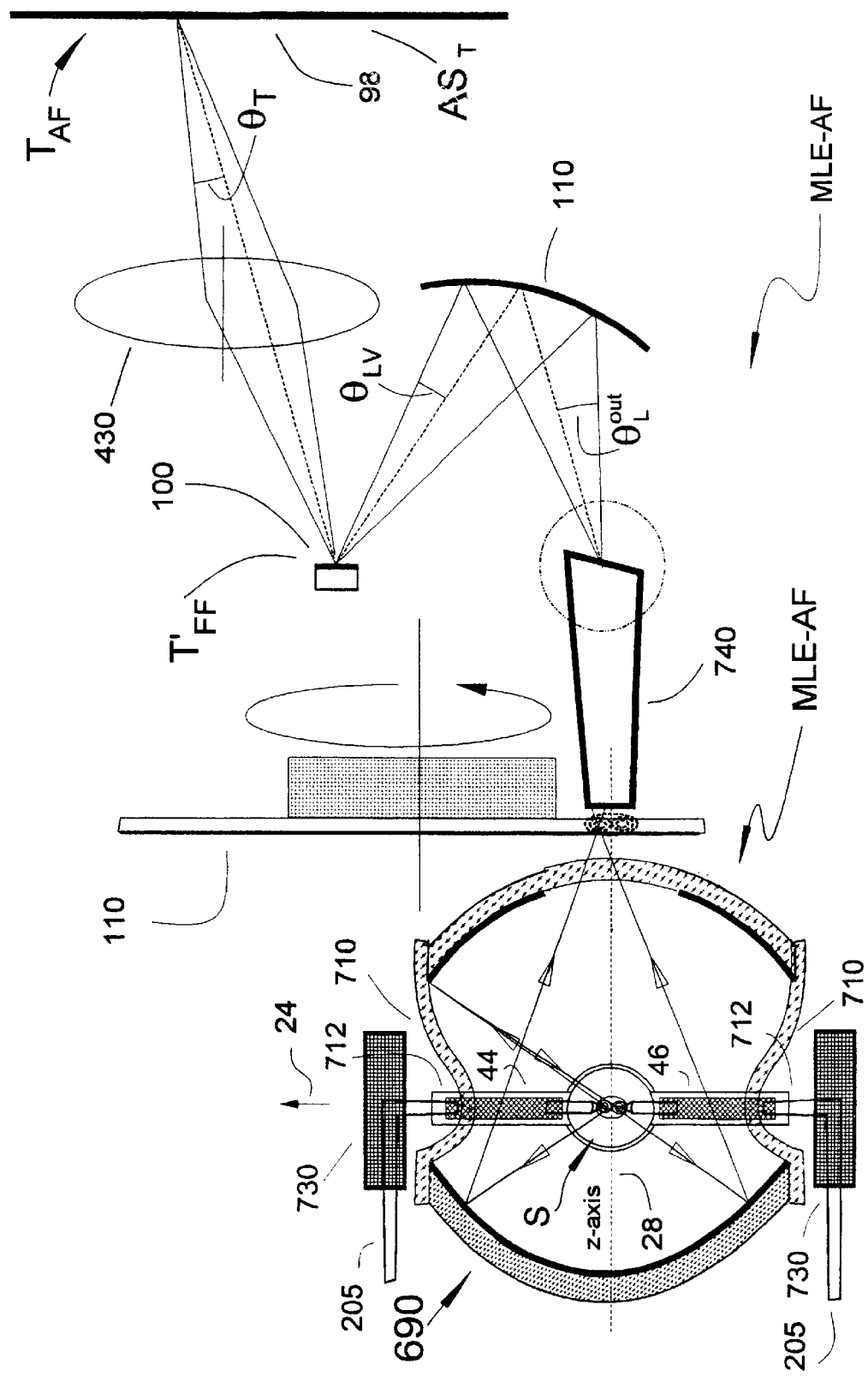
FIG. 26 shows pictorially a PLE-AF for a reflective LV

FIG. 26 shows a much simplified PLE based on this invention. The MLE-AF is shown as sealed cavity 690 that forms effectively an outher envelope and having a two opposed three dimensional indentations 710 along the source axis 24 through which the seals 710 of the lamp post 44 and 46 extend outside the cavity 690 Heat sinks 730 are shown to be attached to the lamp post ends near the seals 712 to aid in their cooling and lead wires 205 provide electrical current to the electrodes imbedded inside the lamp posts 44 and 46. Such a preferred MLE-AF allows to both reduce the source blockage and exit port losses discussed about for a given reflector height while also provide convenient access to the lamp post seals 712 in an thermally isolated manner from the inner envelope 42. In this manner the inner envelop can be operate close the upper operation temperature possible due to material constrains of the envelope 42 while at the same time allow to keep both lamp post seals 710 below a temperature range that is normally possible with MLE-B type design. This double envelope type system therefore aid in creating a long life lamp/reflector system. Ideally the inner volume of the cavity 690 is evacuated and a getter material is used to absorb impurities and keep them from contaminating the inside walls. The PLE-AF is also shown with a rectangular asymmetrically tapered integrator rod 740 which functions as ABTS and provides either an symmetrisized angular output beam of an asymmetrical one as discussing in relationship ship to FIG. 23. Again the exit port of the LG 740 is shown with a biased exit surface for 'Scheinplug' corrections to a non normal incident mode of the LV 100. The projection optic is shown used in an off axis mode for creating a keystone correction for a fixed output angular direction.

Figure 27:
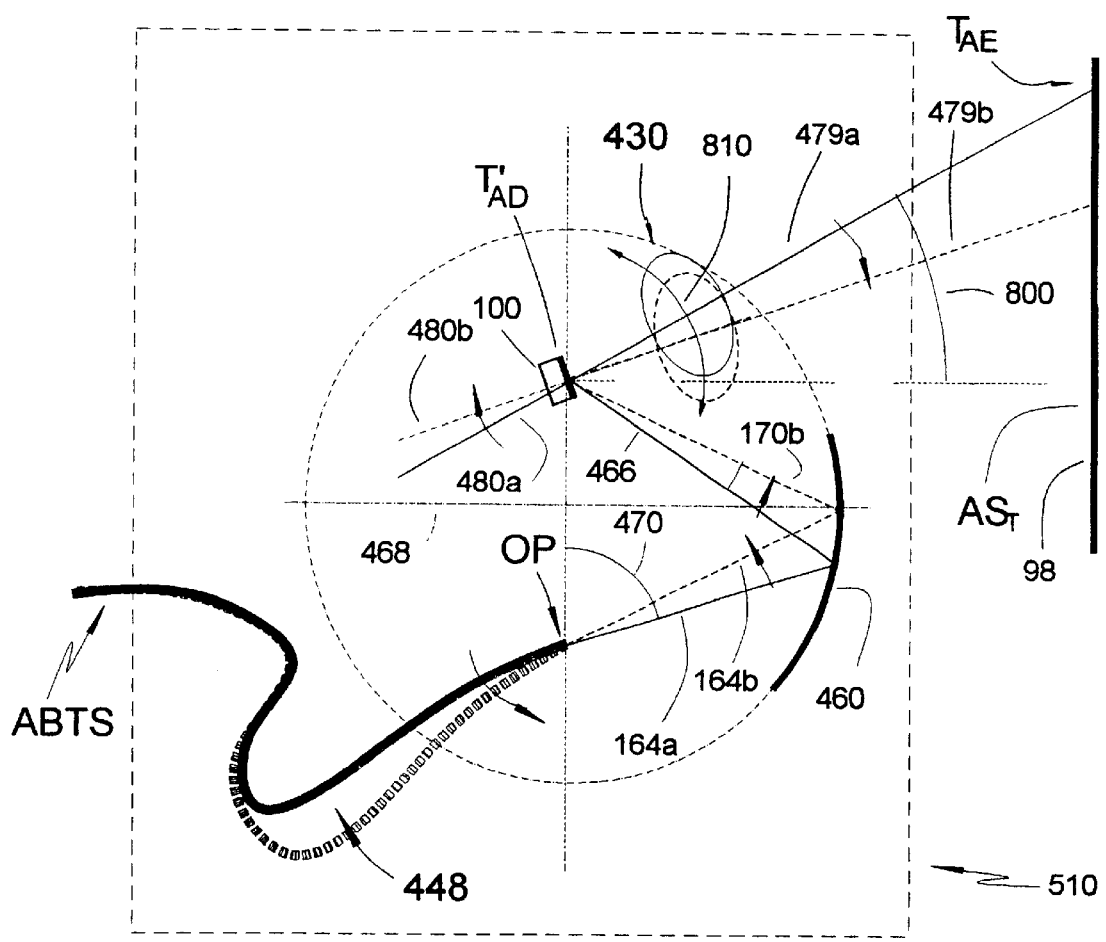
FIG. 27 shows the design of a projection head with adjustable keystone correction.

A still another preferred embodiment of this invention is shown in FIG. 27 showing a projection display head 510 with an adjustable keystone correction optic for a reflective type LV 100. This is an extension of the concepts shown in FIG. 21, i.e. the PLE-AD. Two different illumination beam direction setups are being shown, i.e. 4790a and 479b. All indices labeled 'a' or 'b' refer to the respective state of emission direction.

The lightweight and easy movability of the exit port OP of the flexible LG 448 (which is part of the cable 520) is being used to create a simple and lightweight projection head 510 with adjustable keystone correction. In contrast to the off-axis projection display optic usage shown in FIG. 21, the projection lens 430 is being used here mainly in an on-axis mode, i.e. the optical axis 480 of the projection lens 430 and the illumination beam propagation axis 479 are substantially parallel.

This preferred on-axis embodiment significantly reduces size and weight of the projection lens 430 and of the hardware necessary to obtain an adjustable keystone correction function with prior art (non LG based) PLE technology.

A keystone corrected optical setup requires that the rotation of the output port OP, i.e. change of the angle 470, the rotation of the LV 100, i.e. a change in the angle 800 and the rotation of the projection lens, i.e. a change in angle 810, have all a parallel rotation axis, but different respective rotation centers. Optionally test parts can also shift with respect to each other to provide zoom capabilities as well. Preferably a mechanical cam and lever system assures that all rotation happens in a predetermined and linked manner. For example, when a user tilt's a projection lens 430 manually to obtain a desired projection image height, its rotational motion gets sensed and transferred either directly (mechanical arms) or in indirectly (electronically driven motors) to the rotation of the LV 100 and the output port OP. In the case where style different coupling optics is being used, for example in PLE-AC and PLE-AE the reflector 460 or lens system 450 (shown in FIG. 19) or the coupling lens system 650 (shown in FIG. 23) all parts are moved accordingly to maintain the 'Scheinpflug' optic condition.

Not shown in any figure is another preferred PLE-G where the output ports of three LG's (like the ones shown in FIG. 15 for the LE-J) are being used to couple to a scanning prism and to simply the respective coupling optic of the single panel scrolling color projector (disclosed for example in the in U.S. Pat. No. 5,528,318 and other related patents) by customizing the ends of respective LG's as discussed above. Since this type of PLE, as discussed above, increases the beam étendue by a factor of 6 or 12 it is further enhanced with the improvements of this invention by allowing it to become more efficient for smaller size LV's.

Although the invention has been described with respect to various embodiments, it should be realized this invention is also capable of a wide variety of further and other embodiments within the spirit and scope of the invention.

I claim:

1. A light engine for efficient energy delivery and simultaneous étendue efficient area and angle reformatting of a gas discharge lamp comprising:

a retro reflector system;

a primary reflector system having a first and second focal point $F_1$ and $F_2$ defining a system axis; and a gas discharge lamp system comprising a gas tight, semitransparent envelope enclosing an energizable gas and including means for creating and energizing at least one spatially extended, semitransparent region of said gas, thereby creating an emission source S that emits electromagnetic energy escaping from said lamp system through said envelope and with the longest dimension of said source S defining a source axis;

said source axis being aligned substantially perpendicular to said system axis;

said source S being located proximate to said focal point $F_1$ and said lamp system having a respective emission étendue function $E_S(p)$ in at least one wavelength region of interest and with p representing the percentage of total emitted energy emitted by said lamp system in said wavelength region of interest;

said retro reflector system having an exit port and comprising at least one primary concave retro-reflector, said retro reflector system collecting and retro-reflecting a portion of said energy emitted from said source S back into said lamp system proximate to said source S, the combination of said source S and said retro reflector system thereby creating an effective retro-reflected emission source $S_r$, said source $S_r$ having a respective spatial dependent emission intensity distribution SI(x, y;$S_r$) in a plane perpendicular to said system axis and containing said source axis;

said primary reflector system comprising at least one concave reflector, said primary reflector system collecting and reflecting a portion of the energy emitted from said source $S_r$ and concentrating the major portion of said reflected energy approximately symmetrically around said envelope near said focal point $F_2$, thus creating a secondary emission source S' having a respective spatial dependent intensity distribution SI(x, y;S') perpendicular to said system axis and proximate to focal point $F_2$; and where curvatures, spectral reflectivities and transmissivities and extent of said primary reflector system and said retro reflector system and said exit port are chosen for efficient energy delivery in said at least one wavelength region of interest to said secondary source S' and such that said spatial asymmetric intensity distribution SI(x, y;S') has its longest dimension substantially parallel to said source axis and is a quasi-imaging magnification of said intensity distributions SI(x,y;$S_r$) and the beam exiting said retro reflector system through said exit port has a secondary source étendue function $E_{S'_r}(p)$ in said wavelength region of interest that is minimally increased over said source étendue function $E_S(p)$ for at least one of said p-values;

thereby forming a minimal light engine (MLE).

2. The light engine as defined in claim 1, wherein said source S and aid secondary emission source S' have a respective angular dependent emission energy density function AI($\phi,\Psi$;S) and AI($\phi,\Psi$;S') near said respective focal points $F_1$ and $F_2$ that is asymmetric in a plane containing said source axis and perpendicular to said system axis, thus generating both a spatially and angularly asymmetric, étendue efficiently reformatted output beam.

3. The light engine as defined in claim 1, wherein said lamp system comprises a lamp selected from the group consisting of an AC gas discharge arc lamp, a DC gas discharge arc lamp, a single envelope lamp, a double envelope lamp, an electrode-less, microwave powered, wall stabilized lamp, and wherein said gas is selected from the group consisting of Hg, $Hg_2$, Xe, Ar, Kr, metal halide salt vapors and molecules containing an element from the halogen group of the periodic table, and wherein said primary reflector system is selected from the group consisting of an elliptical and aspherical reflector, and wherein the components of said retro reflector system are selected from the group consisting of an spherical, toroidal, elliptical and a-spherical reflector, and wherein said quasi-imaging magnification of said primary reflector system has a value between 1.5 and 5.

4. The light engine as defined in claim 1, wherein said envelope has optical beam redirection properties and where aspherical deviations of said retro reflector system from a basic spherical form compensate for a portion of said optical beam redirection properties, and where said deviations reduce the spatial extent of said spatial dependent emission intensity distribution SI(x,y; S').

5. The light engine as defined in claim 1, wherein said envelope has optical beam redirection properties and where non-axial symmetric deviations of said primary reflector system from a basic axial symmetric ellipsoidal form compensates for at least a portion of said optical beam redirection properties, and where said non-axial symmetric deviations reduce the spatial extent of said spatial dependent emission intensity distribution SI(x,y; S').

6. The light engine as defined in claim 1, wherein said at least one oncave reflector comprises a primary reflector section and at least one auxiliary concave retro reflector section having a primary curvature radius $R_1 < R_0$ with $R_0$ representing the primary curvature radius of said primary concave retro reflector and wherein said primary concave retro reflector and said at least one auxiliary retro reflector section are located opposite to each other with respect to said lamp system and with said at least one auxiliary concave retro reflector section reflecting a portion of the energy collected from said source S back into said source S.

7. The MLE as defined in claim 1, wherein said retro reflector system comprises said primary concave retro reflector having a first exit opening and a primary curvature radius $R_0$ and at least one i-th auxiliary concave, retro reflector having at least one i-th second exit opening and a primary curvature radius $R_{2,i} > R_0$, and wherein said primary and said at least one i-th auxiliary retro reflector are located opposite to said primary reflector system with respect to said lamp system, and wherein a portion of said energy emitted directly from said source S and exiting through said first exit opening is collected and retro-reflected back proximate to said source S by said at least one i-th auxiliary concave retro-reflector, and wherein a portion of the electromagnetic energy concentrated by said primary reflector system exits said MLE through said at least one i-th second exit opening and wherein said exit port comprises said first exit opening and said at least one i-th second exit opening.

8. The MLE as defined in claim 7, wherein the combination of said at least one auxiliary concave retro reflector section and of a least one reflector subsection of said retro reflector system form a conjugate, reflective ring-cavity with said source S being located substantially at the focus of said reflective ring-cavity.

9. A light engine as defined in claim 1, wherein the spectrum of the energy escaping said exit port has relative gains in at least one wavelength band caused by an electromagnetic energy-material interaction of retro-reflected electromagnetic energy by said retro reflector system with said gas enclosed by said envelope over the spectrum of said energy emitted by said lamp system alone.

10. The light engine as defined in claim 9, wherein at least one component of said gas enclosed in said envelope is selected in combination with said electromagnetic energy-material interaction to generate a more spectrally usable energy beam for a balanced red, green and blue color band generation for color image projection display applications.

11. The light engine as defined in claim 1, wherein said envelope has an antireflection coating.

12. The light engine as defined in claim 1, wherein said lamp system has lamp posts with seals near their respective ends and a center envelope section, where said seals are preferably being operated below a preselected temperature and said center envelope section is preferably being operated within a preselected temperature range that is substantially higher than said preselected temperature, and wherein said primary and said retro reflector systems form a cavity which provides sufficient thermal isolation between said center envelope section and said seals so that the temperature of said seals can be lowered below said preselected temperature and said center envelope section can be operated within said preselected temperature range.

13. The light engine as defined in claim 1, wherein said primary reflector system has a surface shape which is accepted to achieve a more spatially uniform intensity profile at a minimal étendue loss at an energy collection surface near said focal point $F_2$.

14. A light engine comprising:
a sealed optical system enclosing an energizable gas, and said sealed optical system comprising a primary reflector system, a retro reflector system and at least one i-th exit window;

means for energizing said gas between two opposite electrodes tips, said tips defining a source axis and energizing a semitransparent, spatially extended plasma region, thereby creating an emission source S having an asymmetric spatial dependent intensity distribution SI(x,y;S) and an asymmetric angular dependent emission energy density function AI($\phi$,$\Psi$;S) in a plane containing said source axis;

said primary reflector system having a first focal point $F_1$ and a least one secondary i-th focal point $F_{2,i}$ defining an i-th system axis;

said source S being located proximate to said first focal point $F_1$ an d said source axis being aligned substantially perpendicular to said at least one i-th system axis;

said retro reflector system having at least one i-th exit port sealed by said at least one i-th exit window and comprising at least one concave retro reflector, said retro reflector system collecting and retro-reflecting a portion of said energy emitted from said source S back into said source S, the combination of said source S and said retro reflector system thereby creating an effective retro-reflected emission source $S_r$, and said source $S_r$ having a respective spatial dependent emission energy density function emission intensity distribution SI(x, y;$S_r$) in a plane perpendicular to said system axis and containing said source axis;

said primary reflector system comprising at least one concave reflector, said primary reflector system collecting and reflecting a portion of the energy emitted from said source $S_r$ and concentrating a substantial portion of said collected electromagnetic energy around said electrodes and through said at least one i-th exit window near said at least one secondary focal point $F_{2,i}$, thus forming at least one i-th secondary emission source $S'_i$, having its longest dimension oriented substantially parallel to said source axis and having a respective spatial dependent intensity distribution SI(x, y;$S'_i$) perpendicular to said i-th system axis and proximate to said at least one secondary focal point $F_{2,i}$; and where curvatures, and extent of said primary and retro reflector systems and of said at least one i-th exit port are chosen to produce at least one secondary source $S'_i$ having an intensity distribution SI(x,y;$S'_i$) that is a quasi-imaging magnification of said intensity distribution SI(x,y;$S_r$) and having an angular dependent AI($\phi$, $\Psi$;S') with its biggest extent oriented approximately perpendicular to said source axis and its smallest extent approximately parallel to said source axis;

thereby forming a sealed minimal light engine without any envelope blockage losses.

15. The light engine as defined in claim 14, wherein said primary and said retro reflector systems and said window are made from group consisting of of quartz, sapphire, glass, metal and heat conducting ceramic material, and wherein the primary component of said energizable gas is Xe, and wherein said plasma emission region is localized by two respective opposed tungsten containing electrodes which have a gas tight electrically and thermally conductive seal through said reflector body, and wherein said primary reflector system comprises sections from an axial symmetric ellipsoid having said i-th system axis as axis of symmetry, and wherein said primary retro reflector system has said source axis as axis of symmetry and are selected from a group consisting of a spherical, toroidal, elliptical and aspherical toroidal reflector, and wherein said quasi-imaging magnification of said primary reflector system has a value between 1.5 and 5, and wherein said primary reflector system is selected from a group consisting of a single axis system and a dual axis system.

16. A light engine comprising:
a quasi-imaging minimal light engine (MLE) for collection of electromagnetic energy emitted from a gas discharge lamp having an electromagnetic energy emission source S and for concentration of a portion of said collected energy, thus forming a respective spatial and angular reformatted secondary source S';
a configurable illumination target comprising at least one configurable pixel generating at least one processed output beam;
a coupling optic collecting a portion of electromagnetic energy emitted by said secondary source S' and providing an illumination beam for said configurable illumination target; and
a projection optic collecting a portion of said at least one processed output beam from said configurable illumination target and further including means to translate said collected processed output beam portion into a scaled image of said configurable illumination target at a remote display target; and with
said MLE comprising:
a retro reflector system;
a primary reflector system having a first and second focal point $F_1$ and $F_2$ defining a system axis; and
a gas discharge lamp system comprising a gas tight, semitransparent envelope enclosing an energizable gas and including means for creating and energizing at least one spatially extended, semitransparent region of said gas, thereby creating said emission source S that emits electromagnetic energy escaping from said lamp system through said envelope and with the longest dimension of said source S defining a source axis;
said source axis being aligned substantially perpendicular to said system axis and said source S being located proximate to said focal point $F_1$;
said retro reflector system having an exit port and comprising at least one primary concave retro-reflector, said retro reflector system collecting and retro-reflecting a portion of said energy emitted from said source S back into said lamp system proximate to said source S, the combination of said source S and said retro reflector system thereby creating an effective retro-reflected emission source $S_r$ emitting into a substantially reduced solid angle space than said source S emits and said source $S_r$ having a respective spatial dependent emission intensity distribution $SI(x,y;S_r)$ in a plane perpendicular to said system axis and containing said source axis;
said primary reflector system comprising at least one concave reflector, said primary reflector system collecting and reflecting a portion of the energy emitted from said source $S_r$ and concentrating the major portion of said reflected energy approximately symmetrically around said envelope near said focal point $F_2$, thus creating said secondary emission source S' having a respective spatial dependent intensity distribution $SI(x,y;S')$ perpendicular to said system axis and proximate to focal point $F_2$; and
where curvatures and extent of said primary reflector system and said retro reflector systems and said exit port are chosen such that said spatial asymmetric intensity distribution $SI(x,y;S')$ has its longest dimension substantially parallel to said source axis and is a quasi-imaging magnification of said intensity distributions $SI(x,y;S_r)$;
thereby forming a projection light engine (PLE).

17. The light engine as defined in claim 16, wherein said lamp system comprises a lamp selected from the group consisting of an AC gas discharge arc lamp, a DC gas discharge arc lamp, a single envelope lamp, a double envelope lamp, an electrode-less, microwave powered, wall stabilized lamp, and wherein said gas is selected from the group consisting of Hg, $Hg_2$, Xe, Ar, Kr, metal halide salt vapors and molecules containing an element from the halogen group of the periodic table, and wherein said primary reflector system is selected from the group consisting of elliptical and aspherical reflectors, and wherein the components of said retro reflector system are selected from the group consisting of spherical, toroidal, elliptical and aspherical reflectors, and wherein said quasi-imaging magnification of said primary reflector system has a value between 1.5 and 5, and wherein said configurable illumination target is selected from a group consisting of a reflective light valve, a transmissive light valve, a liquid crystal display device, a DMD, a TMA, a slide, a single frame of a film projector, a reflective image and a semitransparent image, and wherein, said coupling optic comprises optical elements selected from a group consisting of a symmetric beam transformer, an asymmetric beam transformer, a imaging area/angle transformers, a non imaging area/angle transformers, a non area reformatting light guide and an area reformatting light guides.

18. A light engine comprising:
a minimal light engine (MLE) for collection of electromagnetic energy emitted from a lamp having an electromagnetic energy emission source S and for concentration of a portion of said concentrated energy, thus forming a respective spatial and angular reformatted secondary source S'; and
an anamorphic beam transformer (ABT) having at least one input port and at least one output port, said at least one input port collecting electromagnetic energy that has been emitted from said secondary source S' and transporting a portion of said collected energy to said at least one output port of said ABT;
said MLE comprising:
a retro reflector system;
a primary reflector system having a first and second focal point $F_1$ and $F_2$ defining a system axis; and
a lamp system including means for energizing at least one spatially extended emission source S that emits electromagnetic energy escaping from said lamp system in a non symmetric angular dependent manner and with the narrowest dimension of the angular dependent intensity distribution $AI(\phi,\Psi;S)$ of said lamp system defining a source axis;
said source axis being aligned substantially perpendicular to said system axis and said source S being located proximate to said focal point $F_1$;
said retro reflector system having an exit port and comprising at least one primary concave retro-reflector, said retro reflector system collecting and retro-reflecting a portion of said energy emitted from said source S back into said lamp system proximate to said source S, the combination of said source S and said retro reflector system thereby creating an effective retro-reflected emission source Sr emitting into a substantially reduced solid angle space than said source S emits and said source $S_r$ having a respective spatial dependent emission intensity distribution SI(x,y;S$_r$) in a plane perpendicular to said system axis and containing said source axis;

said primary reflector system comprising at least one concave reflector, said primary reflector system collecting and reflecting a portion of the energy emitted from said source S$_r$ and concentrating the major portion of said reflected energy approximately symmetrically around said source S near said focal point F$_2$, thus creating said secondary emission source S' having a respective spatial dependent emission energy density function SI(x,y;S') and an asymmetric angular dependent AI($\phi$,$\Psi$;S') perpendicular to said system axis and proximate to said focal point F$_2$; and where curvatures and extent of said primary reflector system and said retro reflector systems and said exit port are chosen such that said angular dependent asymmetric emission energy density function AI($\phi$,$\Psi$;S') has its shortest dimension substantially parallel to said source axis and where said spatial dependent intensity distribution SI(x, y;S') is a quasi-imaging magnification of said intensity distributions SI(x,y;S$_r$); and where said MLE emits an asymmetric angular dependent output beam which has a wider angular spread orthogonal to said source axis and a narrower angular spread parallel to said source axis, and wherein said ABT resizes said spatial dependent intensity distribution SI($\phi$,$\Psi$;S') and said angular dependent emission energy density function AI($\phi$,$\Psi$S') in an asymmetric manner parallel and orthogonal to said source axis between said input and said output port thereby forming an anamorphic beam transformer light engine (ABTLE).

19. The light engine as defined in claim 18, wherein said lamp system comprises a lamp selected from the group consisting of an AC gas discharge arc lamp, a DC gas discharge arc lamp, a single envelope lamp, a double envelope lamp, an envelope-less electromagnetic emission source, an envelope less electromagnetic emission source with said primary reflector system and said and retro reflector system and said output port forming an effective envelope for said source S, an electrode-less, microwave powered, wall stabilized lamp, a filament lamp, a Tungsten-Halogen filament lamp, and a solid state emission source and wherein the envelope for said lamp systems having an envelope is filled with elements from the group consisting of vacuum, Hg, Hg$_2$, Xe, Ar, Kr, metal halide salt vapors and molecules containing an element from the halogen group of the periodic table, and wherein said primary reflector system is selected from the group consisting an elliptical and aspherical reflector, and wherein the components of said retro reflector system are selected from the group consisting of spherical, toroidal, elliptical and aspherical reflectors, and wherein said quasi-imaging magnification has a value of at least 1.5 and no more than 5, and wherein said ABT is selected from a group consisting of a hollow reflective tube, a hollow reflective tube with a reflective lid at its input port having a transparent section which is smaller than the input section of said reflective tube, a solid, total internal reflecting rod, a solid, total internal reflecting rod having a reflective coating at its input port that has a transparent section which is smaller than the input section of said rod, a liquid filled total internal reflective tube, a liquid filled total internal reflective tube with a reflective lid at its input port having a transparent section which is smaller than the input port of said liquid filled tube, a tapered single optical fiber, a fiber optic bundle with different cross sectional geometry at its respective input and output port, a light guide with different input and output cross sectional geometry, a 1-dimensional tapered light guide, a two-dimensional tapered-light guide, a—two-dimensional tapered light guide with different horizontal and vertical taper angle, a two step light guide combining a first 1-dimensional tapered section with a continuing straight section having a constant cross sectional shape and area, a two step tapered light guide with a 2-dimensional tapered input section continuing on with a straight section with a constant cross sectional shape and area, a light guide with a curved input surface, a light guide with a curved output surface, a light guide with a flat output section polished at a not normal angle to the main light guide propagation axis, a hollow light guide assembled from at least one component, a light guide with an auxiliary optic between said input port of said light guide and said exit port of said MLE, and an anamorphic optical imaging system with different image magnification parallel and orthogonal to said source axis.

20. The light engine as defined in claim 18 wherein said at least one output port of said anamorphic beam transformer system illuminates an additional optical system having a given spatial and angular dependent acceptance function, and where said ABT substantially provides an energy delivery efficient, area and angle beam reformatting function between the spatially and angular asymmetric output beam of said MLE and said spatial and angular dependent acceptance function of said additional optical system.

21. A light engine comprising:

a minimal light engine (MLE) for collection of electromagnetic energy from a filament lamp having an emission filament source S and concentrating of a portion of said energy to form at least one respective spatial and angular reformatted i-th secondary source S'$_i$; and a light guide having at least one input and one output port, said light guide collecting electromagnetic energy emitted from said at least one i-th secondary emission source S'$_i$ with at least one input port and delivering a substantial portion of said collected energy to at least one output port; and said MLE comprises:

a retro reflector system;

a primary reflector system having a first focal point F$_1$ and a least one secondary i-th focal point F$_{2,i}$ defining an i-th system axis;

a filament lamp comprising a semitransparent envelope enclosing a tungsten filament and including means for heating said filament, thereby creating said emission source S having a geometrical source center C that emits electromagnetic energy escaping said filament lamps through said envelope and with the longest direction of said filament defining a source axis and the widest dimension orthogonal to said source axis defining a width W and a widest width axis;

said source axis being aligned perpendicular to said i-th system axis with the shortest distance D between said first focal point F$_1$ and said source center C fulfilling the equation D$\geq$2W;

said retro reflector system having at least one i-th exit port and comprising at least one concave retro reflector, said retro reflector system collecting and retro-reflecting a portion of said energy emitted from said source S back into said filament lamp and proximate to said source S, the combination of said source S and said retro reflector system thereby creating an effective retro-reflected emission source $S_r$, said source $S_r$ having a respective spatial dependent emission intensity distribution $SI(x,y;S_r)$ in a plane perpendicular to said system axis and containing said source axis;

said primary reflector system comprising at least one concave reflector, said primary reflector system collecting and reflecting a portion of the energy emitted from said source $S_r$ and concentrating a substantial portion of said collected electromagnetic energy approximately symmetrically around said envelope near said at least one secondary focal point $F_{2'i}$, thus creating at least one secondary emission source $S'_i$, having a respective spatial dependent intensity distribution $SI(x,y;S'_i)$ perpendicular to said i-th system axis and proximate to said i-th secondary focal point $F_{2,i}$; and where curvatures and extent of said primary and retro reflector systems and said at least one i-th exit port are chosen to produce an at least one secondary source $S'_i$ having an intensity distribution $SI(x,y;S'_i)$ along a respective minimal étendue surface that is a quasi-imaging magnification of said intensity distribution $SI(x,y;S)$ of said source S;

thereby forming a filament source light guide light engine.

22. The light engine as defined in claim 21, wherein the minimal étendue surface of said at least one secondary source $S'_i$ is curved and where said widest width axis is oriented orthogonal to said i-th system axis.

23. The light engine as defined in claim 21, wherein said light guide selected from a group consisting of an anamorphic beam transformer, an étendue efficiently matched anamorphic beam transformer, a symmetrical light guide, and area reformatting light guide, and area and angle reformatting light guide, and wherein said at least one input port of said light guide is selected from a group consisting of a flat input area, a curved input area, a perpendicular oriented input area, a tilted input area, a stepwise approximated curved input area and a combination of an auxiliary, local beam redirection optic combined with a smooth input area, and wherein said quasi-imaging magnification value of said primary reflector system is between 1.5 and 5.

24. The light engine as defined in claim 22, wherein the curvature of said primary reflector system is chosen to bend the curvature of said minimal étendue surface to a preselected curvature.

25. A light engine comprising:
a quasi-imaging minimal light engine (MLE) for collection of electromagnetic energy emitted from a fluorescing emission volume source S having a longest dimension forming a source axis and for concentration of a portion of said collected energy, thus forming a respective spatial and angular reformatted secondary source S';

means for exciting said source S to emit electromagnetic energy in at least one first wavelength band by illuminating it with electromagnetic energy of at least one second wavelength band which is shorter in wavelength than said first band;

said MLE comprising:
a retro-reflector system;
a primary reflector system having a first and second focal point $F_1$ and $F_2$ defining a system axis; and where said source axis being aligned substantially perpendicular to said system axis and said source S being located proximate to said focal point $F_1$;

said retro-reflector system having an exit port and comprising at least one primary concave retro-reflector, said retro-reflector system collecting and retro-reflecting a portion of said energy emitted from said source S back proximal said focal point $F_1$, the combination of said source S and said retro-reflector system thereby creating an effective retro-reflected emission source $S_r$ emitting into a substantially reduced solid angle space than said source S emits and said source $S_r$ having a respective spatial dependent emission intensity distribution $SI(x,y;S_r)$ in a plane perpendicular to said system axis and containing said source axis;

said primary reflector system comprising at least one concave reflector, said primary reflector system collecting and reflecting a portion of the energy emitted from said source $S_r$ and concentrating the major portion of said reflected energy approximately symmetrically around said source S near said focal point $F_2$, thus creating said secondary emission source S' having a respective spatial dependent intensity distribution $SI(x,y;S')$ perpendicular to said system axis and proximate to focal point $F_2$; and where curvatures and extent of said primary reflector system and said retro-reflector systems and said exit port are chosen such that said intensity distribution $SI(x,y;S')$ is a quasi-imaging magnification of said intensity distributions $SI(x,y;S_r)$ and having an angular dependent emission energy density function $AI(\phi, \Psi;S')$ with its biggest extent oriented approximately perpendicular to said source axis and its smallest extent approximately parallel to said source axis;

thereby forming a fluorescence conversion light engine.

\* \* \* \* \*